(12) United States Patent
Warren et al.

(10) Patent No.: US 7,258,781 B2
(45) Date of Patent: Aug. 21, 2007

(54) SINGLE-USE LONG-LIFE FAUCET-MOUNTED WATER FILTRATION DEVICES

(75) Inventors: William Warren, Shaker Heights, OH (US); Gordon Lewis, Needham, MA (US); Robert Rizzari, Billerica, MA (US)

(73) Assignee: Clarity Filters LLC, Needham, MA (US)

( * ) Notice: Subject to any disclaimer, the term of this patent is extended or adjusted under 35 U.S.C. 154(b) by 322 days.

(21) Appl. No.: 10/613,950

(22) Filed: Jul. 3, 2003

(65) Prior Publication Data

US 2004/0069696 A1    Apr. 15, 2004

Related U.S. Application Data

(60) Provisional application No. 60/438,457, filed on Jan. 8, 2003, provisional application No. 60/409,042, filed on Sep. 9, 2002.

(51) Int. Cl.
B01D 35/143    (2006.01)

(52) U.S. Cl. .................. 210/87; 210/91; 210/138

(58) Field of Classification Search .............. 210/91, 210/87, 138; 340/607; 137/554
See application file for complete search history.

(56) References Cited

U.S. PATENT DOCUMENTS

| | | | |
|---|---|---|---|
| 0,527,451 A | 10/1894 | Richards | |
| 597,668 A | 1/1898 | Davison | |
| 2,568,181 A | 9/1951 | Zimmerman | |
| 2,955,712 A | 10/1960 | Gutkowski | |
| 3,420,266 A * | 1/1969 | Downey | 137/553 |
| 3,443,753 A | 5/1969 | McDonnell | |
| 3,746,171 A | 7/1973 | Thomsen | |
| 3,853,761 A | 12/1974 | McClory | |
| 3,857,277 A * | 12/1974 | Moore | 73/861.74 |
| 4,107,046 A | 8/1978 | Corder | |

(Continued)

FOREIGN PATENT DOCUMENTS

EP    0 537 528 A1    4/1993

(Continued)

OTHER PUBLICATIONS

U.S. Appl. No. 11/256,133, filed Oct. 21, 2002, Warren et al.

(Continued)

Primary Examiner—Terry K. Cecil
(74) Attorney, Agent, or Firm—Woodling, Krost and Rust

(57) ABSTRACT

Single-use long-life faucet mounted water filtration devices are disclosed. A bathroom water filtration device having two outlets for filtered water is disclosed. Additionally, a fountain head is included for use in the bathroom water filtration device. The water filtration device is of unibody construction formed by ultrasonically welding certain parts thereof together. Since the devices disclosed are disposable, no filter replacement or other maintenance is performed. A gate, magnet, sensor and electronics provide an indication of filter performance enabling disposal of the water filtration device and installation of a new device. A kitchen water filtration device is larger than the bathroom device. Both the kitchen and bathroom water filtration devices are small and are mounted behind the faucet connection so as to facilitate full utilization of the sink or wash basin.

14 Claims, 44 Drawing Sheets

U.S. PATENT DOCUMENTS

| | | |
|---|---|---|
| 4,147,631 A | 4/1979 | Deines |
| 4,151,092 A | 4/1979 | Grimm |
| 4,172,796 A | 10/1979 | Corder |
| D256,944 S | 9/1980 | Fox |
| 4,264,036 A | 4/1981 | Moore |
| 4,359,384 A | 11/1982 | Brane |
| 4,379,053 A | 4/1983 | Brane |
| 4,489,616 A | 12/1984 | Priddy |
| 4,504,389 A | 3/1985 | Rundzaitis |
| 4,656,873 A | 4/1987 | Stewart |
| 4,681,677 A | 7/1987 | Kuh |
| 4,686,037 A | 8/1987 | Lang |
| 4,698,164 A | 10/1987 | Ellis |
| 4,735,716 A | 4/1988 | Petrucci et al. |
| D296,925 S | 7/1988 | Groezinger |
| 4,769,135 A | 9/1988 | Norton |
| 4,770,768 A | 9/1988 | Lang |
| 4,772,386 A | 9/1988 | Grout |
| 4,806,240 A | 2/1989 | Giordano et al. |
| 4,848,164 A | 7/1989 | Quarve et al. |
| 4,877,521 A | 10/1989 | Petrucci et al. |
| 4,885,081 A | 12/1989 | Oliver |
| D306,754 S | 3/1990 | Petrucci et al. |
| D306,755 S | 3/1990 | Petrucci et al. |
| 4,918,426 A | 4/1990 | Butts |
| 4,934,597 A | 6/1990 | Crutcher |
| 4,948,505 A | 8/1990 | Petrucci et al. |
| 4,980,073 A | 12/1990 | Woodruff |
| D313,832 S | 1/1991 | Petrucci et al. |
| D314,809 S | 2/1991 | Petrucci et al. |
| D315,013 S | 2/1991 | Petrucci et al. |
| D317,040 S | 5/1991 | Petrucci et al. |
| 5,017,286 A | 5/1991 | Heiligmann |
| D320,256 S | 9/1991 | Giordano et al. |
| 5,050,772 A | 9/1991 | Brane |
| D321,394 S | 11/1991 | Petrucci et al. |
| 5,065,901 A | 11/1991 | Brane |
| D322,836 S | 12/1991 | Petrucci et al. |
| 5,089,144 A | 2/1992 | Ozkahyaoglu |
| 5,099,870 A | 3/1992 | Moore |
| 5,108,606 A | 4/1992 | Maglio |
| 5,126,041 A | 6/1992 | Weber et al. |
| 5,126,043 A | 6/1992 | Giordano et al. |
| D328,333 S | 7/1992 | Casberg |
| D328,942 S | 8/1992 | Igami |
| 5,151,179 A | 9/1992 | Bach |
| 5,151,180 A | 9/1992 | Giordano et al. |
| 5,160,038 A | 11/1992 | Harada |
| 5,164,082 A | 11/1992 | Lin |
| 5,192,436 A | 3/1993 | Sasaki |
| 5,248,417 A | 9/1993 | Reid |
| 5,254,242 A | 10/1993 | van der Meer |
| 5,256,287 A | 10/1993 | Underwood |
| 5,273,650 A | 12/1993 | Vermes |
| 5,279,748 A | 1/1994 | Hackett |
| 5,328,609 A | 7/1994 | Magnusson |
| 5,337,956 A | 8/1994 | Crutcher |
| 5,340,478 A | 8/1994 | Strand |
| 5,525,214 A | 6/1996 | Hembree |
| 5,527,451 A | 6/1996 | Hembree |
| 5,536,394 A | 7/1996 | Lund |
| 5,540,107 A | 7/1996 | Silverman |
| 5,580,447 A | 12/1996 | Platter |
| D377,515 S | 1/1997 | Hembree |
| 5,622,618 A | 4/1997 | Brane |
| 5,652,008 A | 7/1997 | Heiligmann |
| 5,653,868 A | 8/1997 | Yanou et al. |
| RE35,667 E | 11/1997 | Heiligmann |
| 5,685,981 A | 11/1997 | Koslow |
| 5,705,067 A | 1/1998 | Sumi |
| 5,721,383 A | 2/1998 | Franklin |
| 5,753,118 A | 5/1998 | Yang |
| 5,785,844 A | 7/1998 | Lund |
| D398,369 S | 9/1998 | Hayes |
| D398,703 S | 9/1998 | Hayes |
| 5,833,849 A | 11/1998 | Primdahl |
| 5,876,610 A | 3/1999 | Clack et al. |
| 5,888,381 A | 3/1999 | Primdahl et al. |
| D410,728 S | 6/1999 | Kurth |
| 5,928,504 A | 7/1999 | Hembre et al. |
| 5,935,426 A | 8/1999 | Giordano |
| 5,976,362 A | 11/1999 | Wadsworth |
| 5,976,432 A | 11/1999 | Yang |
| 5,979,668 A | 11/1999 | Kane et al. |
| 5,989,425 A | 11/1999 | Yonezawa |
| 5,993,648 A | 11/1999 | Hunter et al. |
| 6,001,249 A | 12/1999 | Bailey et al. |
| 6,024,867 A * | 2/2000 | Parise ............... 210/87 |
| 6,093,313 A | 7/2000 | Bovaird |
| 6,106,705 A | 8/2000 | Giordano |
| 6,123,837 A | 9/2000 | Wadsworth |
| 6,135,154 A | 10/2000 | Chen et al. |
| 6,149,801 A | 11/2000 | Giordano |
| D438,592 S | 3/2001 | Gaston |
| D441,834 S | 5/2001 | McGrath |
| 6,241,103 B1 | 6/2001 | Hembree |
| 6,241,880 B1 | 6/2001 | Yahr |
| 6,251,274 B1 | 6/2001 | Shepherd |
| 6,258,266 B1 | 7/2001 | Riback et al. |
| 6,284,129 B1 | 9/2001 | Giordano |
| 6,338,279 B1 | 1/2002 | Tsataros |
| D453,952 S | 2/2002 | Gaston |
| 6,451,202 B1 | 9/2002 | Kuennen |
| 6,464,871 B1 | 10/2002 | Chang |
| 6,482,325 B1 | 11/2002 | Corlett |
| 6,517,707 B2 | 2/2003 | Giordano |
| 6,517,720 B1 | 2/2003 | Aldred |
| 6,571,960 B2 | 6/2003 | Williamson |
| D484,567 S | 12/2003 | Gaston |
| 6,780,316 B2 | 8/2004 | Haynes et al. |
| 6,797,156 B2 | 9/2004 | Chau |
| D498,511 S | 11/2004 | Warren |
| D498,512 S | 11/2004 | Warren |
| 6,926,821 B2 | 8/2005 | Giordano et al. |
| 2001/0040121 A1 | 11/2001 | Giordano et al. |
| 2001/0054583 A1 | 12/2001 | Hembree |
| 2002/0005379 A1 | 1/2002 | Williamson et al. |
| 2002/0017497 A1 | 2/2002 | Fritze |
| 2002/0060175 A1 | 5/2002 | Conrad et al. |
| 2002/0189986 A1 | 12/2002 | Kuennen et al. |
| 2003/0034285 A1 | 2/2003 | Hembree |
| 2003/0070968 A1 | 4/2003 | Haynes et al. |
| 2003/0116495 A1 | 6/2003 | Chau |
| 2003/0173273 A1 | 9/2003 | Giordano et al. |
| 2004/0026302 A1 | 2/2004 | Lee |
| 2005/0035054 A1 | 2/2005 | Chu |
| 2005/0040097 A1 | 2/2005 | Bassett et al. |
| 2005/0092661 A1 | 5/2005 | Warren et al. |
| 2005/0098485 A1 | 5/2005 | Boyd et al. |

FOREIGN PATENT DOCUMENTS

| | | |
|---|---|---|
| GB | 2093005 | 8/1982 |
| JP | 57-016823 | 8/1983 |
| JP | 58-134286 | 8/1983 |
| JP | 58-187666 | 11/1983 |
| JP | 62-180176 | 8/1987 |
| JP | 62-155380 | 10/1987 |
| JP | 07-116657 | 5/1995 |
| JP | 09-144913 | 6/1997 |
| JP | 09-168708 | 6/1997 |
| JP | 09-170670 | 6/1997 |
| JP | 09-253424 | 9/1997 |
| JP | 09-253533 | 9/1997 |

| | | |
|---|---|---|
| JP | 09-253633 | 9/1997 |
| JP | 09-264436 | 10/1997 |
| JP | 09-264441 | 10/1997 |
| JP | 11-217858 | 8/1999 |
| JP | 11-270720 | 10/1999 |
| JP | 2000-210661 | 8/2000 |
| JP | 2000-304141 | 11/2000 |
| JP | 2001-162113 | 6/2001 |
| JP | 2003-15616 A | 5/2003 |
| JP | 2003-156160 | 5/2003 |
| JP | 2003-156161 A | 5/2003 |

OTHER PUBLICATIONS

U.S. Appl. No. 11/256,403, filed Oct. 21, 2005, Warren et al.
U.S. Appl. No. 11/256,132, filed Oct. 21, 2005, Warren et al.
U.S. Appl. No. 11/255,670, filed Oct. 21, 2005, Warren et al.
U.S. Appl. No. 11/255,715, filed Oct. 21, 2005, Warren et al.
U.S. Appl. No. 11/256,064, filed Oct. 21, 2005, Warren et al.
U.S. Appl. No. 11/264,239, filed Nov. 1, 2005, Warren et al.
U.S. Appl. No. 29/241,787, filed Nov. 1, 2005, Warren et al.
www.torayvino.com web page dated Jun. 6, 2003 along with a translation into English, 15 pages.
www.purwater.com web page dated Aug. 22, 2003, 11 pages.
pur advertisement, 2 pages, undated.

* cited by examiner

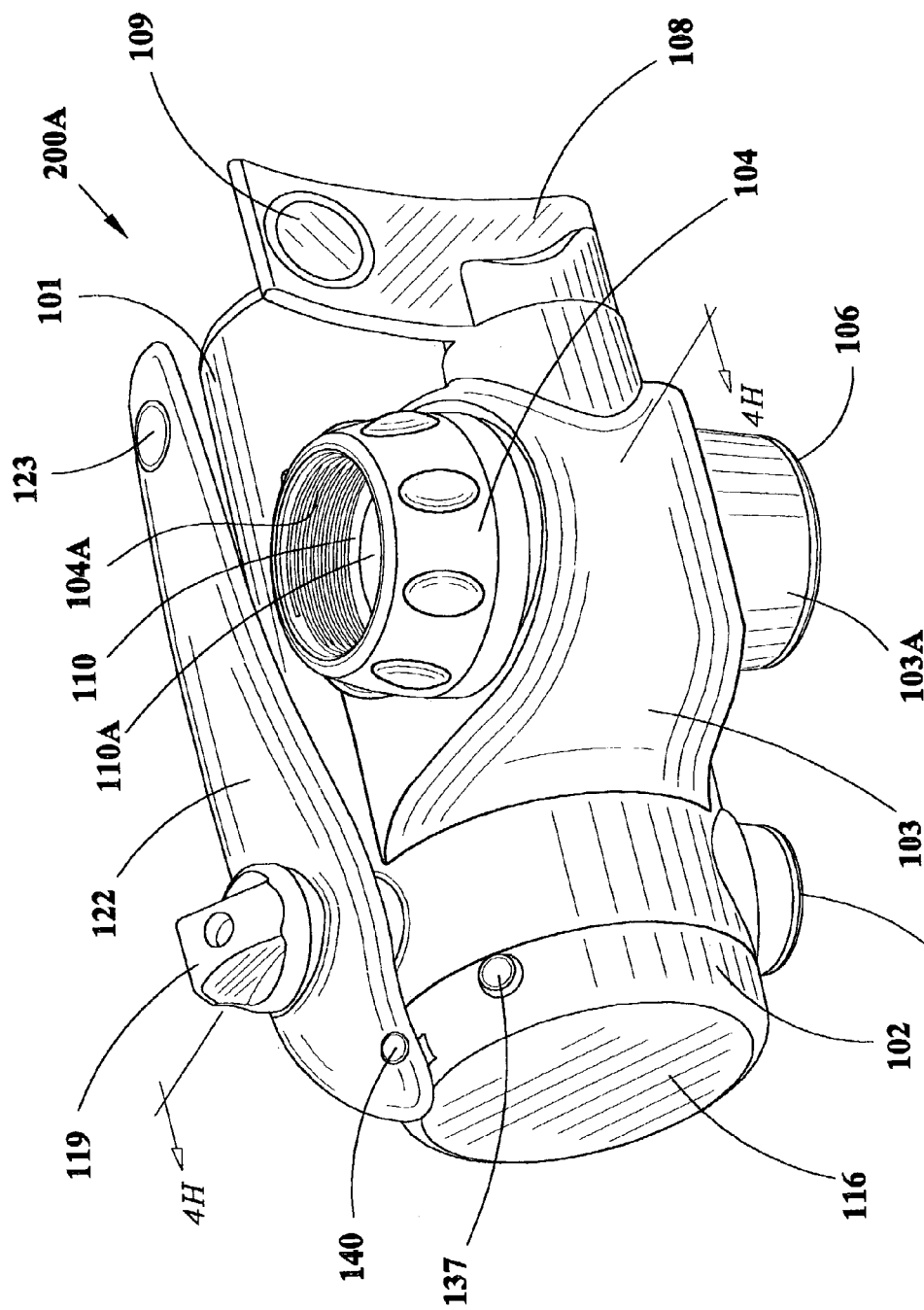

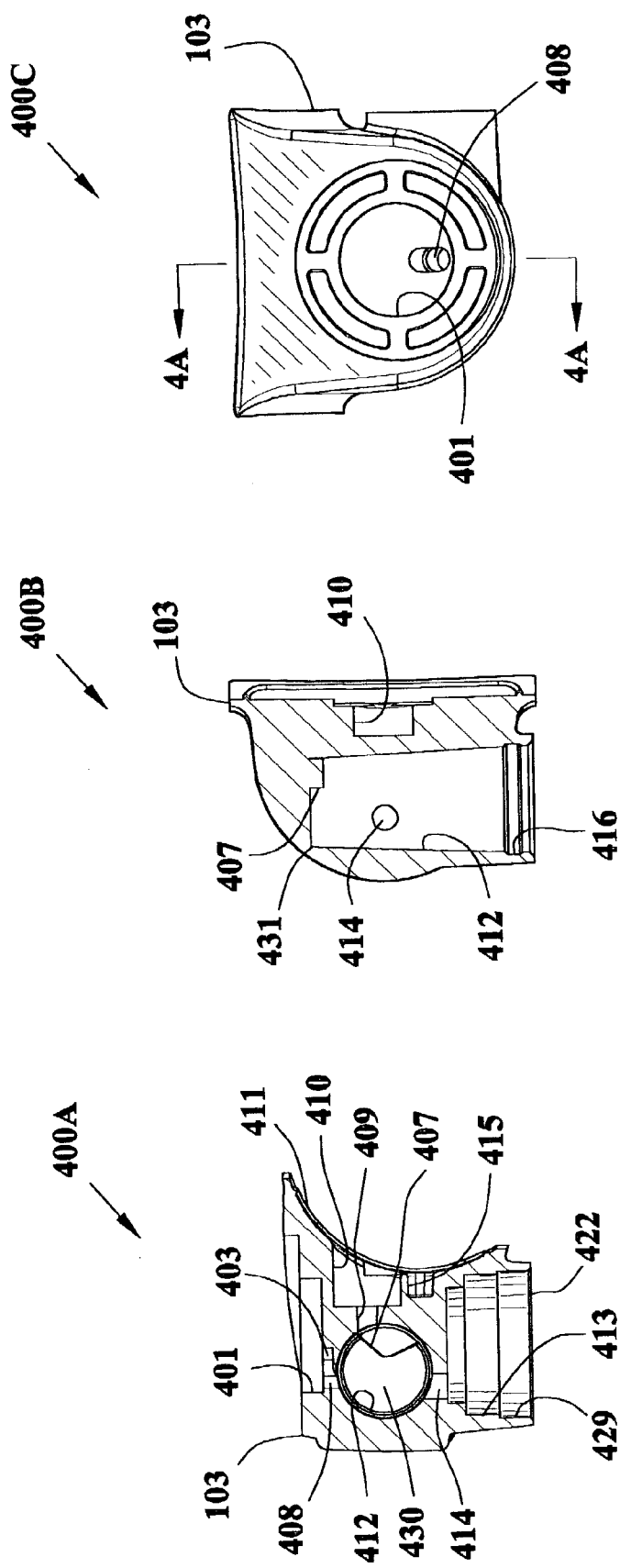

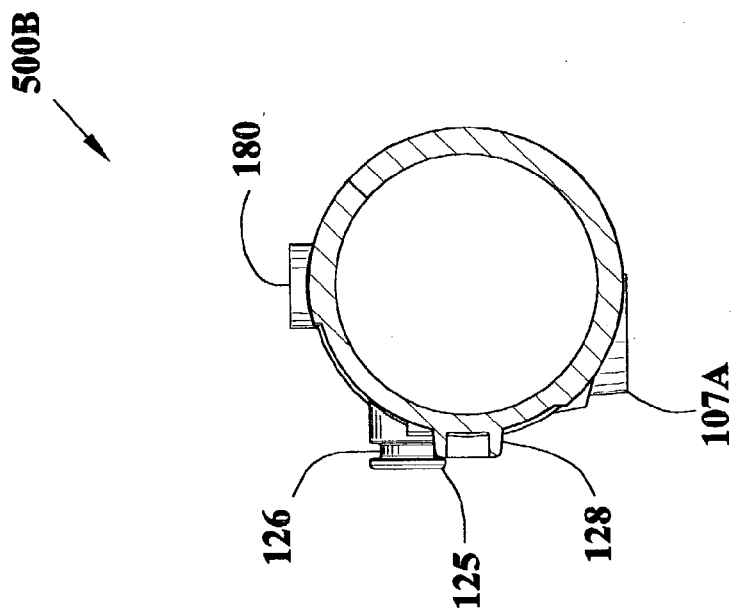
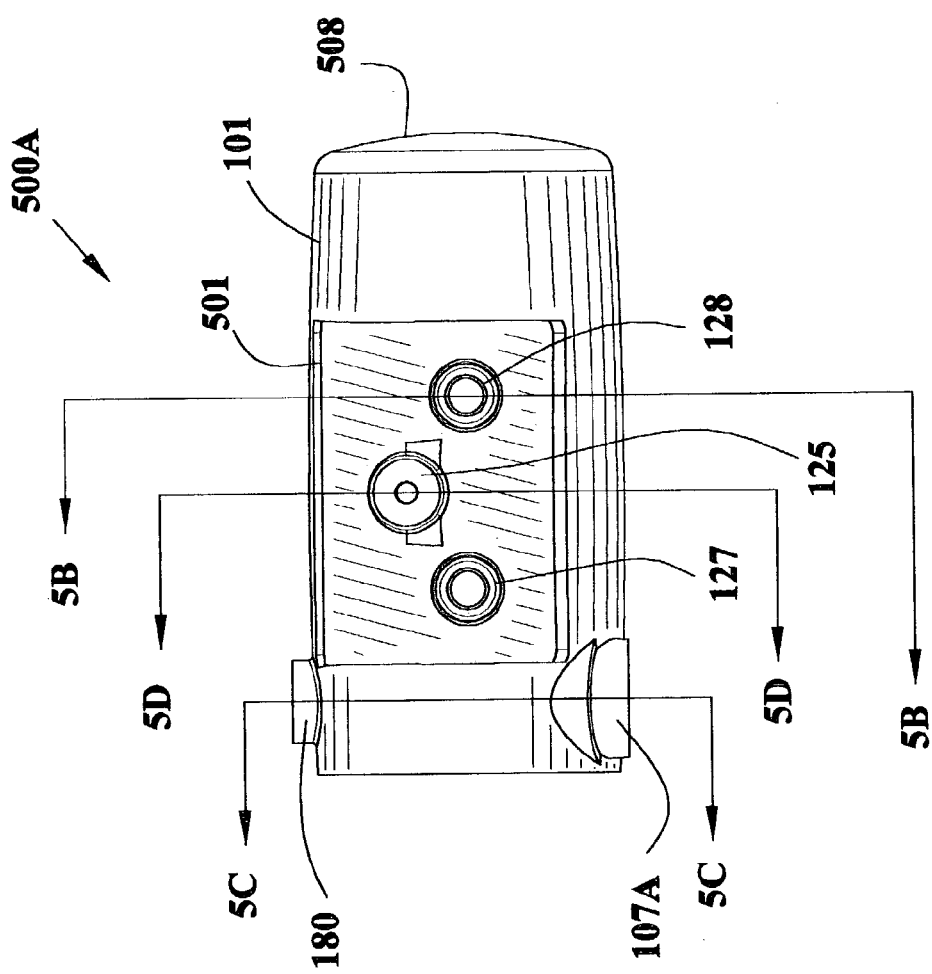
FIG. 5B
FIG. 5A

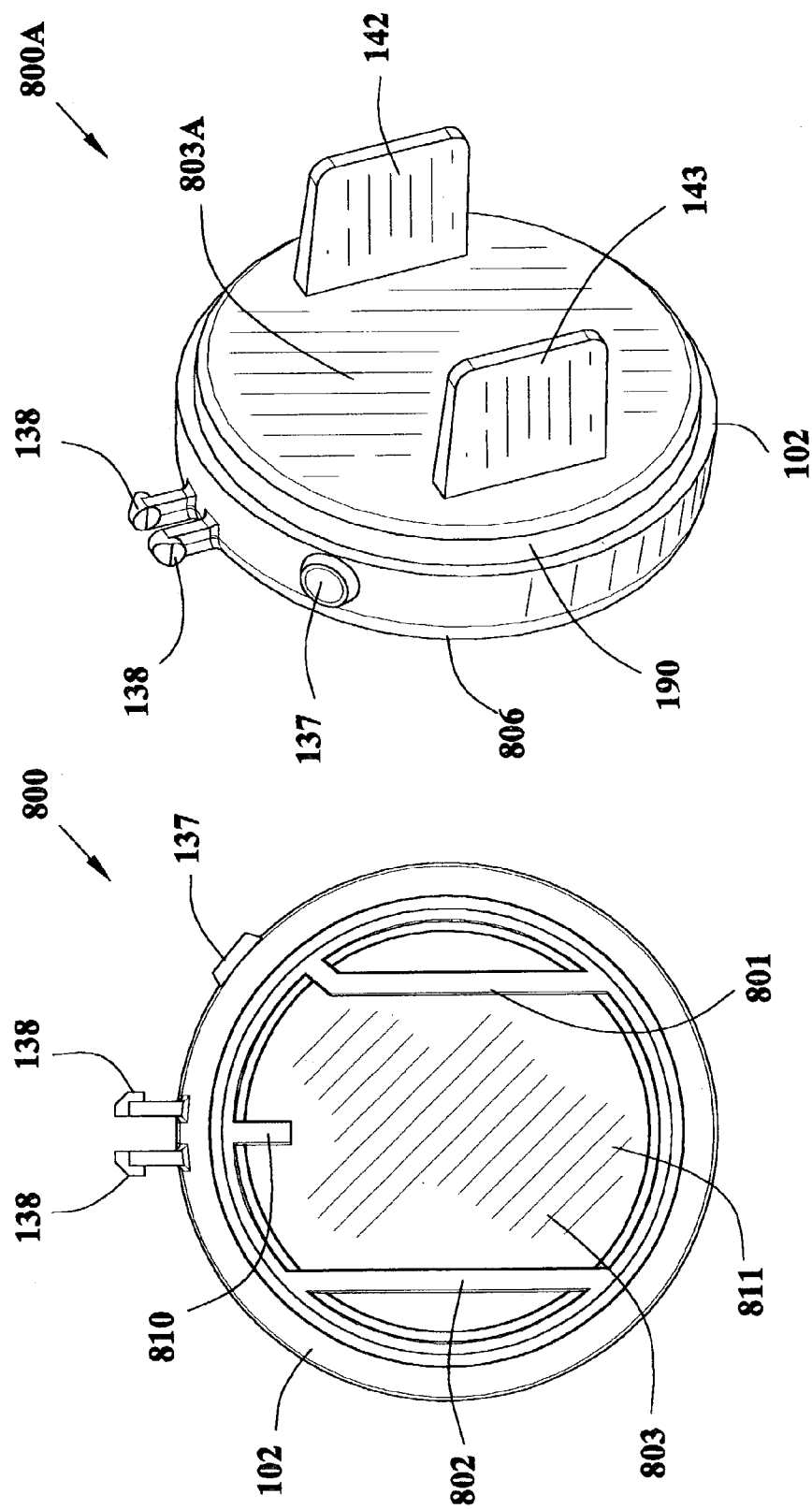

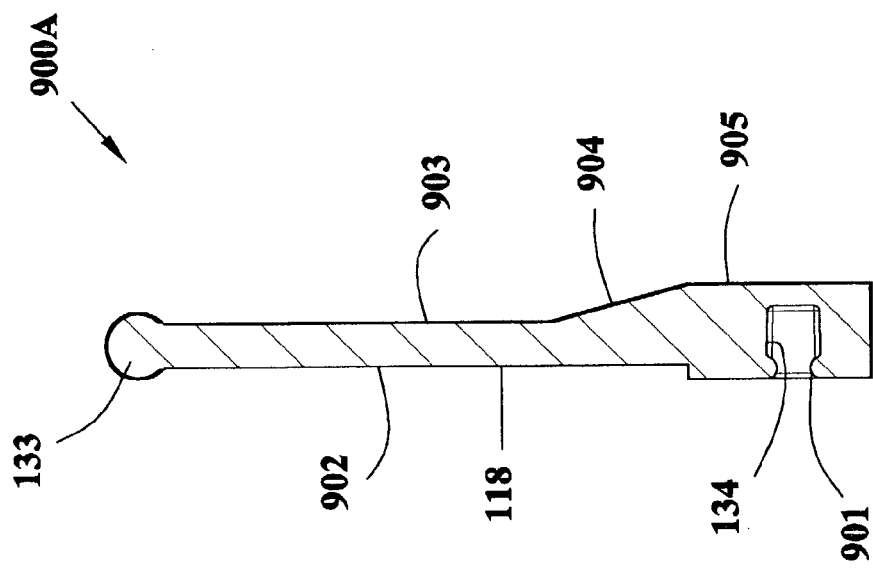
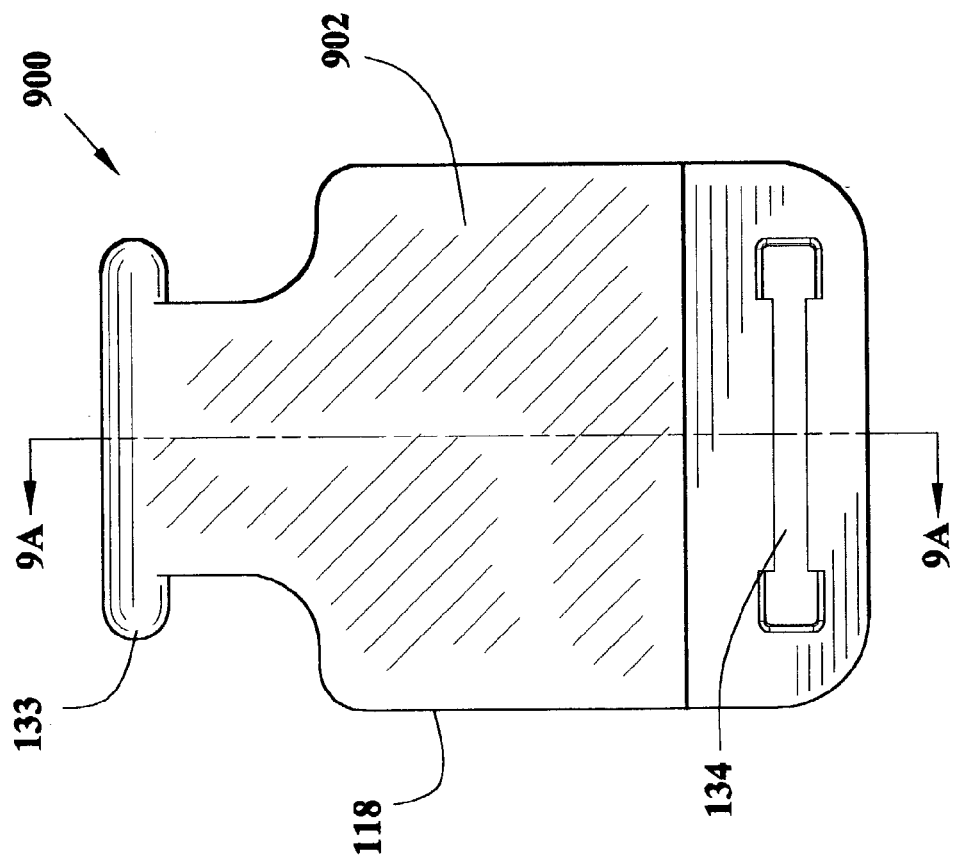
FIG. 9A
FIG 9

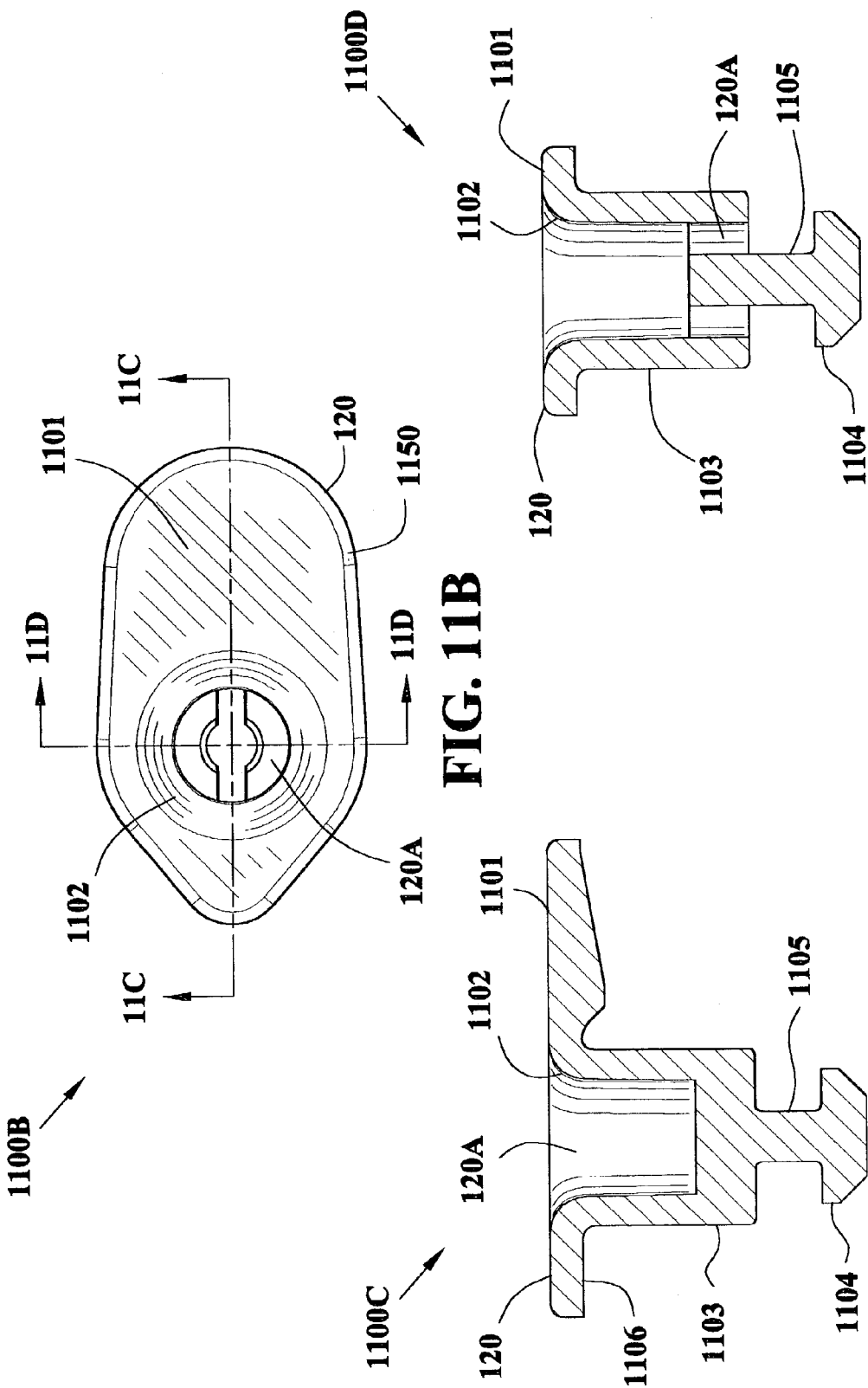

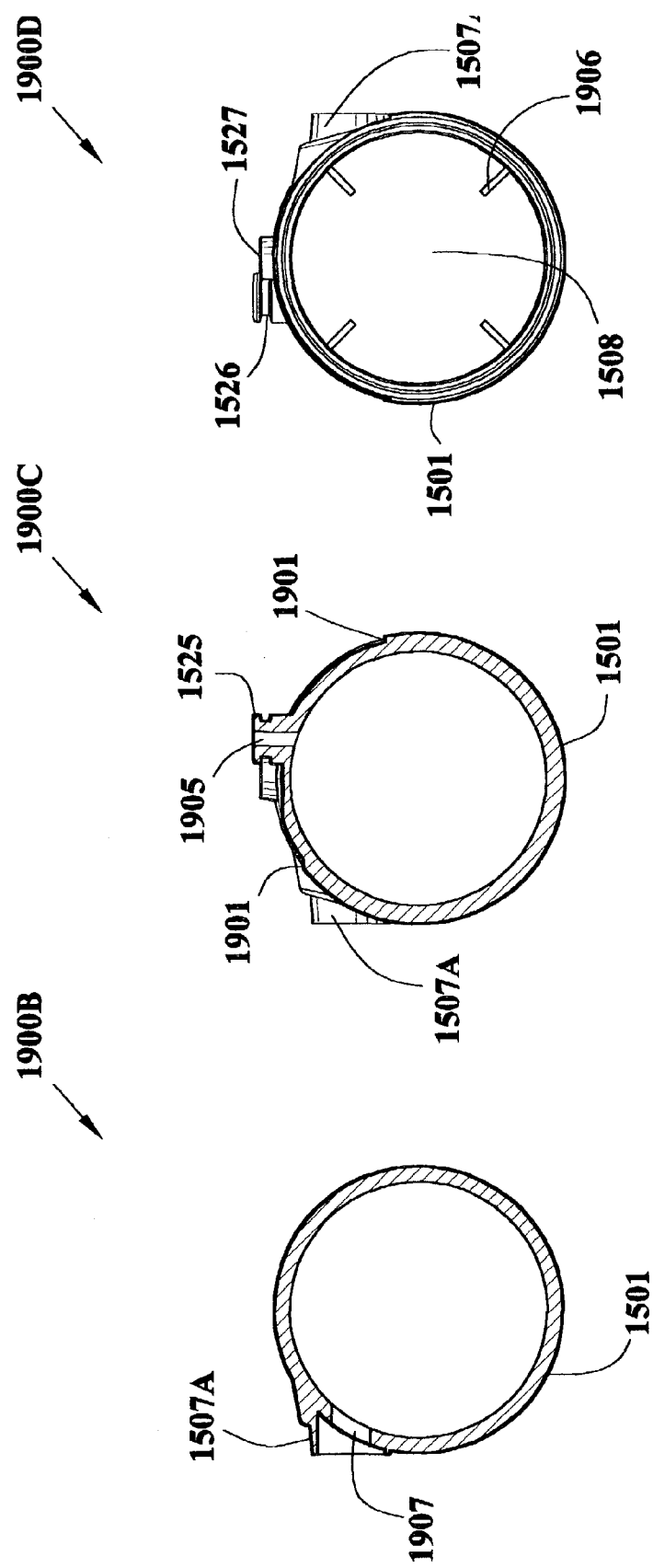

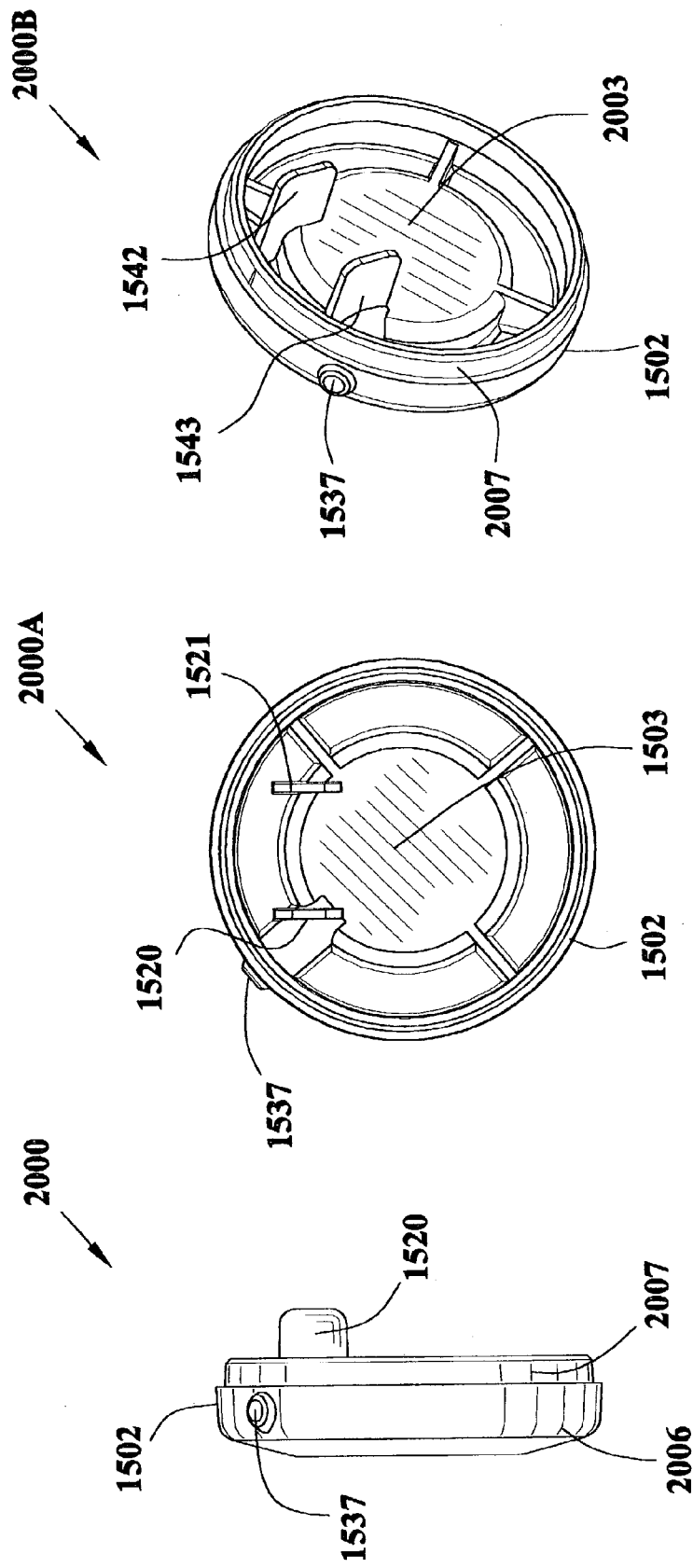

SINGLE-USE LONG-LIFE FAUCET-MOUNTED WATER FILTRATION DEVICES

This patent application claims priority of provisional patent application Ser. No. 60/438,457 filed Jan. 8, 2003 and provisional patent application No. 60/409,042 filed Sep. 9, 2002.

FIELD OF INVENTION

The field of the invention is water filtration devices.

BACKGROUND OF THE INVENTION

The demand for pure water continues to grow rapidly due to increasing concerns about the quality and safety of tap water, the popularity of water as a beverage (instead of soda and alcohol) and the growing awareness that most people do not drink enough water as prescribed by the medical community.

Water is supplied from municipal water systems (many of which are aging), private water systems and wells in the United States. Frequently, this water has poor taste, particulates, unwanted odors and in many cases contaminants contained in it. Municipal water is commonly treated with chlorine to eliminate bacterial contaminants. Chlorine adds what most people feel is an unpleasant taste and odor. Water conditions vary greatly according to the geographic area and therefore travelers may also experience these problems as they visit hotel and motel rooms around the country. It is desirous to remove bad tastes, odors, sediment and contaminants before ingesting the water or using it for cooking food.

Water treatment devices of many varieties have proven effective in accomplishing water purification. Generally these devices work through chemical and mechanical actions that remove contaminants and impurities from water. These filters have a finite life. Sediment can eventually clog a filter and chemical reactions realized through adsorption (carbon media) and ion exchange (cation resin) have a limited capacity.

U.S. Pat. No. 5,989,425 to Yonezawa et al. discloses a multi-way valve and water purifier. The multi-way valve is disclosed as a small-sized one which may be used with a small-sized water purifier. The device disclosed in the '425 patent is a faucet mounted filter and it is designed for removing and exchanging valve bodies.

U.S. Pat. No. 5,017,286 to Heiligman and U.S. Pat. No. Re. 35667 to Heiligman disclose a vertical filter enclosed in a housing and the housing is supported by a duct. The vertical filter may be permanently secured to the filter by hot melt adhesive which renders the filter non-removable. Further, the vertical filter may be pre-wrapped with a porous paper pre-filter. The device disclosed in the '286 patent is a faucet mounted filter. If the filter is glued to the filter housing the filter housing must be removed and discarded together with the filter. A new filter housing (and filter) must then be mounted onto the duct of the diverter valve each time the filter housing is replaced. This involves time consuming labor in the case of each embodiment disclosed in the '286 patent. In one embodiment of the '286 patent, the filter housing is secured by a retaining clip. In another embodiment disclosed in the '286 patent, the male duct of the filter housing is press-fit into an opening in the diverter valve. Alternatively, the male duct of the filter housing may be affixed to the diverter valve by a U-clip, cotter pin or the like. The filter housing as disclosed in the '286 patent is disclosed as residing vertically in front of the faucet. In short, it is not a simple matter to change the filter housing of the device disclosed in the '286 patent.

U.S. Pat. No. 5,527,451 to Hembree et al. discloses a faucet mounted filter utilizing a replacement filter cartridge. The replacement filter cartridge resides within a larger rotatable housing which channels water flow either into the filter or through the diverter valve assembly. Hembree et al. also discloses a very complicated flow totalization mechanism which includes porting water to a turbine driven mechanism prior to filtering thereof.

U.S. Pat. No. 6,571,960 B2 to Williamson et al. discloses a faucet-mounted water filtration device whose filter housing includes a valve therein and whose filter housing extends longitudinally rearwardly from the point of attachment to the faucet. The filters in Williamson et al. are replaceable filter cartridges.

U.S. Pat. No. 6,284,129 B1 to Giordano et al. discloses a rotating a magnetized impeller actuating a reed switch.

In each of the foregoing disclosures, the devices disclosed therein are designed for disassembly of some sort as a matter of maintenance of the filtration device. This requires labor and attendant time. Complex flow totalization mechanisms such as the one disclosed in Hembree et al. '451 present maintenance problems. The need to change the filter and/or the filter housing and/or the diverter valve all require labor and attendant time.

In each of the foregoing disclosures, the devices disclosed therein are designed for disassembly of some sort as a matter of maintenance of the filtration device. Filtration devices customarily employ replaceable filter cartridges of some type. These arrangements require either a coupling arrangement for attaching and detaching a replacement filter cartridge or a large chamber to entirely enclose the replacement filter cartridge. Both approaches require additional components and materials that add to the manufactured cost and complexity of the device. Furthermore, each of the foregoing disclosures, by requiring the replacement of the filter element, cause great inconvenience to the user by having him search for and procure replacement filter elements at considerable cost. This arrangement, while lucrative for the manufacturer, is a well documented nuisance for the consumer. In addition, most of the devices in the related art, owing to their need for easy access and maintenance are relatively large and obtrusive partially blocking the sink basin. Finally, the devices noted above and most others despite the availability of high capacity filter media are not designed for long life so as to maximize the frequency with which users must purchase replacement filter elements.

It is therefore desirable to have a small faucet-mounted water filtration device which is a single-use, long-life water filtration device which includes an indicator of filter performance. By single use it is meant that it is discarded when its performance indicator reveals that the efficacy of the filter has been diminished. It is also desirable to have the filter housing of the water filtration device mounted behind the connection to the faucet to enable full access to the sink basin beneath the faucet.

SUMMARY OF THE INVENTION

A single-use faucet-mounted water filtration device is provided. The device is of uni-body construction and has no removable or replaceable parts yet provides long life operation. This arrangement makes the device more convenient to use compared with other devices that require frequent replacement of filter cartridges. The device is constructed with a minimum of components making it relatively small in size and less costly to manufacture. While compact, the device is able to hold enough filter media to allow for long life operation. The life of the water filtration device is dependent upon the type of filter media used, sizing and geometry of the filter media, and the sizing and geometry of water flow paths. For instance, water filtration devices having a useful life of 300 gallons or more can be made utilizing the teachings of the instant invention. Water filtration devices having useful lives smaller than 300 gallons may also be made utilizing the teachings of the instant invention. Performance indications as a function of integrated flow-are indicated by a light emitting diode.

The main housing of the devices resides beneath the faucet neck and rearward of the water discharge point thus not obstructing the sink basin. A single-use device is provided for use in a kitchen sink and a device is provided for use in a bathroom sink. Unlike devices in the related art the bathroom embodiment of the single-use faucet filter is scaled to the small size of bathroom sinks and therefore practical for use in bathrooms. The bathroom filter device allows residential users to have the benefit of filtered water in close proximity to the bedroom avoiding the inconvenience of going to a kitchen sink for water during the night. In addition, because the bathroom device is small and disposable it may be taken with a traveler and installed in a hotel or motel room. Further, as travelers readily discern the differences between water and its tastes from one place to another it is highly desirable that the water filter be portable.

The invention includes a front housing connectable to a water faucet and a filter housing having an inlet and an outlet. An end cap of the filter housing completes the filter housing. The front housing is non-removably affixed to the filter housing and the water filter is non-removably contained within the water filter housing. The water filter housing includes a chamber in communication with the water filter. The filter is preferably activated carbon and includes a filter pre-wrap. Other filter media may be used. The outlet resides in the chamber. Alternatively, a second outlet may also reside in the chamber in the embodiment of the bathroom filter.

The single use water filtration device is small. The embodiment designed for bathroom use has a filter diameter less than or equal to 1.6 inches. The embodiment designed for kitchen use has a filter diameter less than or equal to 2.2 inches. The water filtration devices disclosed herein, namely the bathroom and kitchen embodiments, reside substantially rearwardly with respect to the water faucet. Other diameters and sizes of the water filtration devices disclosed herein may be made using the teachings hereof.

The filter includes ends thereof each secured to an end cap. The end caps have peripheral seal portions which seal against the interior of the filter housing. A housing end cap is ultrasonically welded to the filter housing. Other welding methods such as microwave, radio frequency (RF), heat and induction welding may be employed to weld various portions of the water filtration devices disclosed herein together.

The second outlet includes a valve seat and a valve interposed in the filter housing being operable against the valve seat of the second outlet for controlling the flow out of the second outlet. The valve includes a plunger having a foot and an elastomeric ball valve or boot residing over the foot. The foot of the plunger and the elastomeric ball valve reside within the housing. A handle is pivotally connected to the end cap of the filter housing and engages the plunger such that when the plunger is depressed the elastomeric ball valve moves inwardly toward the center of the housing and away from the seat of the second outlet. A fountain head is rotatably secured in the plunger and lever for communication with a passageway in the plunger.

A spring is interposed between the plunger and the filter housing urging the elastomeric ball valve against the valve seat of the second outlet.

A front housing having first and second passageways is non-removably affixed to the filter housing. The front housing includes a directional valve residing within the front housing and movable therein for directing water into the filter for filtering or through the front housing for direct use of the unfiltered water. The filter housing includes three protrusions which interengage corresponding apertures in the front housing. The front housing also includes a continuous periphery welded to the filter housing by one of the aforementioned methods. The filter housing includes a recess whose shape is the reciprocal of the continuous periphery of the front housing and the continuous periphery of the front housing fits snugly within the recess in the filter housing. The end cap of the filter housing is welded to the filter housing. Three parts or pieces, the filter housing, the front housing and the end cap of the filter housing are welded together to provide a unibody or integral construction.

A gate having a magnet affixed therein resides in the chamber and swings between a first position and a second position. Spacers extending from the end cap serve to ensure that the gate remains in alignment with respect to the earth. These spacers also serve to ensure that the filter subassembly remains in proper position. The first end cap of the filter includes a first hinge member and the gate includes a second hinge member which coacts with the first hinge member to enable the gate to swing between first and second positions. A gate position sensor resides in a dry portion of the end cap of the water filter housing and is actuated when the gate swings to the second position and the magnet is in proximity to the sensor.

An electronic package and a light emitting diode reside in the dry portion of the end cap of the water filter housing. The electronic package outputs a signal to the light emitting diode which indicates the performance of the water filtration device. The electronic package outputs three discrete signals to the light emitting diode to indicate three performance levels of the filter.

A method of making a water filtration device is also disclosed and comprises the steps of: attaching end caps to the filter; inserting the filter within a filter housing; aligning the filter within the filter housing; inserting a portion of a gate into corresponding receptacles on one end of one of the end caps previously affixed to the filter; inserting a sensor and electronic package into an open end of a filter housing end cap; affixing the filter housing end cap to the filter housing forming a chamber between a closed end of the filter housing end cap and the one end of one of the end caps; and, affixing a front housing to the filter housing. The step of attaching end caps to said filter may be performed with adhesive. And, the steps of affixing the end cap of the filter housing, affixing the filter housing end cap to the filter housing and affixing the front housing to the filter housing may be performed by an ultrasonic welding process or one of the other welding processes identified herein.

It is an object of the present invention to provide a water filtration device which is disposable and provides an indication as to when the filter should be disposed.

It is a further object of the present invention to provide a water filtration device which is small in size and which resides substantially rearwardly with respect to the faucet to which it is mounted.

It is a further object of the present invention to provide a water filtration device which is self-contained and which does not require maintenance and, in fact, which cannot be maintained because the parts thereof are non-removably affixed together or non-removably contained therein.

It is an object of the present invention to provide a water filtration device at reasonable cost which is disposable and which is faucet mounted.

It is an object of the present invention to provide a water filtration device which includes a swinging gate having a magnet therein which in combination with a sensor and an electronic package provides a visual indication as to the status or performance of the filter.

It is an object of the present invention to provide a water filtration device which includes two filtered outlets.

It is an object of the present invention to provide a water filtration device which includes a valved outlet with the valve operated by a lever.

It is an object of the present invention to provide a water filtration device which includes an outlet having a rotatably mounted fountain head.

It is an object of the present invention to provide a water filtration device which includes a lever actuated fountain.

These and additional objects will become apparent when reference is made to the Brief Description of the Drawings, Description of the Invention and claims which follow hereinbelow.

BRIEF DESCRIPTION OF THE DRAWINGS

FIG. 2A is a perspective view of a first embodiment of the water filtration device with the handle of the valve pulled forward.

In FIG. 3 the filter is not operating as no water is being directed into it.

FIG. 4A is a cross-sectional view of the front housing taken along the lines 4A-4A of FIG. 4.

FIG. 4B is a cross-sectional view of the front housing taken along the lines 4B-4B of FIG. 4.

FIG. 4C is a top view of the front housing of the first embodiment.

FIG. 5A is a front view of the filter housing of the first embodiment of the water filtration device.

FIG. 5B is a cross-sectional view of the filter housing taken along the lines 5B-5B of FIG. 5A.

FIG. 8 is a side view of the housing end cap.

FIG. 8A is a perspective view of the other side, i.e., the wetted side, of the housing end cap illustrated in FIG. 8.

FIG. 9 is a front view of the gate of the first embodiment.

FIG. 9A is a cross-sectional view taken along the lines 9A-9A of FIG. 9.

FIG. 11B is a top view of the plunger.

FIG. 11C is a cross-sectional view of the plunger taken along the lines 11C-11C of FIG. 11B.

FIG. 11D is a cross-sectional view taken along the lines 11D-11D of FIG. 11B.

FIG. 19B is a cross-sectional view taken along the lines 19B-19B of FIG. 19A.

FIG. 19C is a cross-sectional view taken along the lines 19C-19C of FIG. 19C.

FIG. 19D is a left side view, the open end view, of the filter housing of the second embodiment of the water filtration device.

FIG. 20 is a front side view of the end cap of the housing of the second embodiment of the water filtration device.

FIG. 20A is a right side view of the end cap of FIG. 20.

FIG. 20B is a perspective view of the end cap of FIG. 20.

A better understanding of the drawings will be had when reference is made to the Description of the Invention and claims which follow hereinbelow.

DESCRIPTION OF THE INVENTION

Figure 1:
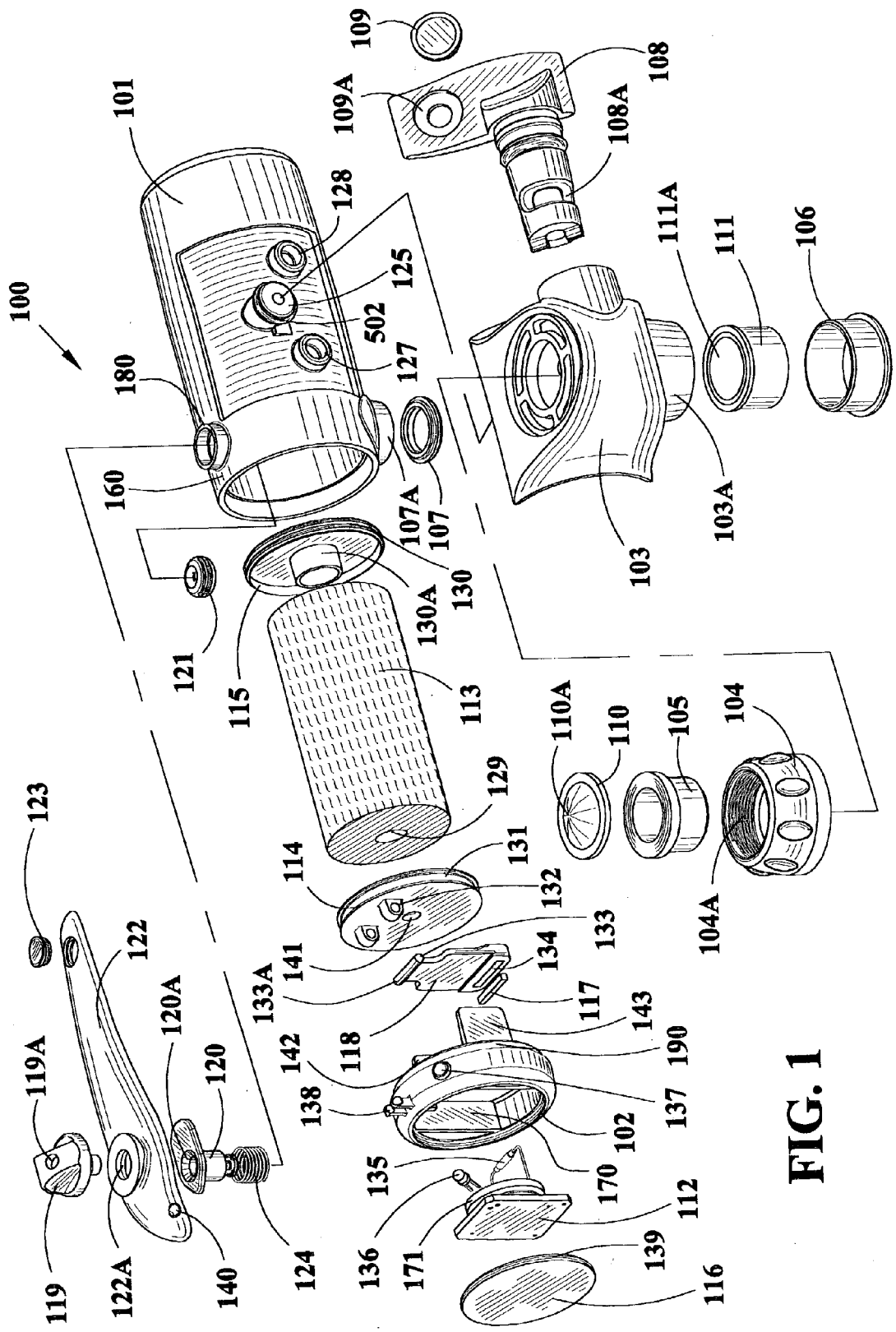
FIG. 1 is an exploded assembly view of a first embodiment of the water filtration device.

Referring to FIG. 1, an exploded assembly view of a first embodiment of the water filtration device 100, the various components of the single-use faucet mounted water filter are shown. Filter 113 is illustrated having a longitudinal bore 129 therethrough. Filter 113 is illustrated without a filter pre-wrap in this view but such a pre-wrap 495 is specifically within the scope of this invention and is illustrated in FIGS. 4G and 4H. The filter is preferably a carbon block but may be a fiber bundle or granular activated carbon. Further, the carbon block may include bacteriastic materials, ion exchange resins and zeolites to assist in its filtration activity. End caps 114 and 115 are affixed to said filter with a hot melt adhesive applied to the entire mating surfaces of end caps 114 and 115 including but not limited to the dowel portions thereof such as dowel 130A on right end cap 130. Once filter 113 is affixed to end caps of filter 114, 115, the subassembly is inserted into the filter housing 101. End caps 114, 115 include peripheral seal portions which seal annulus 301. See FIG. 3 for example. O-rings 375, 376 ensure that water entering annulus 301 flow through filter 113 and does not bypass the end caps 114, 115 and migrate into chamber 350. See, FIG. 3D. To ensure that the subassembly is properly oriented, gate hinges 132, 132A must be aligned in relation to a mark 160 on the filter housing as the subassembly is inserted into the filter housing 101. Gate hinges 132, 132A are properly positioned when their axis is parallel to the earth or parallel to a tangent of the earth's surface.

Figure 5:
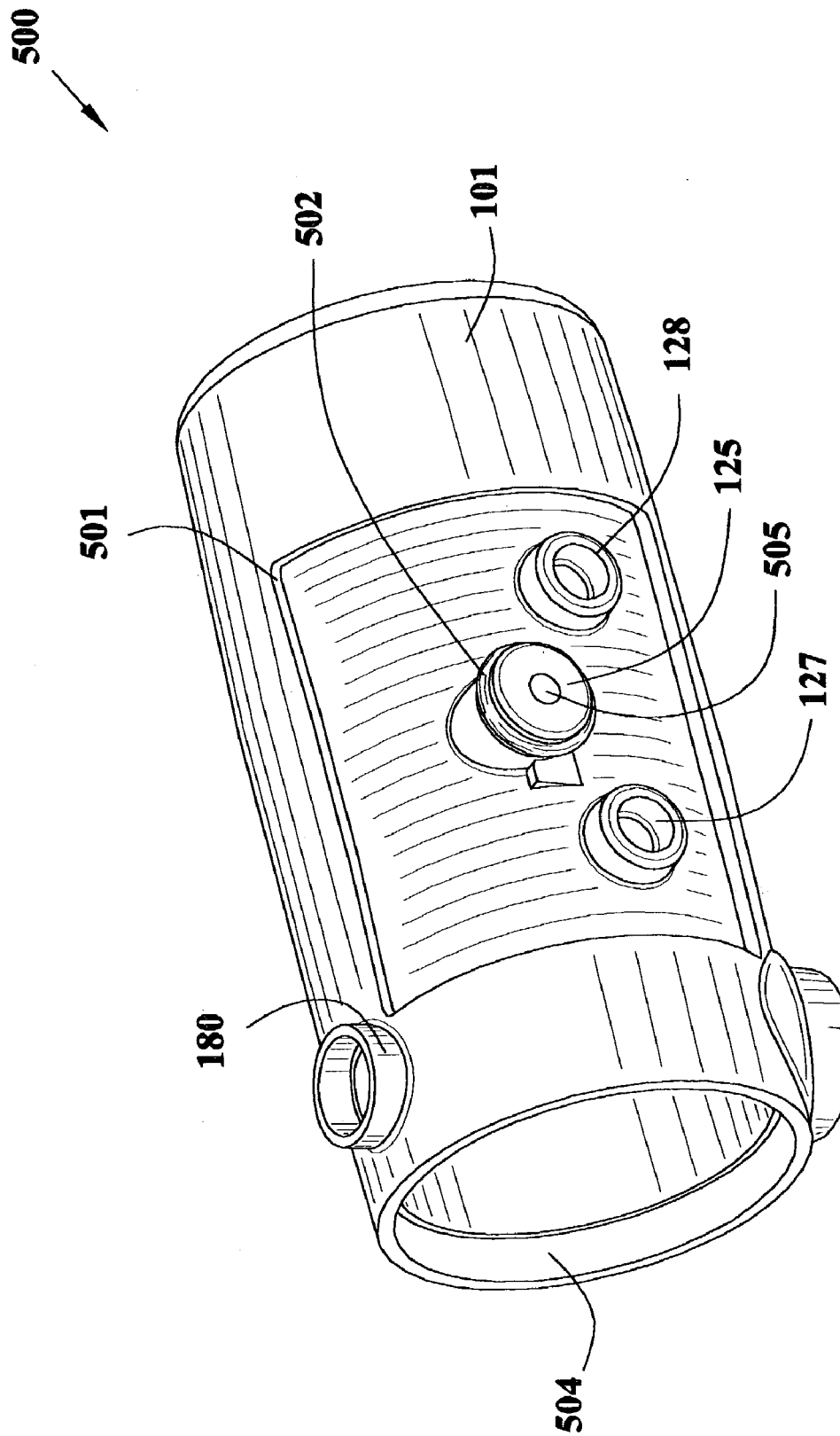
FIG. 5 is a front perspective view of the filter housing of the first embodiment of the water filtration device.
Figure 5D:
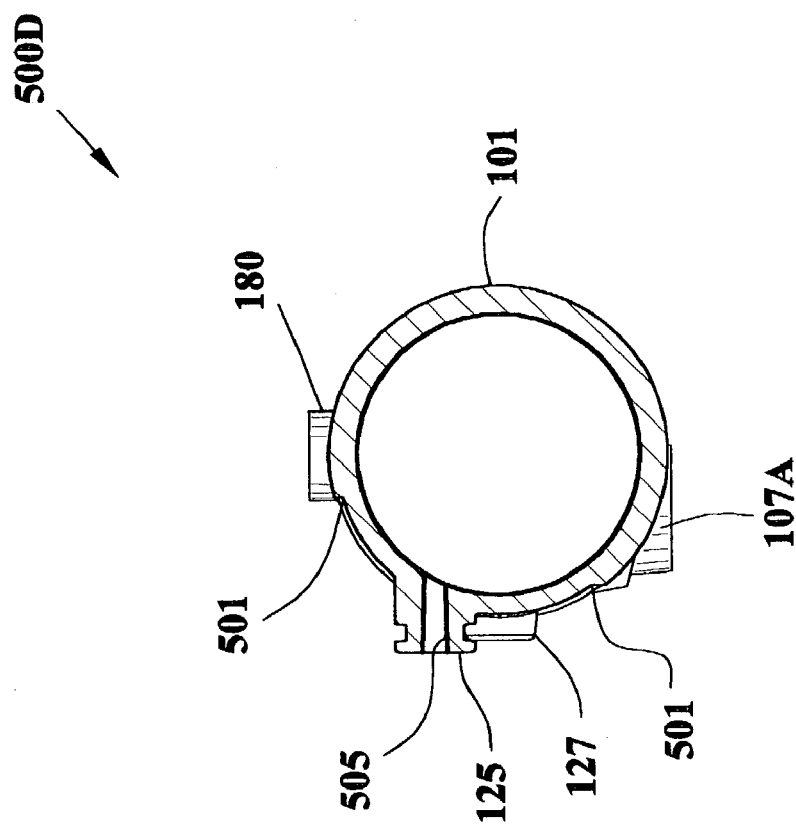
FIG. 5D is a cross-sectional view of the filter housing taken along the lines 5D-5D of FIG. 5A.
Figure 5C:
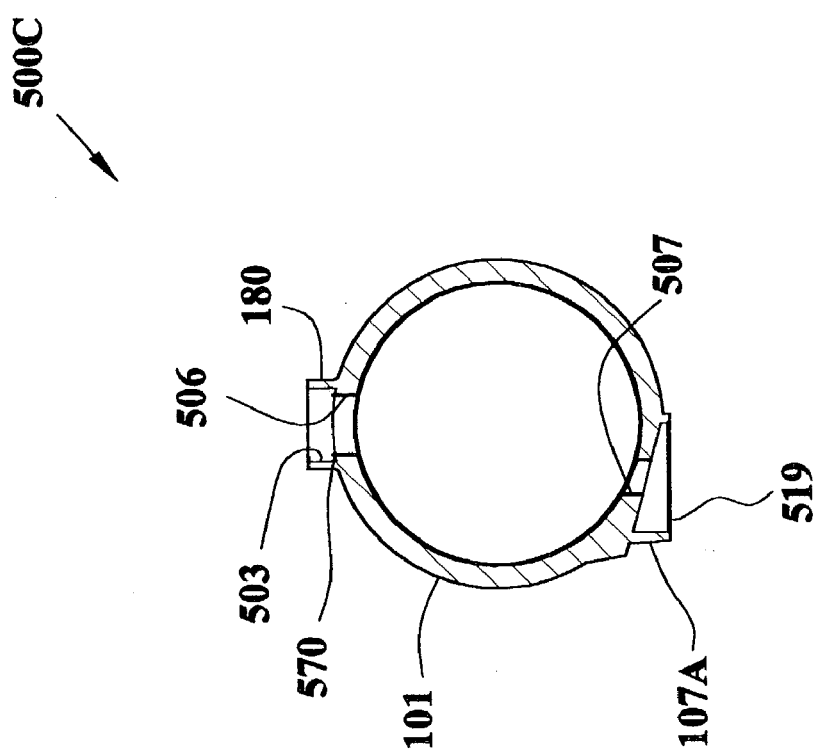
FIG. 5C is a cross-sectional view of the filter housing taken along the lines 5C-5C of FIG. 5A.
Figure 5F:
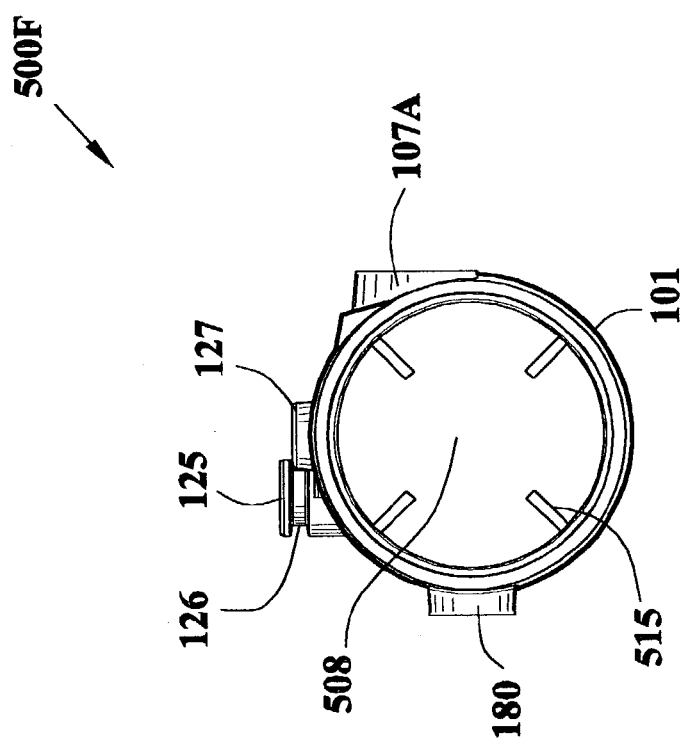
FIG. 5F is a left side view, the open end view, of the filter housing of the first embodiment of the water filtration device.

Referring to FIG. 5F, the left side view (open end view) of the filter housing 101 of the first embodiment of the water filtration device, the concave right side wall 508 of the filter housing 101 is illustrated along with molded ribs 515. In this the first embodiment the diameter of the filter housing 101 is approximately 1.6 inches and the length of the filter housing as viewed, for example, in FIGS. 5 and 5A, is approximately 4.2 inches. Other dimensions may be utilized in the construction of water filtration devices as taught herein without departing from the spirit and scope of the invention. When the filter subassembly is inserted into the filter housing the right end cap abuts ribs 515.

Gate 118 is rotatably affixed to gate hinges 132, 132A by inserting prongs or knobs 133, 133A in the hinges. Knobs or prongs 133, 133A are snap-fit into apertures in the hinges 132, 132A enabling rotation of the gate 118 when water pushes against it as it exits the filter. As will be explained in more detail hereinafter, gate 118 swings (rotates) in a clockwise direction about its axis of rotation (see FIGS. 3B and 3C) upon the application of pressure caused by water flow through the filter 113 and the longitudinal bore 129 therein.

Figure 2:
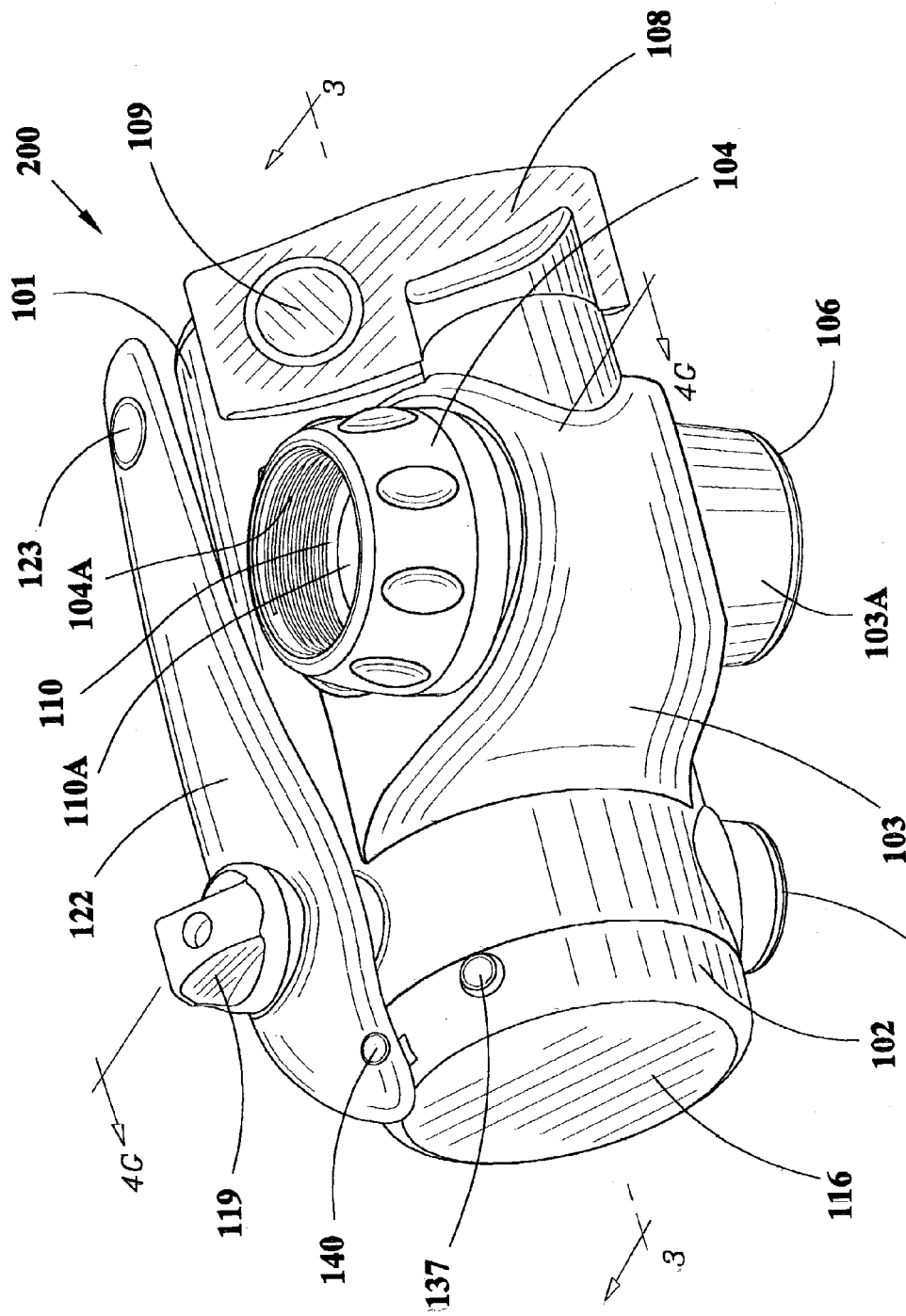
FIG. 2 is a perspective view of a first embodiment of the water filtration device.
Figure 3:
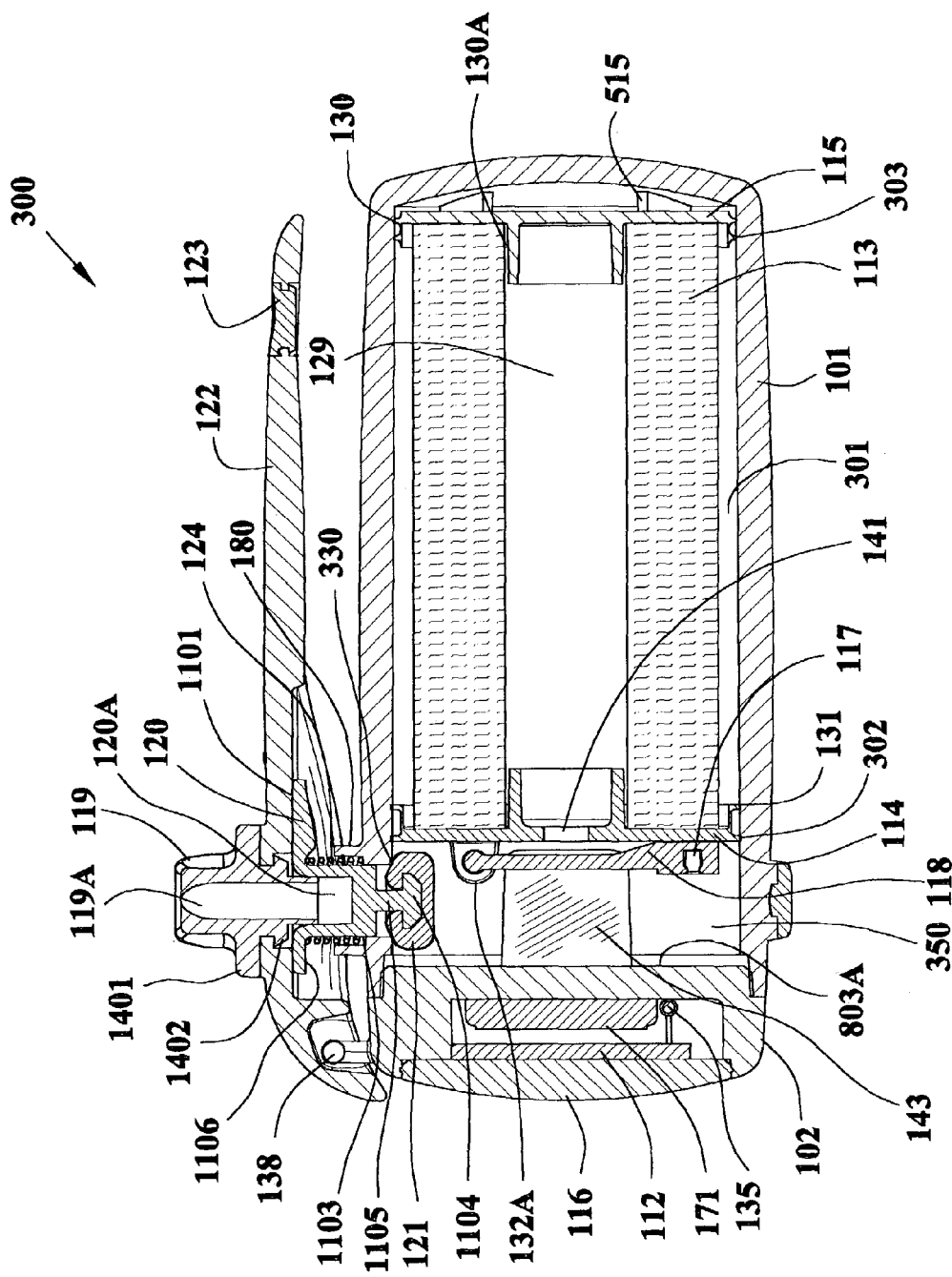
FIG. 3 is a cross-sectional view of the first embodiment of the water filtration device taken along the lines 3-3 of FIG. 2.
Figure 4:
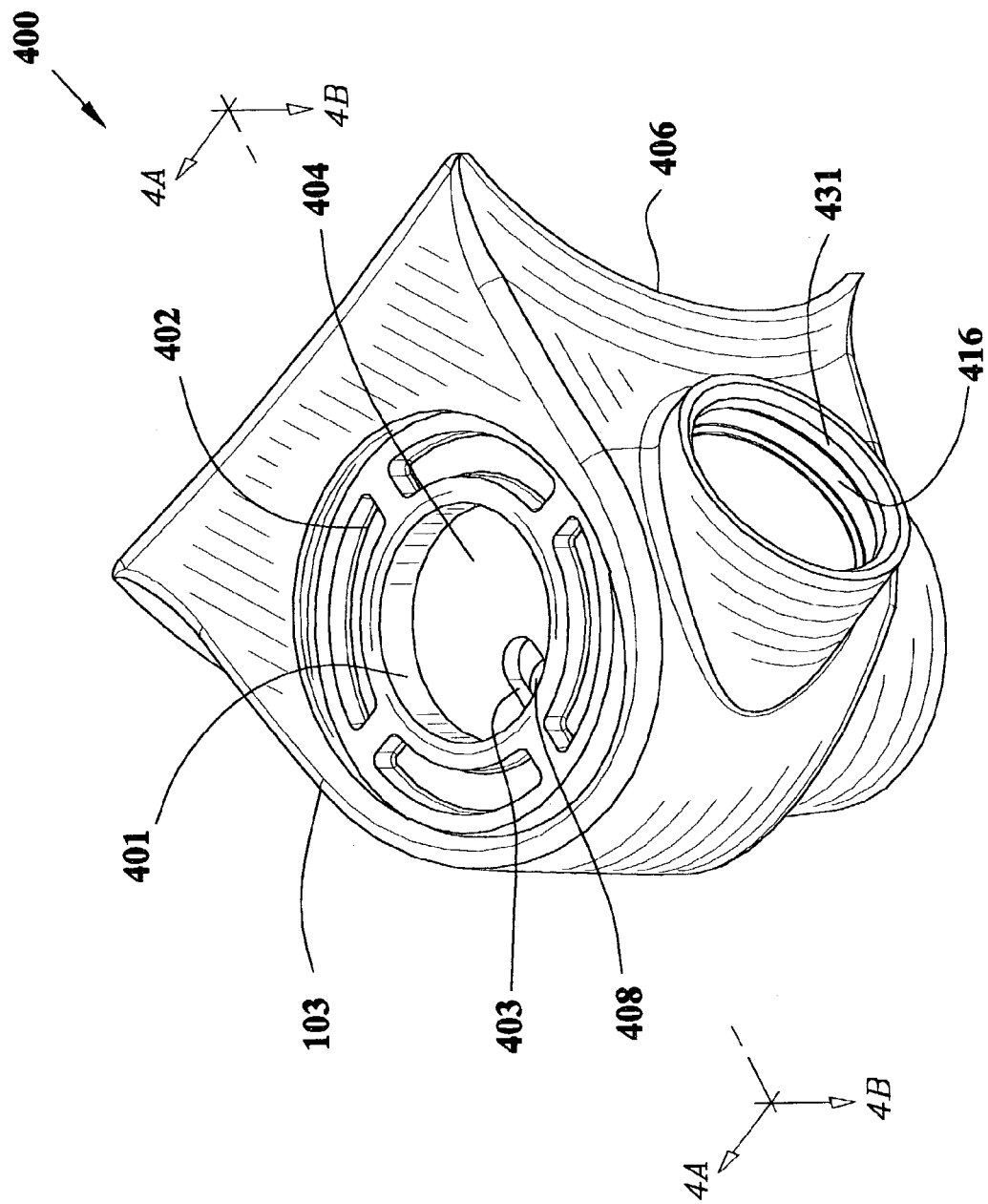
FIG. 4 is an enlargement of the front housing of the first embodiment of the water filtration device.

Referring to FIGS. 1 and 3, gate 118 includes a magnet 117 which is press fit into a recess 134 in the gate and hermetically sealed with either hot melt adhesive or potting compound. FIG. 3 is a cross-sectional view 300 of the first embodiment of the water filtration device taken along the lines 3-3 of FIG. 2. Presence or absence of magnet 117 is sensed by reed switch (reed relay) 135. Housing end cap 102 includes spacers 142 and 143. See FIG. 8A, a perspective view of the end cap to best view the spacer 142 which is not well illustrated in the exploded assembly view of FIG. 1. Spacers 142, 143 assist in correctly spacing the housing end cap 102 with respect to the left end cap 114 of the filter. Once housing end cap 102 is inserted into the filter housing 101, spacers 142, 143 ensure that the filter subassembly comprising the filter 113, left end cap 114 and right end cap 115 does not migrate leftwardly (See FIG. 3) too far and remains in proximity to the mold ribs 515 of the interior of the housing. Housing end cap 102 includes a tapered portion 190 for insertion into the filter housing 101. A chamber is formed between the end cap 114 and the closed end 803A of the housing end cap 102. See, FIG. 3. Water is expelled from passageway 141 in the left end cap 114 of the filter housing and exerts a force against gate 118 causing it to rotate in a clockwise direction. As gate 118 rotates in the clockwise direction the magnet 117 is urged toward the reed switch 135 (reed relay) causing it to effectively close which starts the electronic timer within electronic package 112 to continuously measure the time when the magnet 117 is in proximity to the switch. The electronic package (electric circuit or integrated circuit) measures the cumulative time of flow through the filter and outputs signals to the light emitting diode (LED) indicating filter performance. The LED indicates three colors representative of cumulative filter usage one of which indicates that the water filtration device should be discarded. The electric circuit outputs three discrete signals to the light emitting diode.

The electronic package is secured in a dry well 170 which in turn is secured and closed by end plate 116. After the housing end cap 102 is installed it is welded to the filter housing 101. The end plate 116 is glued or ultrasonically welded to the housing end cap 102. That is, the housing end cap 102 is welded to the filter housing and the end plate 116 is welded or glued to the housing end cap 102. Reference numeral 139 represents the raised portions of the end plate 116 which are ultrasonically welded or glued to the housing end cap 102.

Referring to FIG. 3 again, reference numerals 302, 303, 130, 131 signify peripheral edges or portions of the end caps 114, 115 of the filter which slidingly engage and seal against the interior walls of the filter housing 101. Referring to FIG. 3D, elastomeric seal 375 acts as an additional optional seal which resides between peripheral edge portions 302 and 131 and elastomeric seal 376 acts as an additional optional seal which resides between peripheral edge portions 303 and 130.

Still referring to FIG. 1, aperture 137 permits light emitting diode 136 which stems from the electronic package 112 to pass therethrough. A small amount of potting compound may be used around the light emitting diode to seal any space between the diode and the aperture 137 when the light emitting diode is installed in place. The electronic package 112 and the substrate upon which the electronics are mounted are housed in a dry space in the housing end cap 102.

Referring to FIGS. 1 and 5, the filter housing 101 including its inlet 125, filtered outlet 107A, and filtered outlet 180 are illustrated. Filtered outlet 107A always expels filtered water whenever water enters the filter housing inlet 125. See, FIG. 4H. Inlet 125 is generally cylindrically shaped and includes a recess 126 for receiving an O-ring seal 502 and a passageway 505 for conducting unfiltered water to the interior of the filter housing so that it can be filtered by filter 113. Filter 113 is a carbon block filter and it is necessary that the water to be filtered have a certain residence time in contact with the filter so that impurities therein can be removed.

The preferred materials of the front housing 103, filter housing 101 and housing end cap 102 are ABS (acrylonitrile butadiene styrene) plastic although other plastics may be used. The preferred adhesive to be used for securing the end caps 114, 115 to the filter is a hot melt adhesive. The gate material is HDPE (high density polyethylene). End caps 114, 115 are also HDPE and the material used for sealing. Lever 122 is preferably an acetyl material.

FIG. 5 is a front perspective view 500 of the filter housing 101 of the first embodiment of the water filtration device, i.e., a bathroom filter. FIG. 5 illustrates an inlet surface 504 adapted to receive a corresponding mating surface 190 from the housing end cap 102. See, FIG. 1 to identify the corresponding mating surface 190 on the housing end cap 102.

Referring again to FIG. 5, the filter housing 101 includes a recessed region 501 for receiving the front housing 103 as best seen in FIGS. 1, 2 and 4G. Engagement pins 127, 128 assist in positioning the front housing 103 with respect to the recessed region 501 for ultrasonic welding thereto. It is the ultrasonic welding of the front housing 103 to the filter housing which secures the parts together and makes them into an integral unit.

Figure 4D:
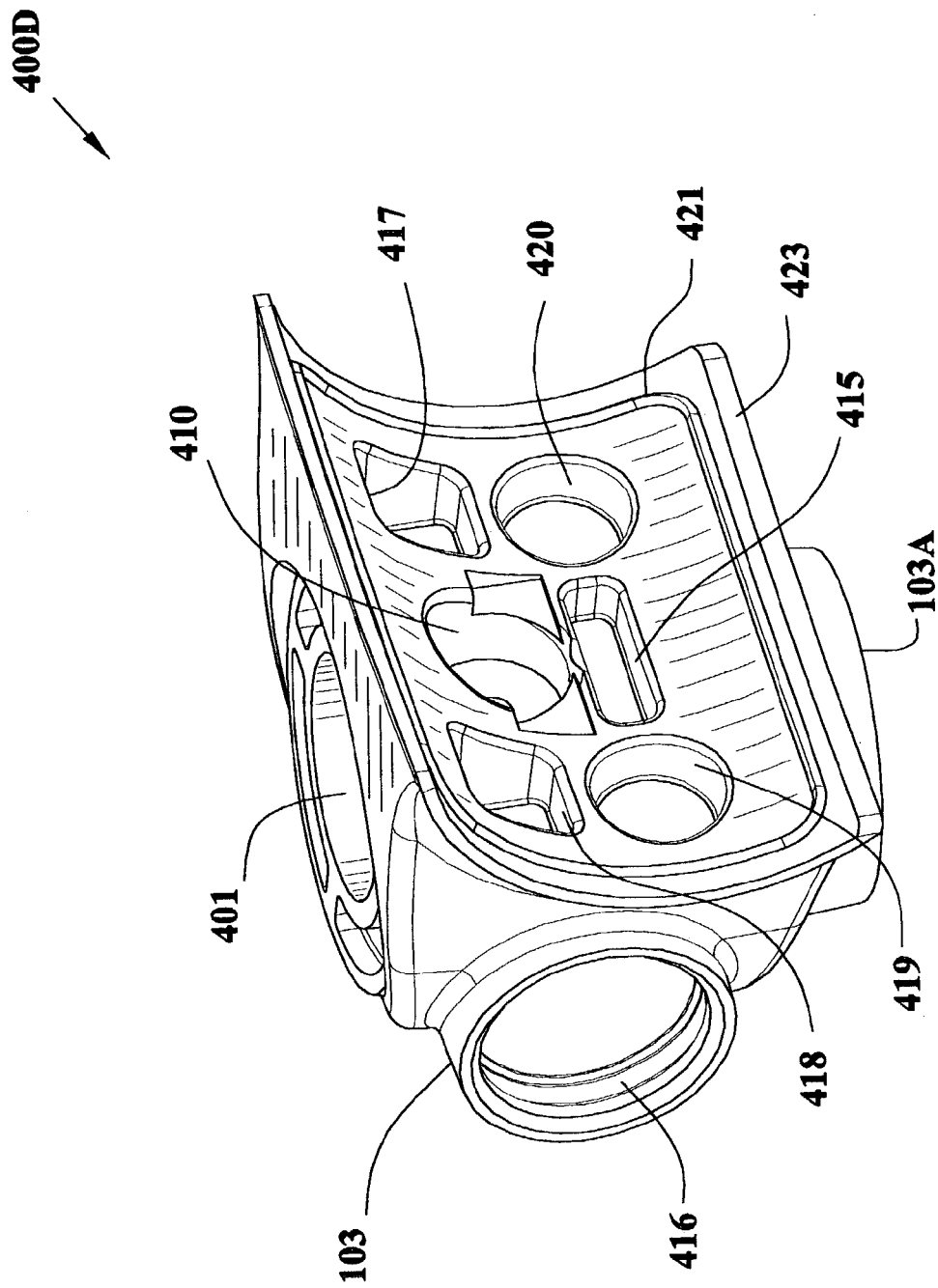
FIG. 4D is an enlarged rear perspective view of the front housing of the first embodiment.
Figure 4F:
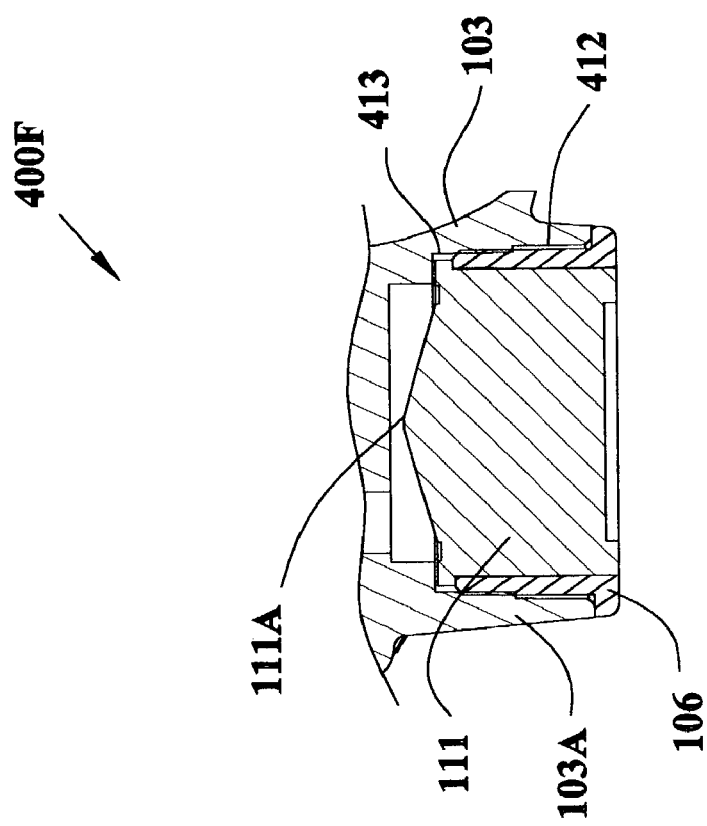
FIG. 4F is a cross-sectional view of the aerator mounted into the front housing.

Pins 127, 128 fit snugly into corresponding receptacles 420, 419 in the front housing. Referring to FIG. 4D, a rear perspective view 400D of the front housing of the first embodiment (bathroom filter) is illustrated along with the receptacles 420, 419. Reference numerals 415, 417 and 418 indicate mold cavities which are formed as a part of the molding process of the front housing 103. Joint 421 is welded to the filter housing 101. Further, referring to FIGS. 4G and 5, O-ring seal 502 which resides in recess 126 mates with cylindrical recess 410 in the front housing 103 as illustrated in FIG. 4D to prevent leakage of water as it is being directed into the filter housing as will be explained hereinbelow.

FIG. 5A is a front view 500A of the filter housing 101 of the first embodiment of the water filtration device. The right end 508 is closed and is convexly shaped when viewed from the outside of the filter housing. Viewing the interior of the right end 508 as in FIG. 5F, it is shaped concavely. During assembly of the device, the water filter 113 with end caps attached thereto is inserted from the left side, the open side, of the filter housing 101.

FIG. 5B is a cross-sectional view 500B of the filter housing taken along the lines 5B-5B of FIG. 5A. FIG. 5B provides a good illustration of recess 126 in inlet 125 and of pin 128. Outlets 180 and 107A are also illustrated in FIG. 5B.

FIG. 5C is a cross-sectional view 500C of the filter housing taken along the lines 5C-5C of FIG. 5A. Outlet port 180 is illustrated in cross-section as having two diametrical sections 503 and 506. Likewise, outlet port 107A is illustrated as having two diametrical sections 519 and 507.

FIG. 5D is a cross-sectional view 500D of the filter housing taken along the lines 5D-5D of FIG. 5A. FIG. 5D illustrates the recessed region 501 in filter housing 101. Also illustrated in FIG. 5D is the inlet 125 having passageway 505 therein.

Figure 5E:
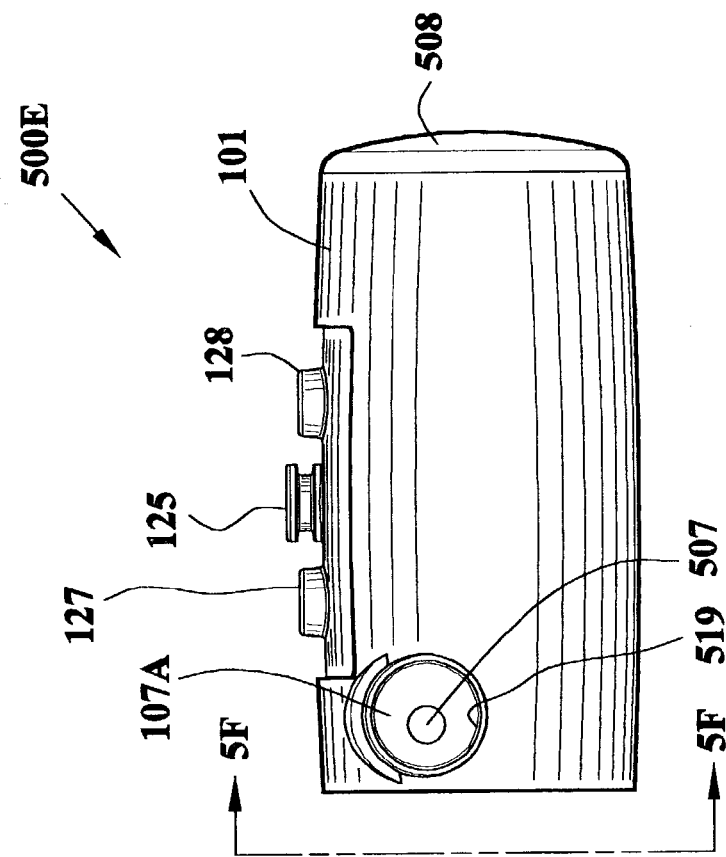
FIG. 5E is a bottom view of the filter housing of the first embodiment of the water filtration device.

FIG. 5E is a bottom view 500E of the filter housing of the first embodiment of the water filtration device illustrating diametrical portions 507, 519 of outlet 107A. FIG. 5E illustrates that outlet 107A resides generally forwardly in the filter housing. Outlet 107A includes spout 107 which is affixed through an ultrasonic weld or by gluing same to the filter housing 101. See, FIG. 1.

Figure 4E:
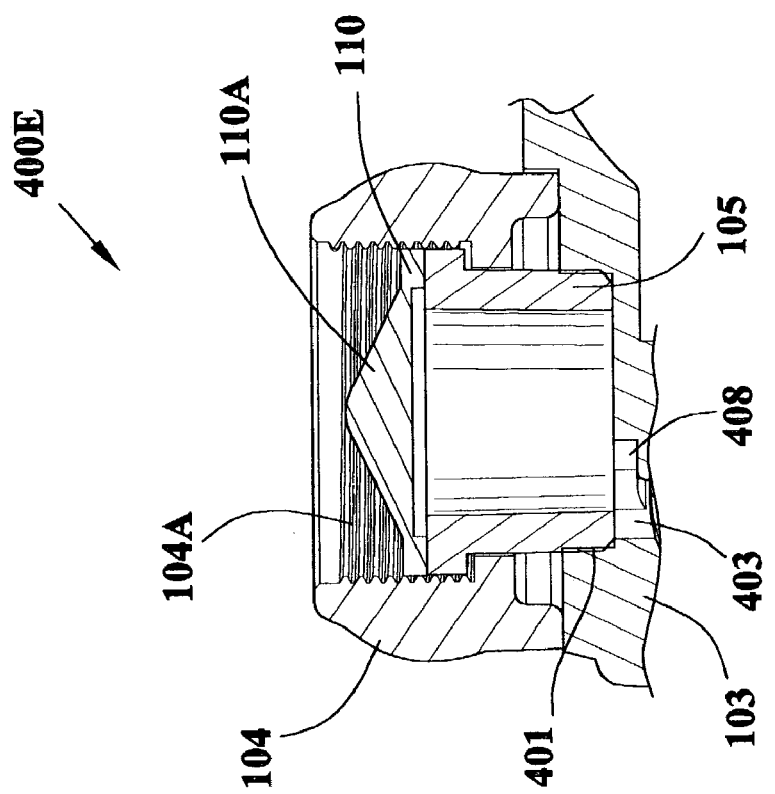
FIG. 4E is a cross-sectional view of the rotatable collar (faucet adapter) and the lock collar which is secured to the front housing.
Figure 4G:
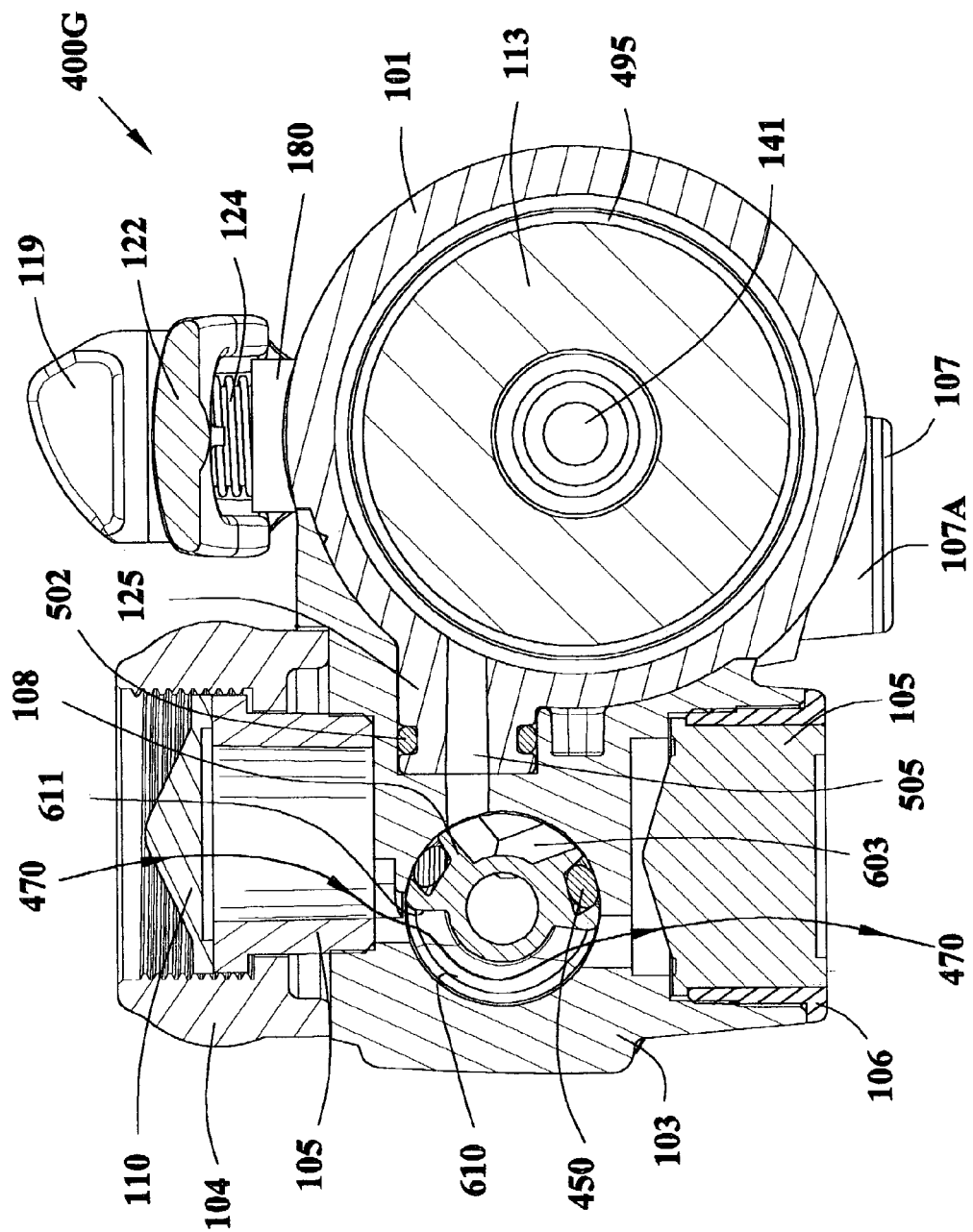
FIG. 4G is a cross-sectional view taken along the lines 4G-4G of FIG. 2 with the flow diverter valve inserted in the front housing in a first position, bypass position.
Figure 4H:
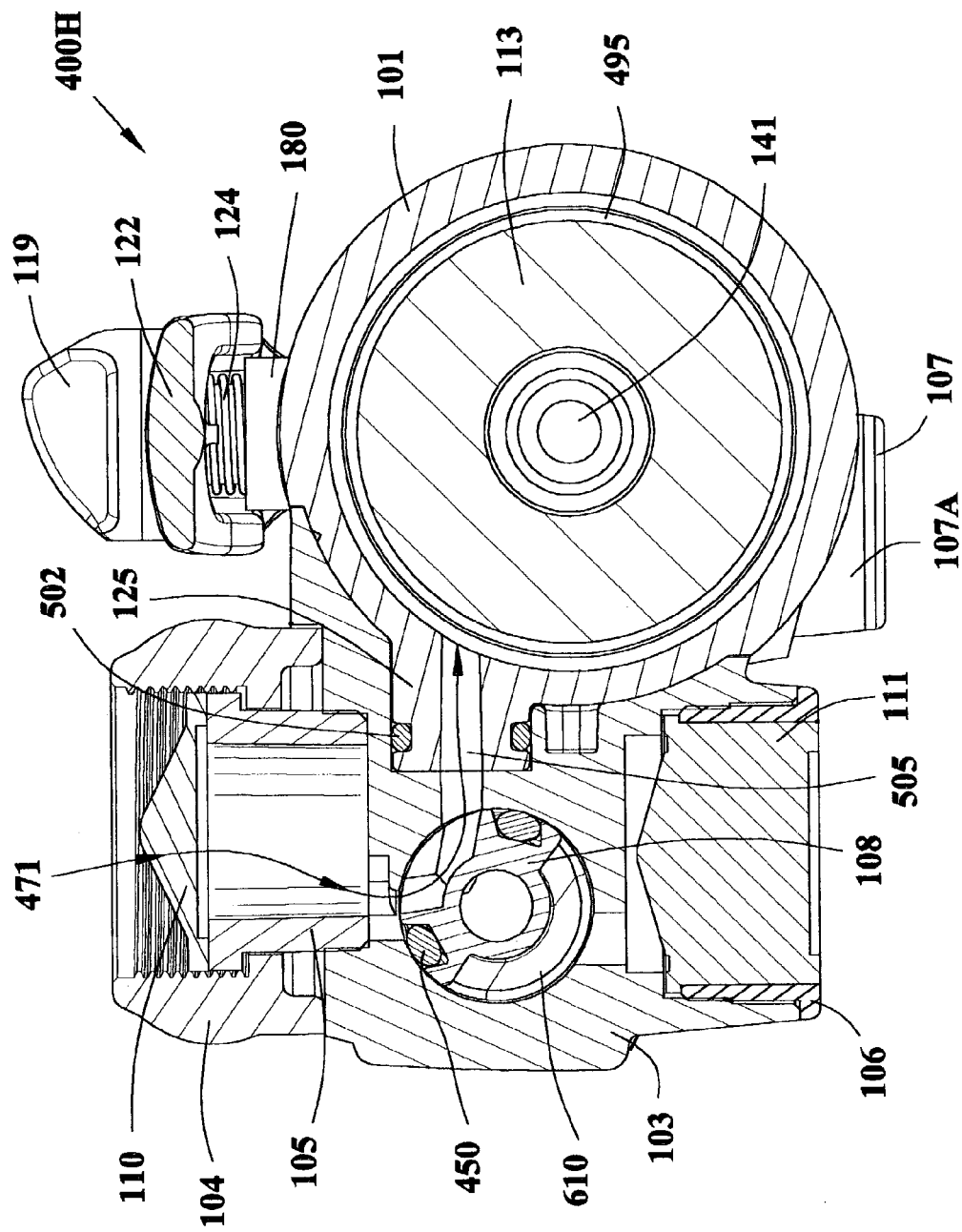
FIG. 4H is a cross-sectional view taken along the lines 4H-4H of FIG. 2A with the flow diverter valve inserted in the front housing in a second position which directs flow into the filter.

FIG. 2 is a perspective view 200 of a first embodiment of the water filtration device. Referring to FIGS. 1, 2, 4, and 4E, collar lock 105 is inserted within collar 104 and is welded to surface 401 of front housing 103. FIG. 4 is an enlargement 400 of the front housing of the first embodiment of the water filtration device. FIG. 4E is a cross-sectional view 400E of the collar 104, collar lock 105 and screen 110. Screen 110 includes an elastomeric generally circular periphery and a convexly shaped screen portion 110A. Collar 104 may rotate with respect to collar lock 105 in the connection and disconnection process with a faucet. The faucet (not shown) seals on the elastomeric portion of the screen 110. Screen 110 assists in removing large particulate matter.

Referring still to FIG. 2, front housing 103 is illustrated in its assembled condition welded to the filter housing 101. Valve and valve handle 108 are illustrated in the first or bypass position. FIG. 4G is a cross-sectional view 400G taken along the lines 4G-4G of FIG. 2 with the flow diverter valve 108 inserted in the front housing in a first position, bypass position. Flow arrow 470 indicates the path flow will take through the front housing when the water bypasses the filter. FIG. 4H is a cross-sectional view 400H taken along the lines 4H-4H of FIG. 2A with the flow diverter valve 108 inserted in the front housing in a second position which directs flow into the filter. Flow arrow 471 indicates the path of flow through the front housing when the diverter valve 108 is rotated counterclockwise when viewing FIG. 4H to a second position. Referring to FIG. 2A, valve and valve handle 108 are pulled forward to the second position when it is desired to filter the water.

Referring again to FIGS. 4G and H, elastomeric seal 450 is illustrated as sealing passageways 603 and 610 in valve 108. Passageway 610 is formed by wall 611 and passageway 603 is formed by wall 605 which is horn shaped. See, FIG. 6, a perspective view 600 of the valve and its handle 108 which are used in both the first embodiment and the second embodiment of the water filtration device. The handle portion of the valve includes an insert 109 which may glued to a corresponding recess 109A in the handle. See, FIG. 1.

FIG. 4A is a cross-sectional view 400A taken along the lines 4A-4A of FIG. 4 illustrating the generally cylindrical wall 401 to which the collar lock 105 is welded. FIG. 4E is a cross-sectional view 400E illustrating the collar lock 105 secured to the wall 401 with the collar 104 being rotatable and movable slightly vertically for engagement with a faucet. Screen 110 is also illustrated in FIG. 4A.

Referring again to FIG. 4A, valve 108 is not shown therein so as to view the valve stop 407 which controls the rotation of the valve between its first (bypass position) and its second (filter) position. Valve cavity 430 is tapered as it extends inwardly as indicated by circular lines 412 and 431. See, FIGS. 4A and 4B. Ports 403 and 408 join to form a water inlet to the valve cavity 430. Water outlet 409 conveys water to be filtered when the front housing is nonremovably affixed to the filter housing 101 and the valve 108 is in its second position. FIG. 4B is a cross-sectional view 400B taken along the lines 4B-4B of FIG. 4 and also illustrates the taper of valve cavity 430.

Figure 6A:
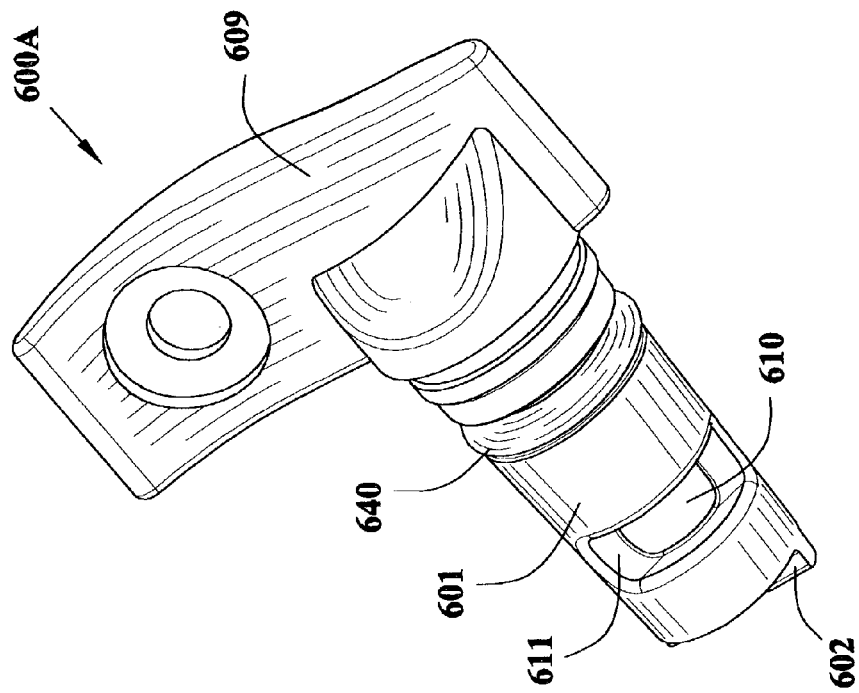
FIG. 6A is a perspective view of the other side of the valve and its handle of FIG. 6.
Figure 6:
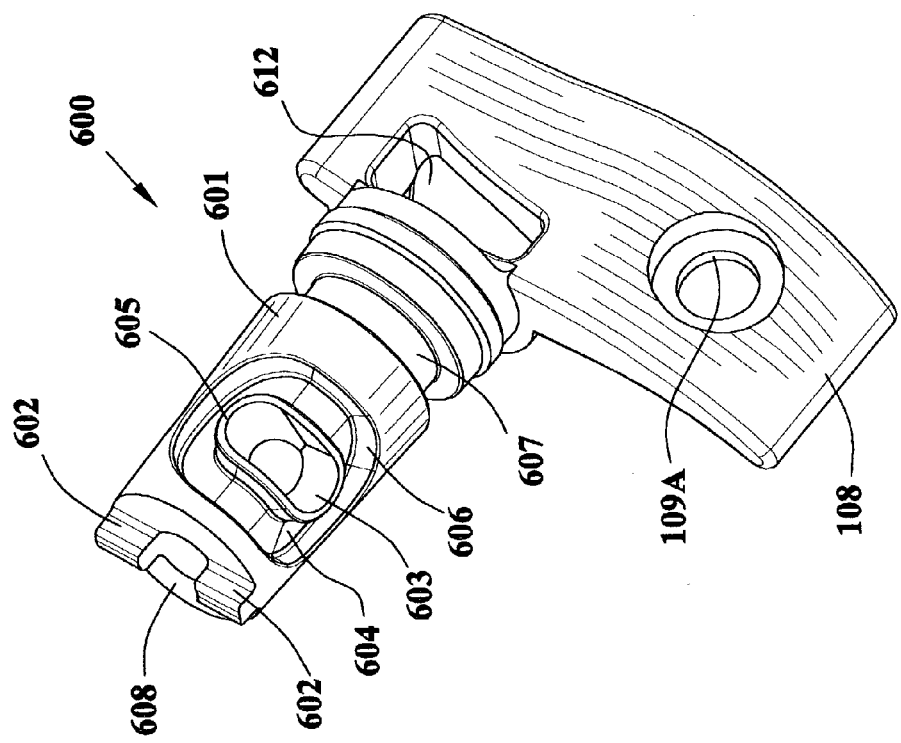
FIG. 6 is a perspective view of the valve and its handle which are used in both the first embodiment and the second embodiment of the water filtration device.

Referring again to FIGS. 4A and 4B, recess 416 is illustrated for receiving a seal 640 on the valve 108 illustrated in FIG. 6. Bypass port or passageway 414 is illustrated in FIGS. 4A and 4B. Stop 407 is also illustrated in FIG. 4B as is recess 410 for receiving inlet 125 of the filter housing 101. Referring to FIG. 4A mold aperture 415 from the molding process is illustrated in cross section. FIG. 4C is a top view 400C of the front housing 103 of the first embodiment and also illustrates the ports 403 and 408.

FIG. 4 is an enlargement 400 of the front housing 103 of the first embodiment of the water filtration device illustrating wall 401 to which the collar lock 105 is welded. Ports 403, 408 in floor 404 are shown in the top of the housing as are mold openings 402. Recess 416 in valve cavity 431 is shown as is rim 406 which is welded to the filter housing 101. Recess 416 receives seal 640 on valve 108 so as to prevent leakage about valve 108.

Referring again to FIGS. 1 and 4A, bottom portion 103A of the front housing is illustrated along with bore 422 having stepped portions 429 and 413. Bore 422 receives aerator assembly 111/111A and spout 106 secures the aerator assembly in place as it is welded to the bottom portion 103A of the housing 103. See, FIG. 4F, a cross-sectional view 400F of the aerator assembly 111/111A mounted into the front housing.

Referring to FIGS. 3-3D, reference numerals 302, 303, 131, and 130 indicate sliding engagement of the filter end caps 114, 115 with the filter housing 101. Referring again to FIGS. 1 and 3, second outlet 180 in the filter housing 101 is disclosed. Alignment mark 160 is also illustrated well in FIG. 1 and it is this mark which is used during assembly to ensure that the left filter end cap 114 and hinges 132/132A are positioned such that the axis of the hinges are parallel to the earth enabling gate 118 to swing freely upon the application of pressure thereto and not to bind. Plunger 120 having a passageway 120A therein fits somewhat snugly within second outlet 180 and is slidingly movable therein. Lever 122 resides in engagement with the plunger 120 such that the plunger 120 and lever 122 move together. Referring to FIG. 2, lever 122 is hinged and pivotal on prongs or protrusions 138 of the housing end cap 102. Like lever 108, lever 122 has a decorative insert 123 which resides in a corresponding recess. Fountain head 119 resides in and through passageway 122A in lever 122. Fountain 119 includes a passageway 119A in communication with passageway 120A in plunger 120. Passageway 120A is exposed to fluid under pressure in chamber 350 when the plunger is depressed by lever 122.

Plunger 120 includes a shoe portion 1104. FIG. 11 is a perspective view 1100 of the plunger 120 used in conjunction with the lever 122 and elastomeric ball valve 121. Plunger 120 includes a cylindrical portion 1103 and a shaft 1105 with a shoe 1104 on the end thereof A flat extending portion 1101 of the plunger resides against a corresponding surface of the lever 122. A taper 1102 leads to passageway 120A.

Figure 11A:
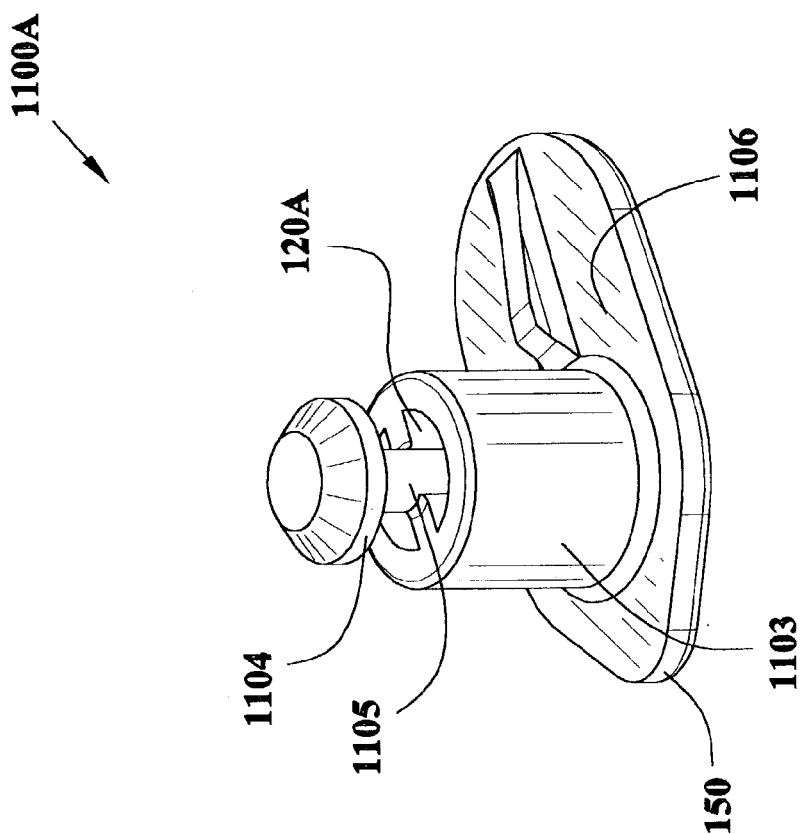
FIG. 11A is a another perspective view of the plunger used in conjunction with the lever and elastomeric ball valve.
Figure 11:
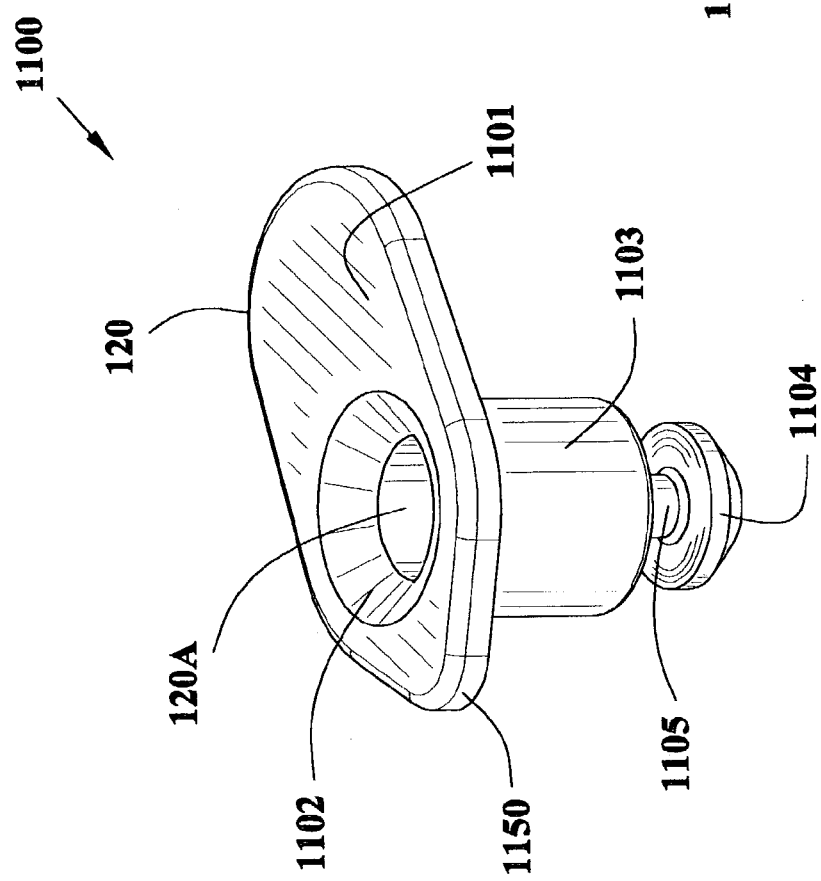
FIG. 11 is a perspective view of the plunger used in conjunction with the lever and elastomeric ball valve.

FIG. 11A is a another perspective view 1100A of the bottom side of the plunger 120 used in conjunction with the lever 122 and elastomeric ball valve 121. Contoured side edge portion 1150 of plunger 120 engages lever 122, Passageway 120A and bottom side 1106 of the flat extending portion 1101 are best viewed in FIG. 11A. Spring 124 is operable between the bottom side 1106 of plunger and a lip 570 of the filter housing. See FIG. 3, a cross-sectional view 300 of the first embodiment of the water filtration device taken along the lines 3-3 of FIG. 2. In FIG. 3, the filter is not operating meaning that the diverter valve 108 is in the bypass (first) position.

FIG. 11B is a top view 1100B of the plunger 120 illustrating the passageway 120A. FIG. 11C is a cross-sectional view 1100C of the plunger 120 taken along the lines 11C-11C of FIG. 1B. FIG. 1D is a cross-sectional view 1100D taken along the lines 11D-11D of FIG. 1B.

Figure 12A:
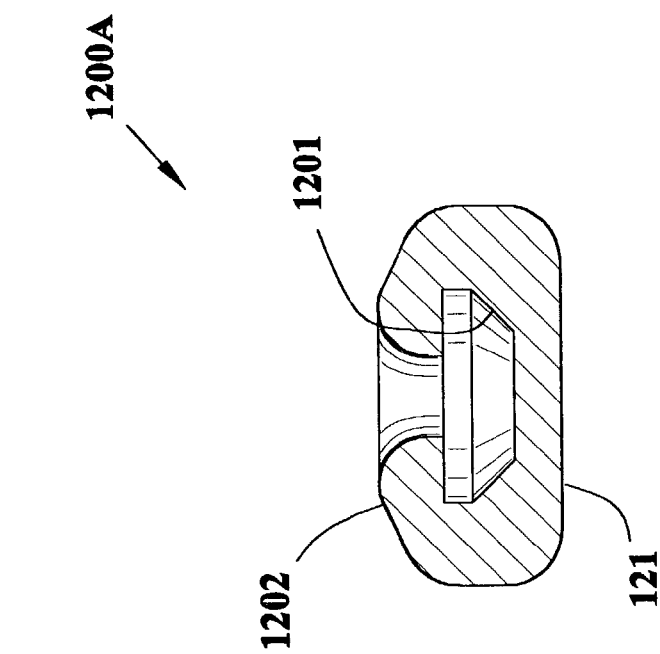
FIG. 12A is a cross-sectional view taken along the lines 12A-12A of FIG. 12.
Figure 12:
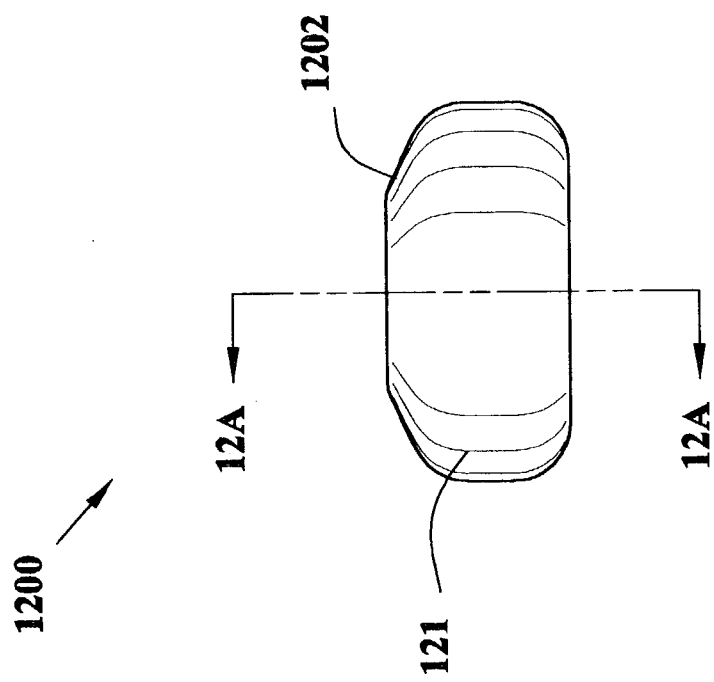
FIG. 12 is a front view of the ball valve.

FIG. 12 is a front view 1200 of the ball valve 121. FIG. 12A is a cross sectional view 1200A taken along the lines 12A-12A of FIG. 12. Shoe 1104 is covered by elastomeric valve 121 which includes a cavity which is substantially reciprocally shaped to the shape of the shoe. Elastomeric valve of boot 121 includes a surface 1202 which engages the interior of the filter housing around passageway 506. See, FIGS. 5C and 3.

Figure 3A:
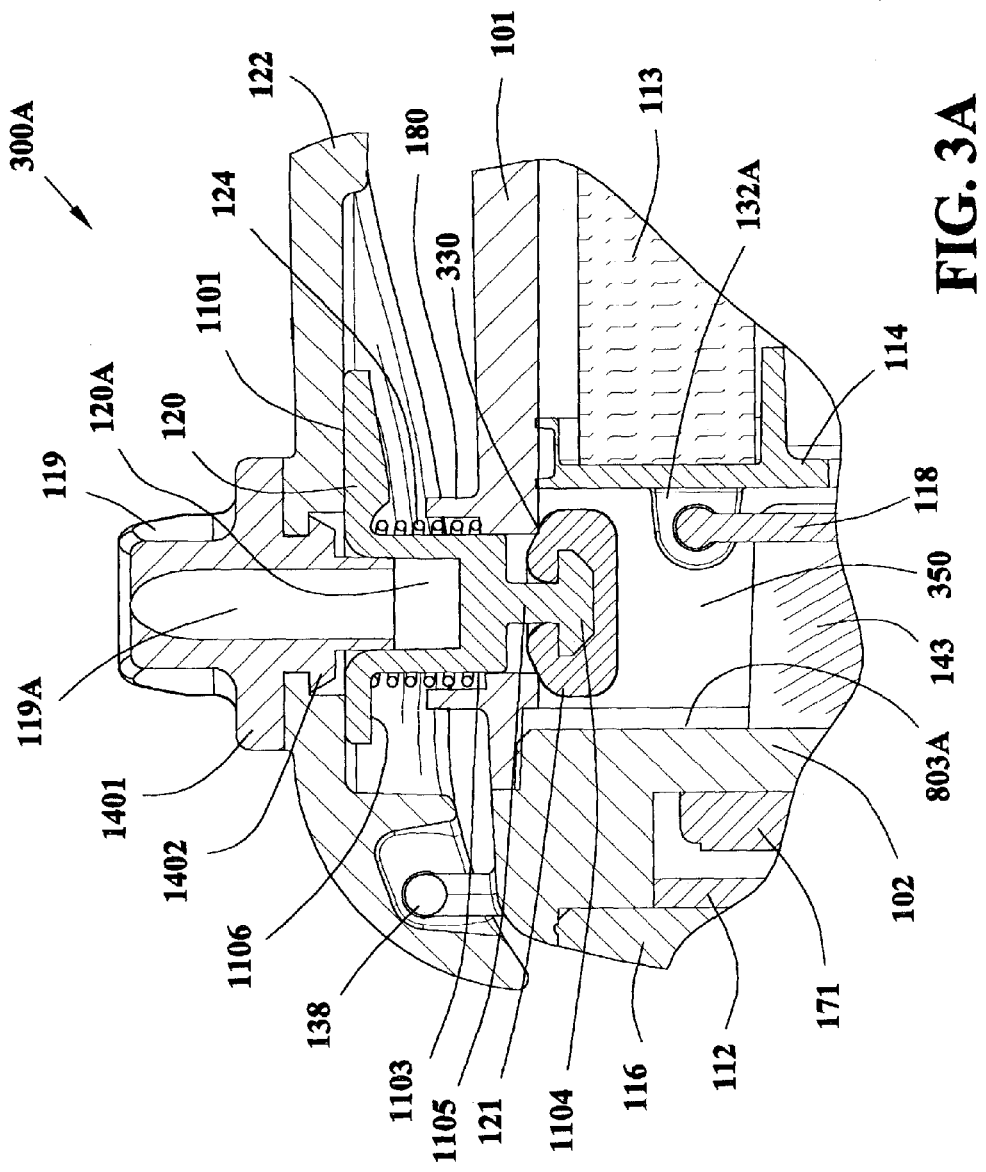
FIG. 3A is an enlargement of a portion of FIG. 3.

FIG. 3A is an enlargement 300A of a portion of FIG. 3 illustrating the valve 121 engaged with the inner wall of housing 101. Spring 124 is operable between filter housing 101 and plunger 120 and urges the plunger and the lever upwardly when viewing FIGS. 3 and 3A.

Still referring to FIG. 3, an annular space 301 between the filter 113 and the filter housing 101 is illustrated. Water occupies this annular space 301 during operation of the filter. Water resides in this annulus and flows through filter 113 into passageway 129 and out port 141 impinging upon gate 118 rotating it clockwise. When the water filtration device of the first embodiment is operable, water will be expelled from both outlets 107A and 180 if lever 122 is depressed. If the lever is not depressed then elastomeric valve 121 is seated against the curved inner surface of the filter housing 101 and water will be expelled just from the outlet 107A. Valve 121 is preferably elastomeric but may be made of other materials such as metal. Similarly, the filter housing may be made of metal if desired and the valve can be made of metal as well. FIG. 3 illustrates spacer 142 extending from the closed end 803A of housing end cap 102 near the filter left end cap 114. FIG. 8 is a side view 800 of housing end cap 102. Closed end. 803 is a wall or boundary between the wetted chamber 350 and the electronic package 112 and sensor 135., Guide ribs 801, 802 and 810 enable placement of the generally-rectangularly shaped electronic package within the drywell 811 of the housing end cap 102. End plate 116 fits over the opening 811 of the end cap and is either welded or glued 139 to the end cap for hermetic sealing thereof. During assembly the light emitting diode 136 is carefully placed within the aperture 137 first followed by the electronic package 112 which is placed within opening 811. FIG. 8A is a perspective view 800A of the other side, i.e., the wetted side, of the end cap illustrated in FIG. 8. Sloped surface 190 which is welded to filter housing 101 is illustrated in FIG. 8A.

Figure 3B:
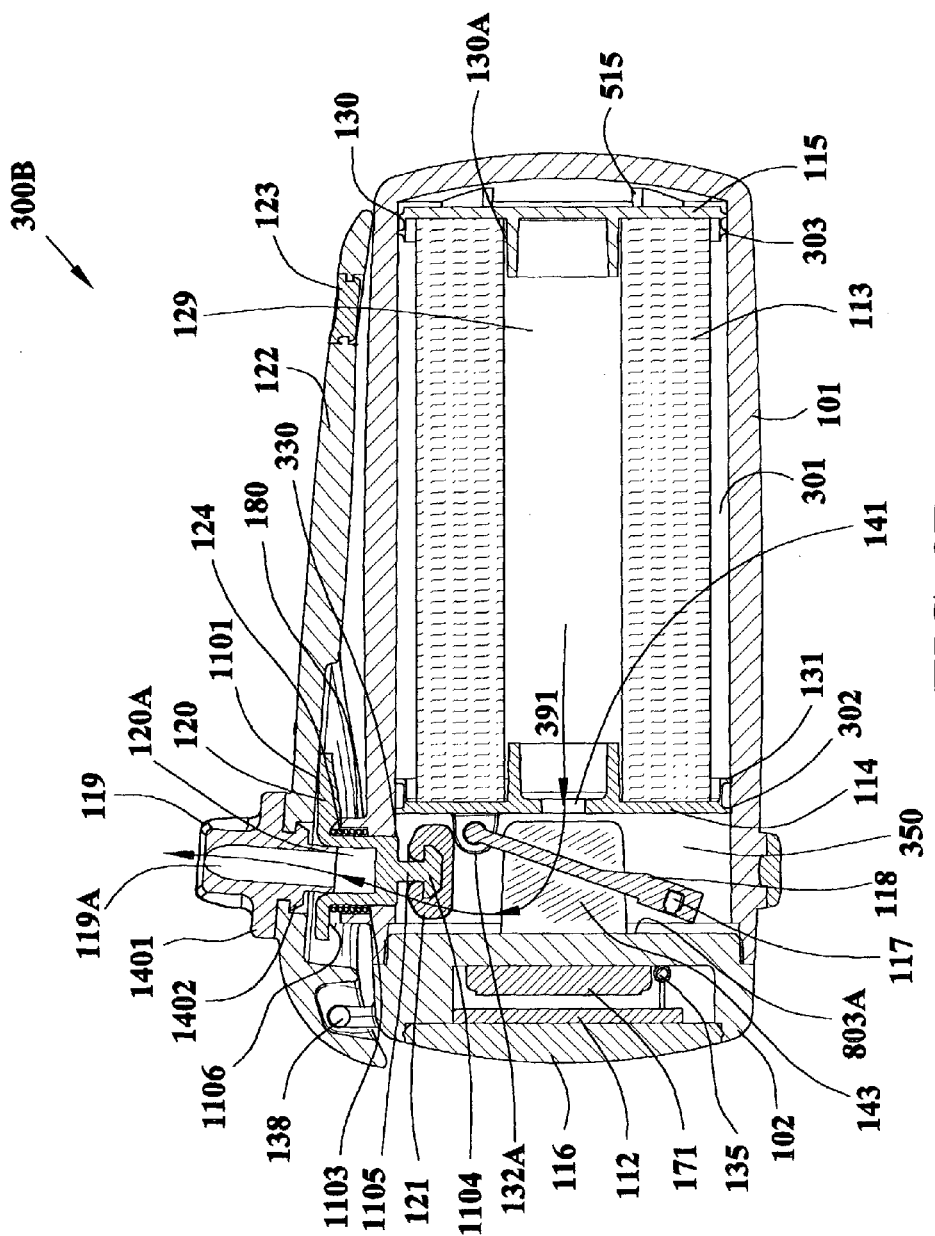
FIG. 3B is a cross-sectional view of the first embodiment of the water filtration device with the fountain lever depressed and with water flowing through the filter.
Figure 3C:
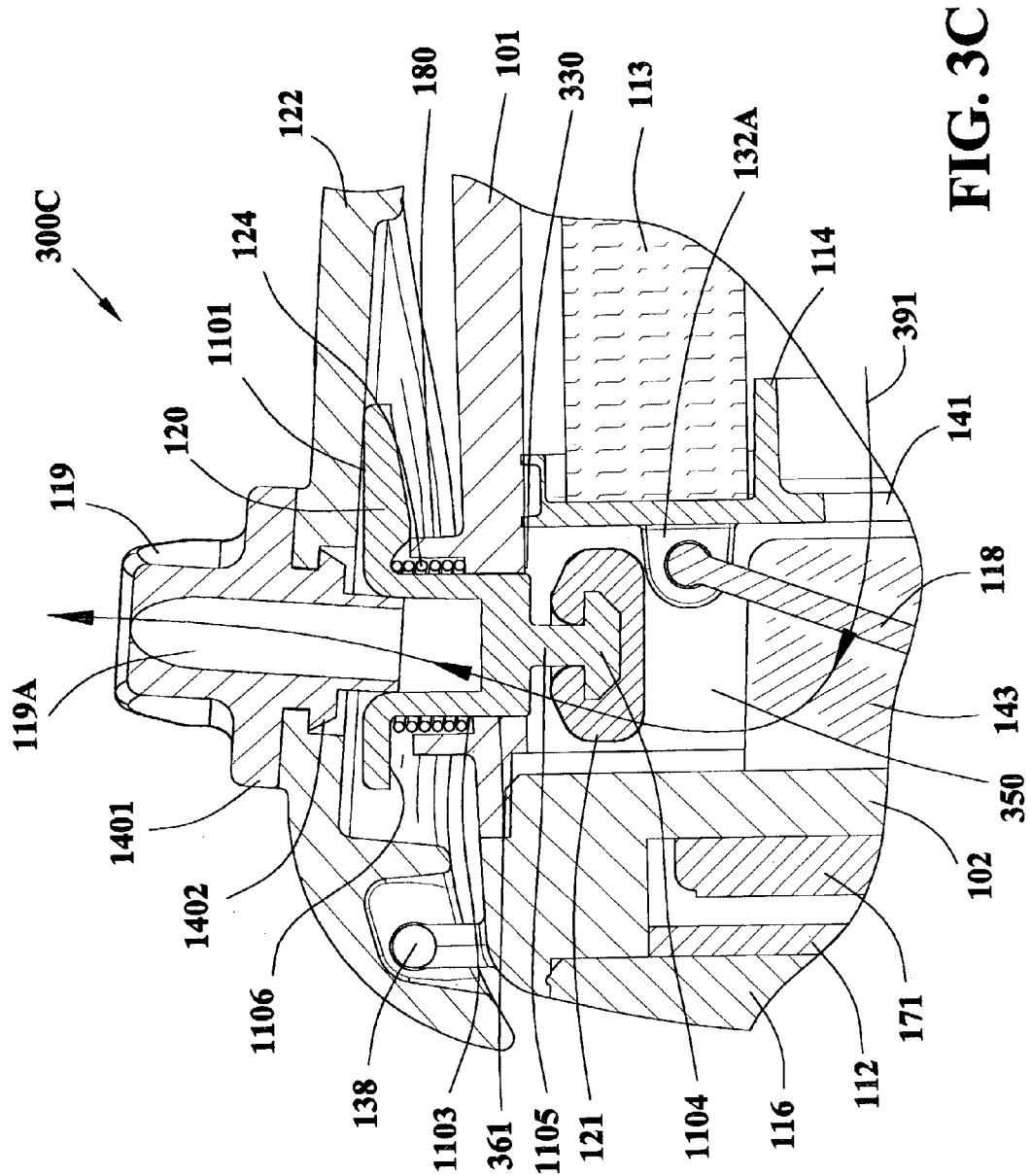
FIG. 3C is an enlargement of a portion of FIG. 3B.
Figure 3D:
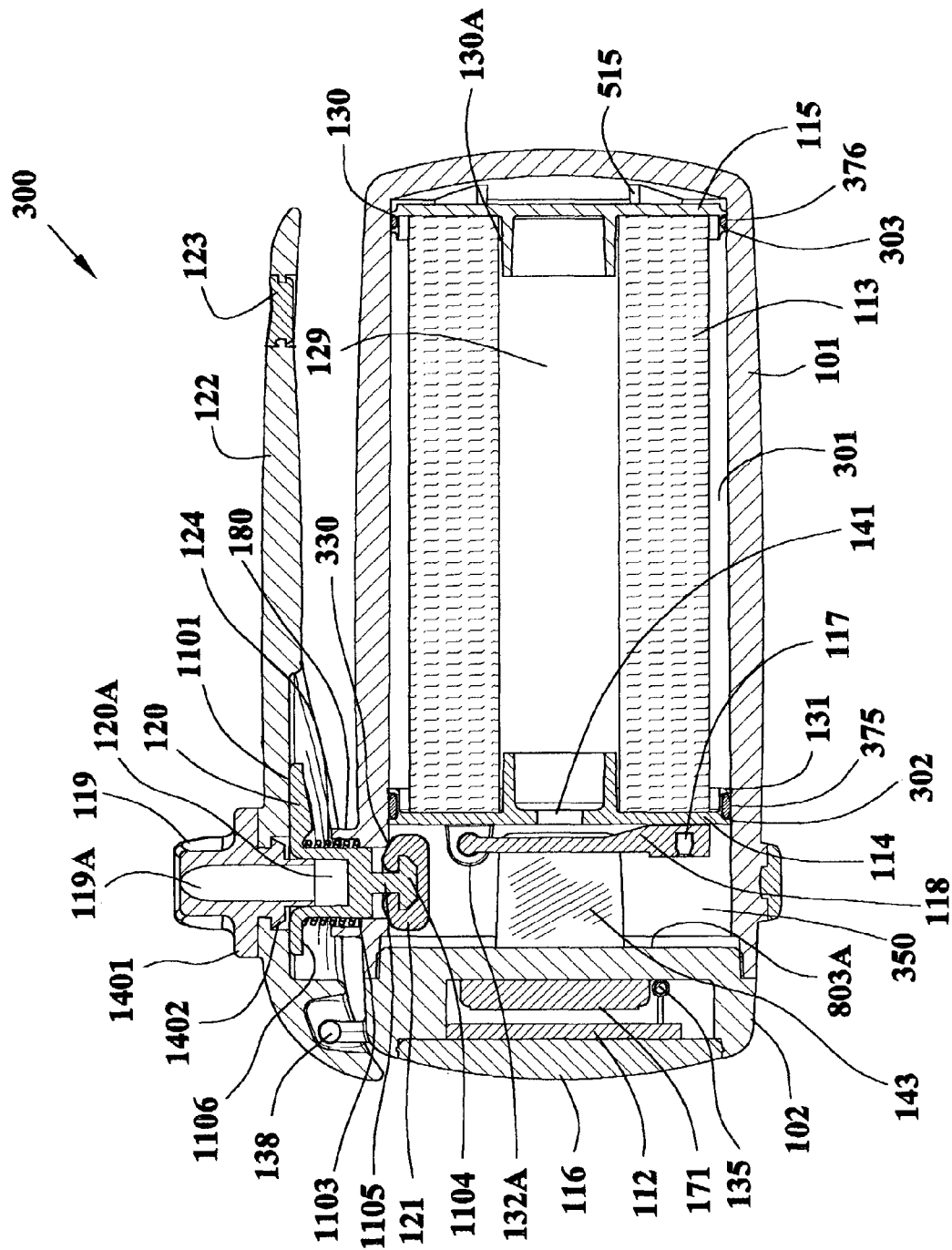
FIG. 3D is a cross-sectional view of the first embodiment of the water filtration device similar to FIG. 3 with an O-ring used as an additional seal for the filter subassembly.

FIG. 3B is a cross-sectional view 300B of the first embodiment of the water filtration device with the fountain lever 122 depressed and valve 121 off its seat. It will be noticed that plunger 120 bends slightly when lever 122 is depressed. This bending tends to seal the passageway denoted by reference numeral 506. Gate 118 is shown rotated clockwise due to water flow out of passageway 141. In this position, gate 118 and magnet 117 are in proximity to reed switch 135. FIG. 3C is an enlargement 300C of a portion of FIG. 3B and illustrates the flow path 391 of water past valve 121, through passageway 120A of plunger 120 and through passageway 199A of fountain 119. It will be noticed in FIGS. 3, 3A, 3B and 3C that outlet 107A is not shown therein as it is located fore (ahead) with respect to the cross-section of these drawing figures.

FIG. 6 is a perspective view 600 of the valve 108 and its handle which are used in both the first embodiment and the second embodiment of the water filtration device. FIG. 6 illustrates the underside (the side that is not exposed) when viewing FIG. 2. Reference numeral 612 illustrates a cavity from the molding process. Reference numeral 609 indicates the handle portion of the valve 108 and reference numeral 608 indicates the other or second end of the valve 108. Ridges 602 engage stop 407 to limit the rotation of the valve between its first bypass position and its second filter position. A horn shaped passageway 603 is formed by wall 605. Wall 606 creates an annulus 604 in which a seal (not shown in FIG. 6) is positioned. A seal 450 is positioned in annulus 604 as indicated in FIGS. 4G and 4H. A groove 607 resides in the valve 108 for receiving a seal (not shown in FIG. 6) which prevents leakage of water from the valve 108 when it inserted in the front housing 103. FIG. 6A is a perspective view 600A of the exposed side of the valve and its handle 108 as viewed in FIG. 2. FIG. 6A illustrates seal 640 in groove 607 for sealing the valve 108 which is snap fit in the front housing.

Figure 7A:
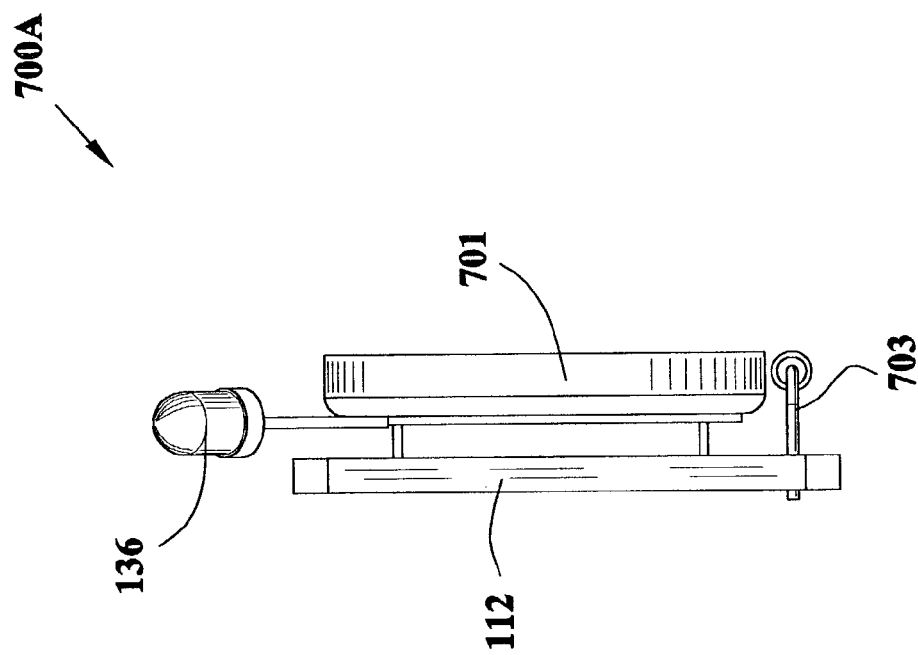
FIG. 7A is a side view of the electronic package (electric circuit), sensor and light emitting diode package of FIG. 7.
Figure 7:
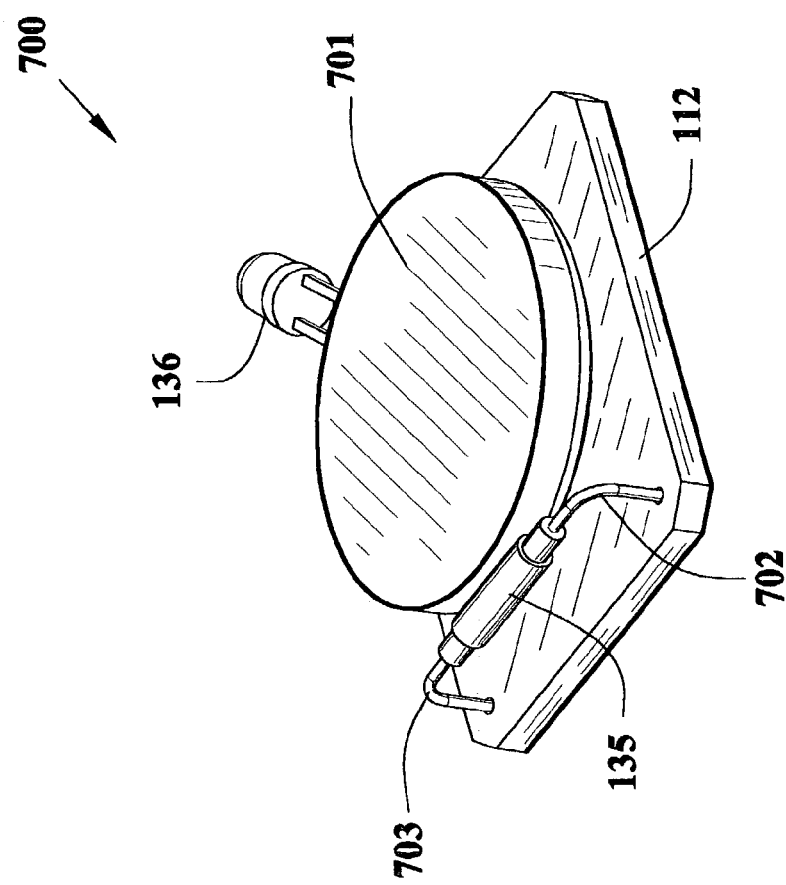
FIG. 7 is a perspective view of the electronic package (electric circuit), sensor and light emitting diode used in the first and second embodiments of the water filtration device.

FIG. 7 is a perspective view 700 of the electronic package 112, battery 701, sensor 135, leads 702, 703 and light emitting diode 136 used in the first and second embodiments of the water filtration device. In the preferred embodiment sensor 135 is a reed switch also known as a reed relay. However, those skilled in the art will readily recognize that different sensors based on capacitance principles, piezoelectric principles, or induction principles may be employed with some modifications. FIG. 7A is a side view 700A of the electronic package illustrated in FIG. 7.

FIG. 9 is a front view 900 of gate 118 of the first embodiment. Recess 134 receives magnet 117 which actuates reed switch 135 when in proximity therewith. Prongs or knobs 134 interengage corresponding hinges 134 as illustrated in FIGS. 1 and 3. FIG. 9A is a cross-sectional view 900 taken along the lines 9A-9A of FIG. 9. FIG. 9A illustrates the contour of the gate 118 which includes front 903 and rear 902 surfaces. Sloping surface 904 diverges to body 905 having recess 134 in which magnet 117 is housed. Locks 901 secure magnet 117 in place. The magnet is installed by simply pushing on the magnet to orient it past the locks 901 which are plastic and somewhat malleable enabling insertion of the magnet into the plastic. The magnet is then hermetically sealed with potting compound.

Figure 10A:
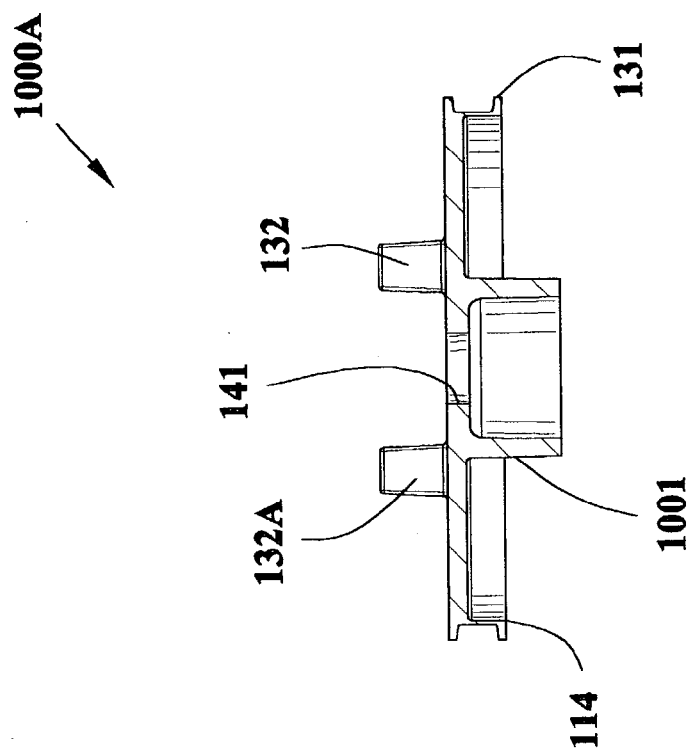
FIG. 10A is cross-sectional view of the left end cap of the filter taken along the lines 10A-10A of FIG. 10.
Figure 10:
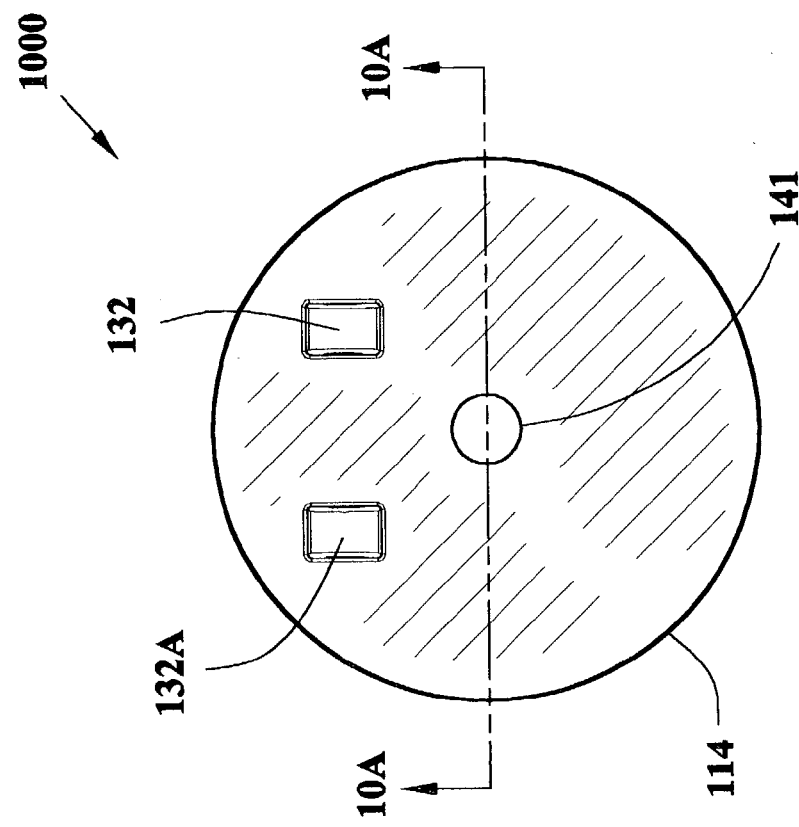
FIG. 10 is a front view of the left end cap of the filter.

FIG. 10 is a front view 1000 of the left end cap 114 of the filter 113. Hinges 132/132A are illustrated in FIGS. 10 and 10A. FIG. 10A is cross-sectional view 1000A of the left end cap of the filter taken along the lines 10A-10A of FIG. 10 illustrating the hinges 132/132A, passageway 141, dowel 1001, and protrusions 1002 and 1003 which slidingly seal with respect to the filter housing. Peripheral end portion such as the one denoted by reference numeral 131 are relatively soft and seal against the interior of the filter housing.

Figure 13:
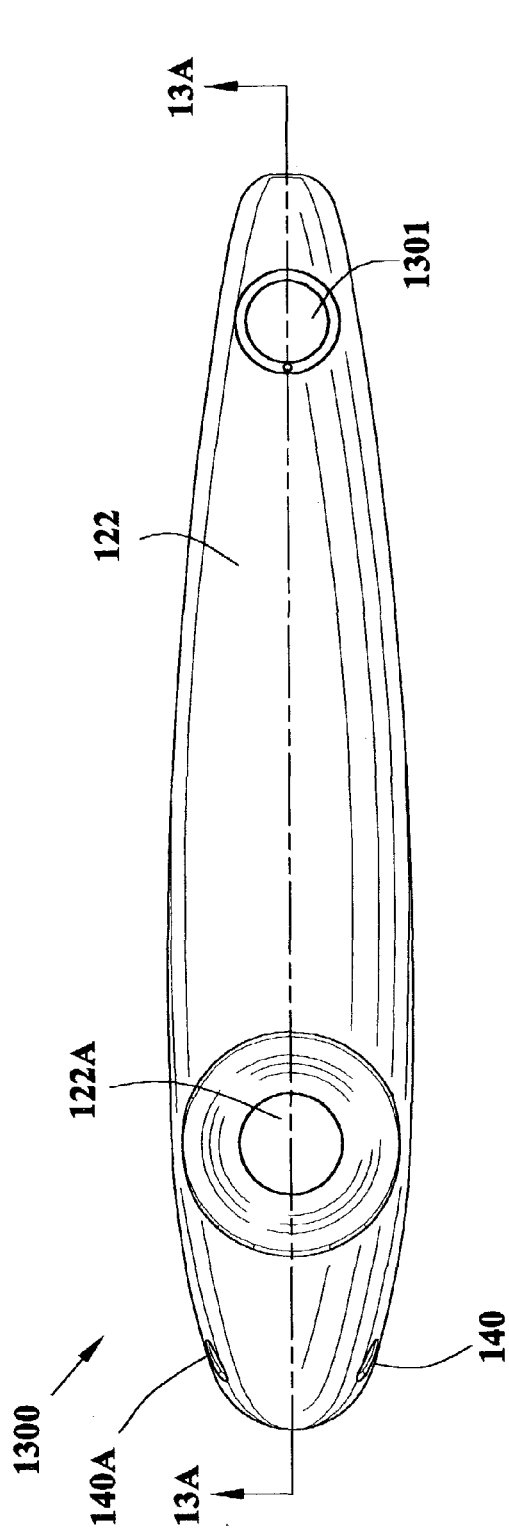
FIG. 13 is a top view of the lever used to operate the plunger of the first embodiment.
Figure 13A:
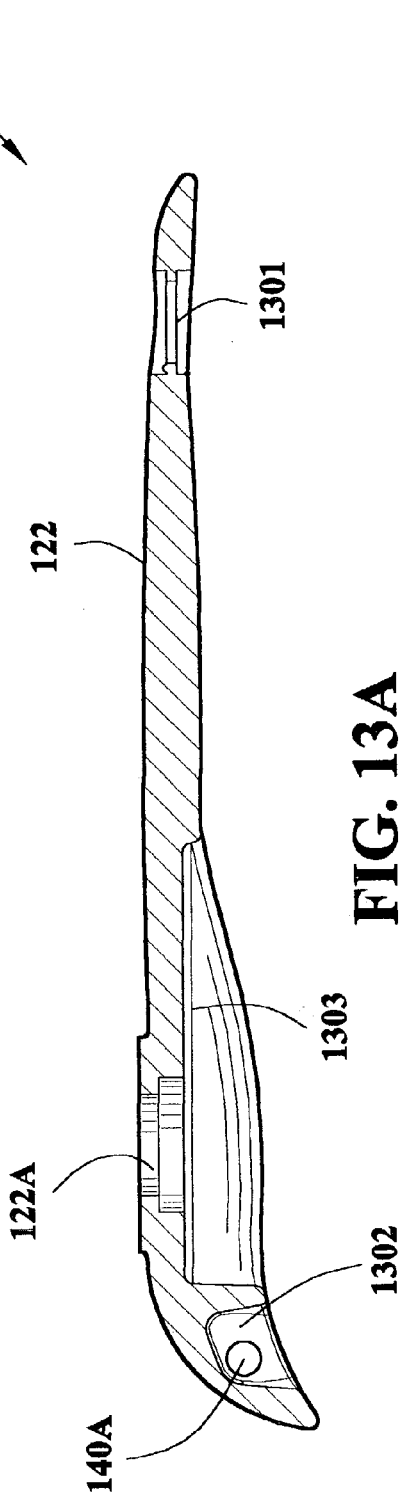
FIG. 13A is a cross-sectional view of the lever taken along the lines 13A-13A of FIG. 13.

FIG. 13 is a top view 1300 of the lever 122 used to operate the plunger 120 of the first embodiment. Reference numeral 1301 indicates a recess in which insert 123 is secured by adhesive. Apertures or hinges 140/140A engage prongs or protrusions 138 for pivoting as previously described. FIG. 13A is a cross-sectional view of the lever 122 taken along the lines 13A-13A of FIG. 13 also illustrates the aperture 140A. Cavities 1302 and 1303 are illustrated in FIG. 13A. Cavity 1303 fits over flat portion 1101 of plunger 120. See, FIG. 11.

Figure 13B:
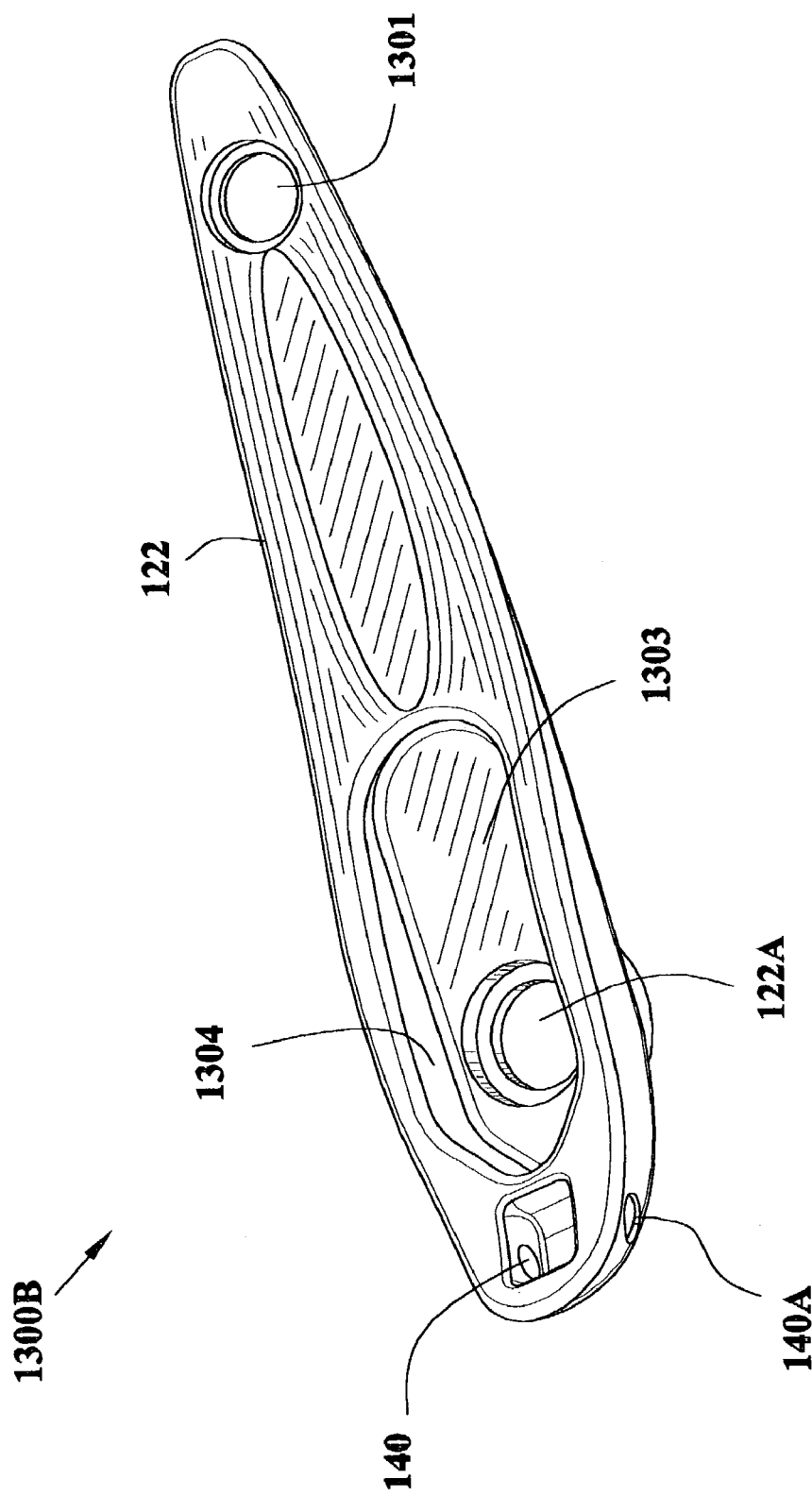
FIG. 13B is a perspective view of the underside of the lever of FIG. 13.

FIG. 13B is a perspective view 1300B which illustrates the underside of the lever 122 of FIG. 13. Cavity 1303 and wall 1304 of cavity 1303 are illustrated. Flat portion 1101 of plunger 120 fits into cavity 1303.

Figure 14A:
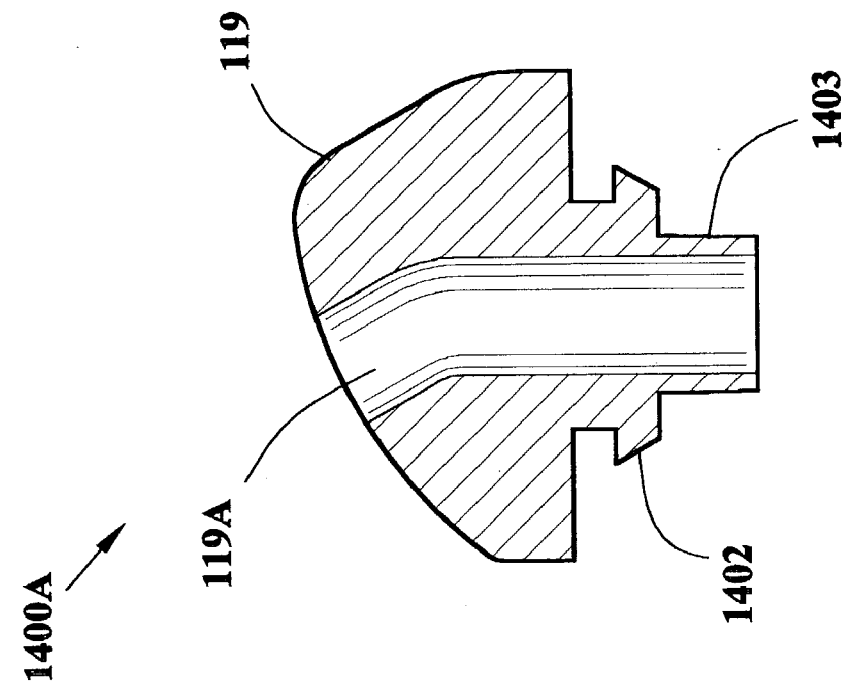
FIG. 14A is a cross-sectional view taken along the lines 14A-14A of the fountain head of FIG. 14.
Figure 14:
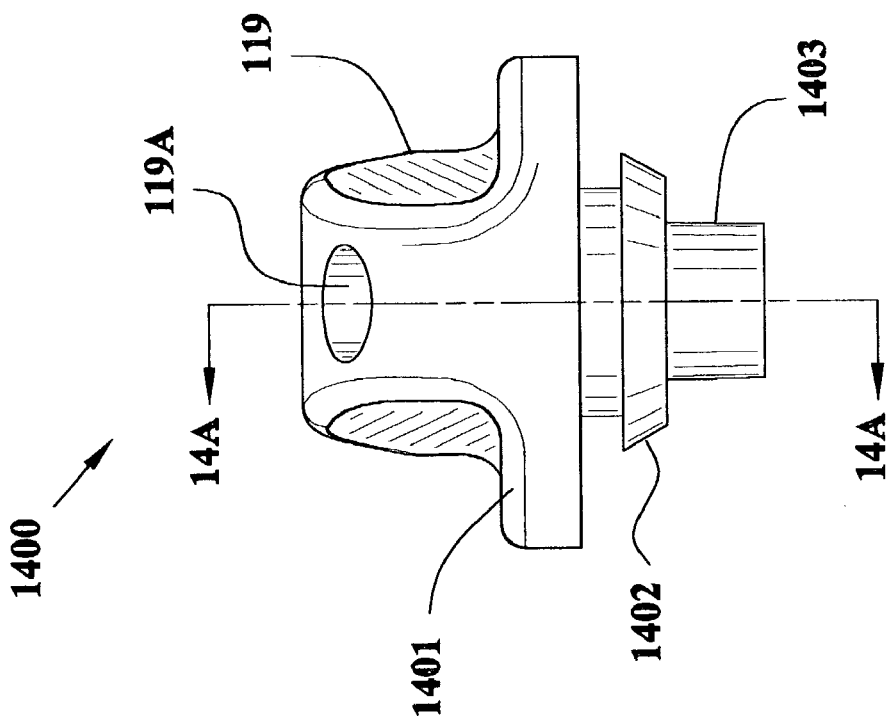
FIG. 14 is a front view of the fountain head.

FIG. 14 is a front view 1400 of the fountain head 119 illustrating flanges 1401 and 1402. FIG. 14A is a cross-sectional view 1400A taken along the lines 14A-14A of the fountain head 119 of FIG. 14. Flange 1402 is snap-fit into place in lever 122 as is best seen in FIG. 3. Fountain head 119 is made of plastic. Spring 124 is illustrated in FIG. 1 as operable between seat 570 and surface 1106. See, FIGS. 3, 5C and 11C. FIG. 3 illustrates valve 121 seated against seat 330.

FIGS. 1-14 are directed toward the first embodiment of the invention. Some of the uses of the first embodiment of the invention are in bathrooms, hotel and motel rooms. The device disclosed is small and convenient for storage on vacations and business trips. FIGS. 15-20 are directed toward the second embodiment of the invention. Use of the second embodiment include kitchen and bar uses. Both embodiments are designed such that the filter sits rearwardly with respect to the faucet so that access to the faucet and the filter is permitted.

Figure 15:
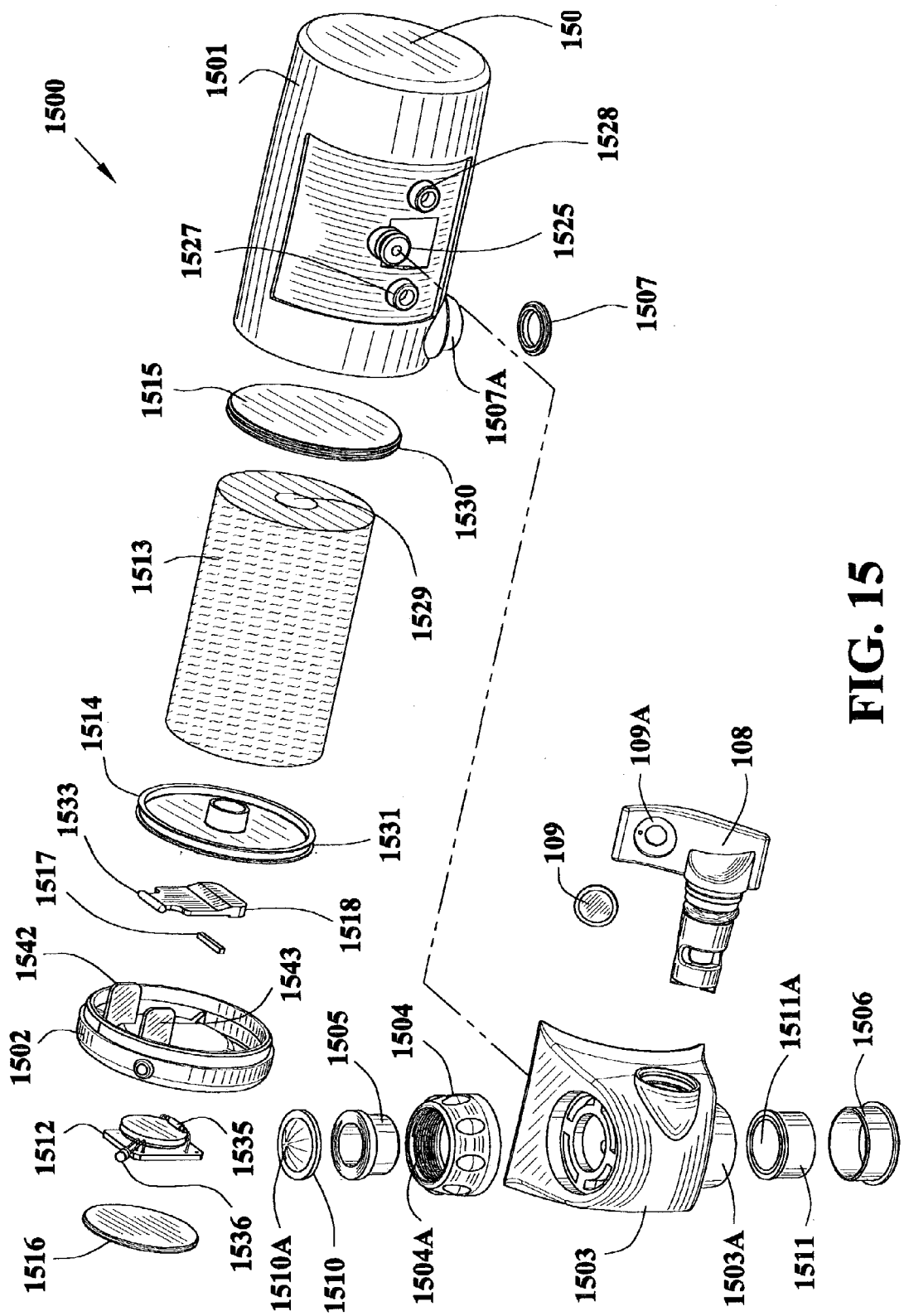
FIG. 15 is an exploded perspective view of a second embodiment of the invention.

The reference numerals used in FIG. 15 correspond generally to the reference numerals used in FIG. 1 such that for example reference numerals 101 and 1501 both indicate filter housings.

FIG. 15 is an exploded perspective view 1500 of a second embodiment of the invention. Filter housing 1501 may have, for example, a diameter of 2.40 inches and a length of approximately 3.90 inches. One of the principal differences in the kitchen filter of the second embodiment is that it has only one filtered outlet 1507A whereas the bathroom unit has two filtered outlets 107A and 180. Filters 1513 and 113 may be pre-wrapped 495 using a hot seal method. See, FIGS. 4G and 4H. Adhesive is applied to the filter end caps 1514, 1515, then attached to the filter after which the subassembly is inserted into the filter housing. Peripheral seal portions of end caps 1514, 1515 seal the filter. Optionally, O-rings 375, 376 may be used to seal the filter so as to prevent unfiltered water from entering chamber 1750. See, FIG. 17. As in the case of the bathroom filter, the aerator assembly 1511 and spout 1506 are affixed in the front housing 1503 as previously illustrated. As also in the case of the bathroom filter, the collar lock 1505 is welded to the front housing 1503 and collar 1504 is permitted to rotate with respect to the collar lock. The screen assembly is inserted into the assembly atop the collar lock. Gate 1518 is slightly dimensionally different than the gate 118 previously described but it functions in the same way as gate 118. Spacers 1542 and 1543 extend from end cap 1502 and serve to ensure that gate 1518 remains in alignment.

Electronic package 112 is the same package used in the first embodiment. Reed switch 135 (or reed relay as it sometimes known) senses the proximity of magnet 1517 and the electronic package measures the total time of flow. Instead of a reed switch which is a magnetically coupled device, a capacitance based device or a pressure-sensitive device may be used instead. The pressure sensitive device would have to mounted in the closed end of the housing end cap 1502.

Figure 17:
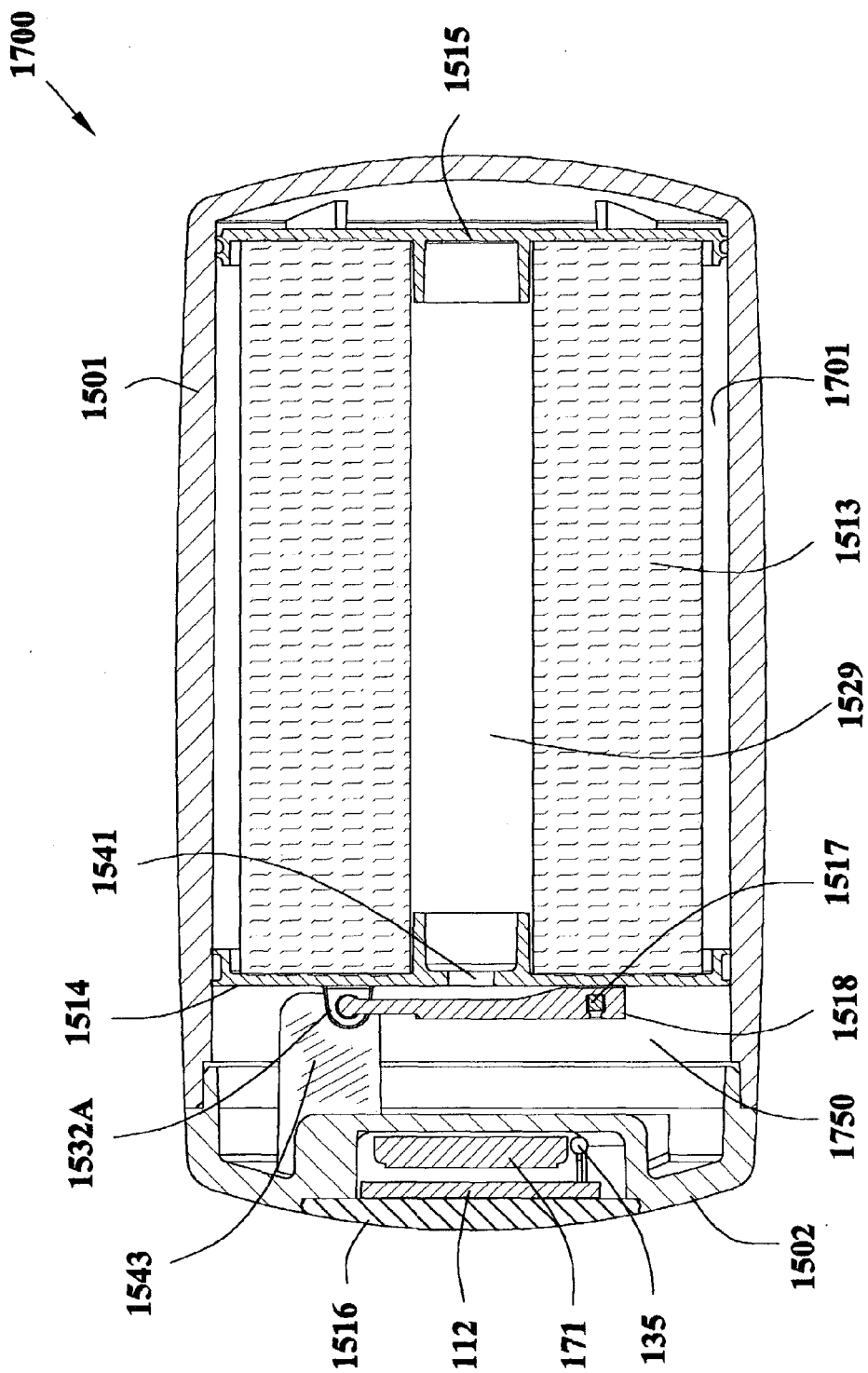
FIG. 17 is a cross-sectional view of the second embodiment of the water filtration device taken along the lines 17-17 of FIG. 16.

Valve 108 illustrated in FIG. 15 is the same valve used in the bathroom filter of the first embodiment. Spacers 1542, 1543 of the housing end cap 1502 assist in ensuring that the filter subassembly is in place. Referring to FIG. 17, a gap (unnumbered) exists between the spacer 1543 and the end cap 1514 of the filter. Spacer limits the movement of the filter subassembly such that it cannot move leftwardly too far before engaging the spacers. End plate 1516 is glued or welded to the housing end cap 102. Housing end cap 102 is glued or welded to the filter housing 1501.

Figure 16:
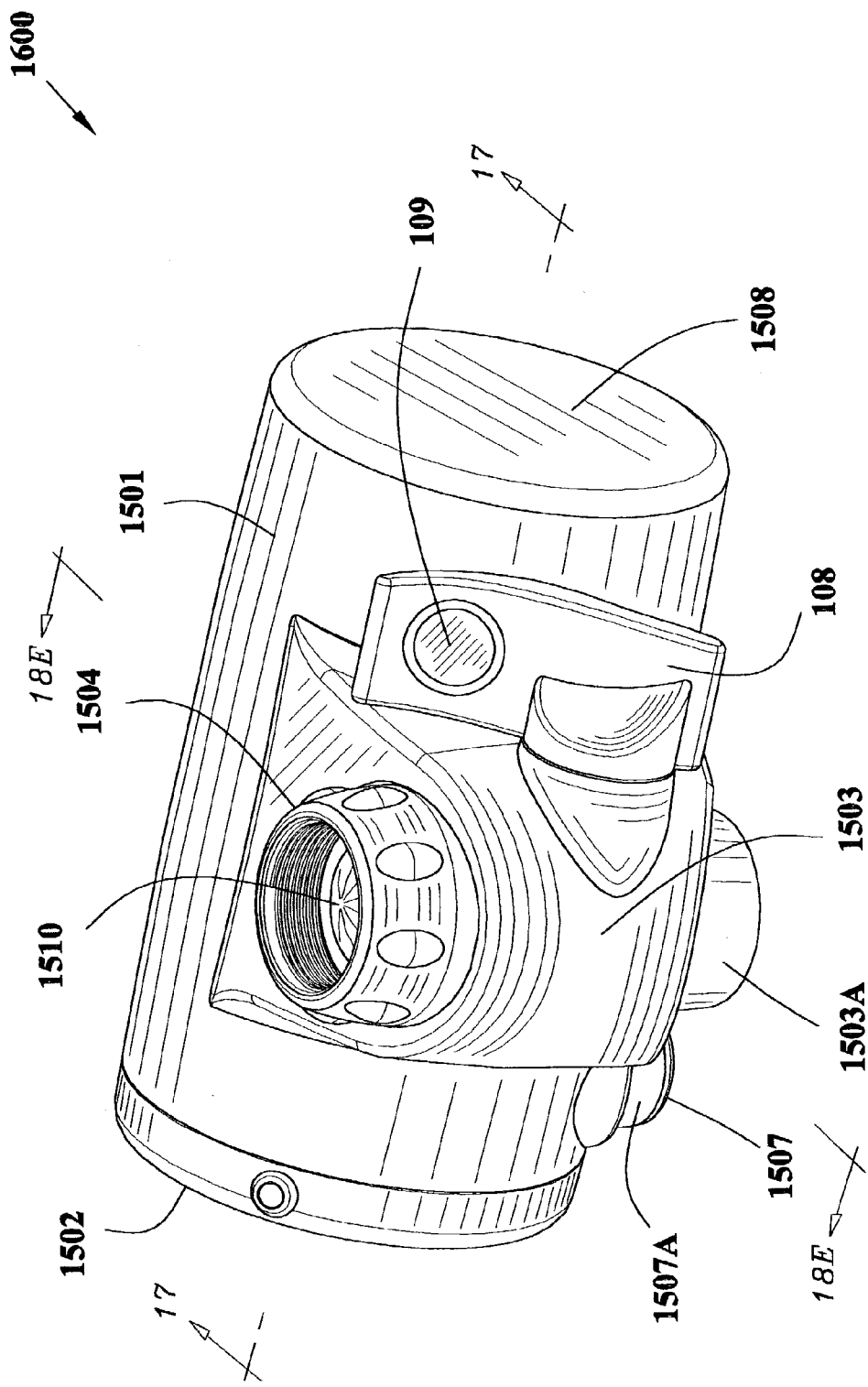
FIG. 16 is a perspective view of a second embodiment of the water filtration device.
Figure 17A:
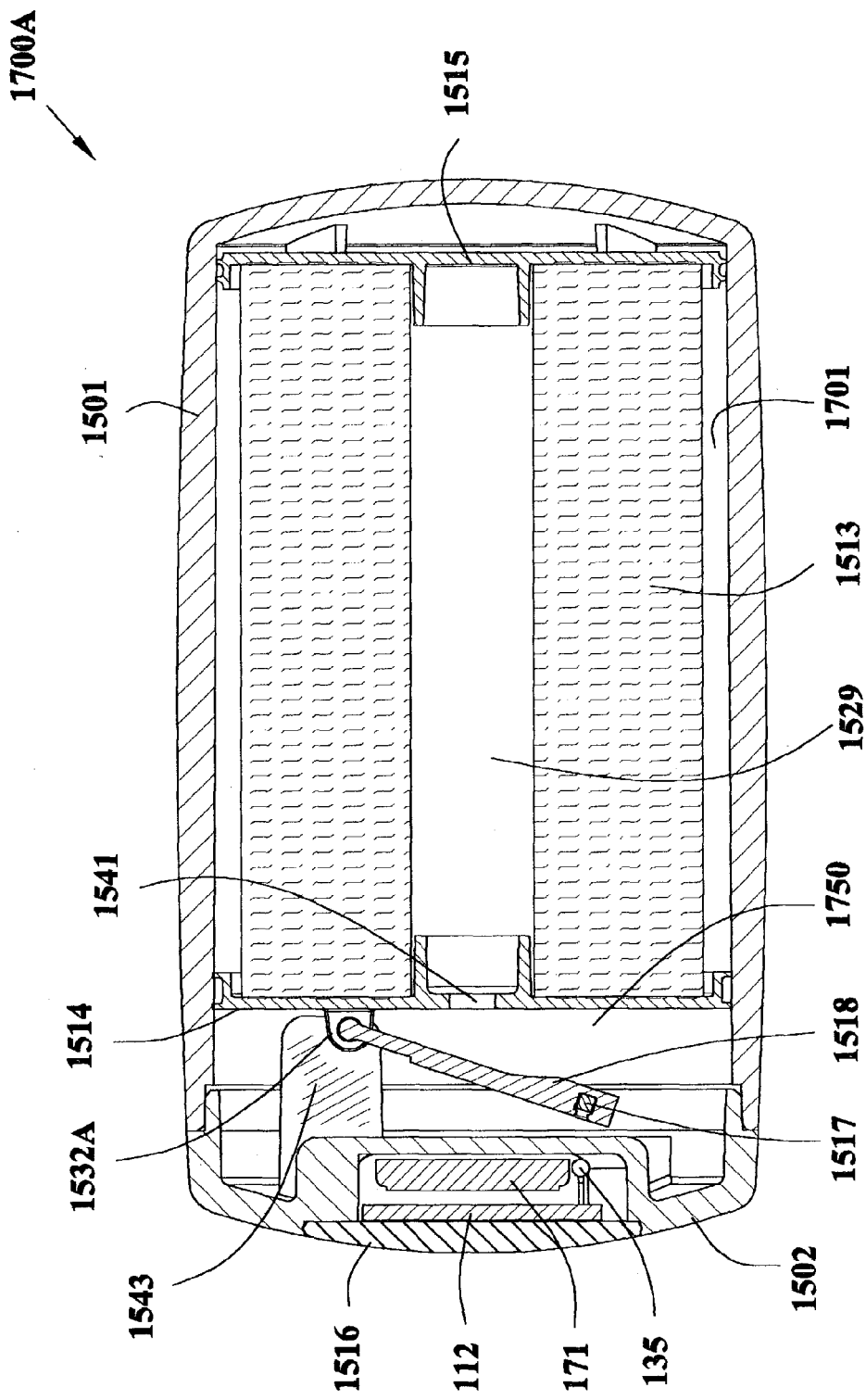
FIG. 17A is a cross-sectional view of the second embodiment of the water filtration device similar to FIG. 17 except the gate is shown rotated clockwise in the flow condition.

FIG. 16 is a perspective view 1600 of the second embodiment of the water filtration device. FIG. 17 is a cross-sectional view 1700 of the second embodiment of the water filtration device taken along the lines 17-17 of FIG. 16. FIG. 17A is a cross-sectional view 1700A of the second embodiment of the water filtration device similar to FIG. 17 except the gate 1518 is shown rotated clockwise in the flow condition. Annulus 1701 is illustrated in FIG. 17A. Water resides in this annulus and flow thru filter 1513 into passageway 1529 and out port 1541 impinging upon gate 1518 rotating it clockwise.

Referring to FIGS. 15 and 17, filter end caps 1514 and 1515 have peripheral end portions (i.e., 1531 and 1530) which are seals which seal against the interior diameter of the filter housing 1501. Although not shown in FIG. 17, optional elastomeric O-ring seals similar to 375, 376 may be used between the peripheral end seals as illustrated in FIG. 3D.

Figure 18A:
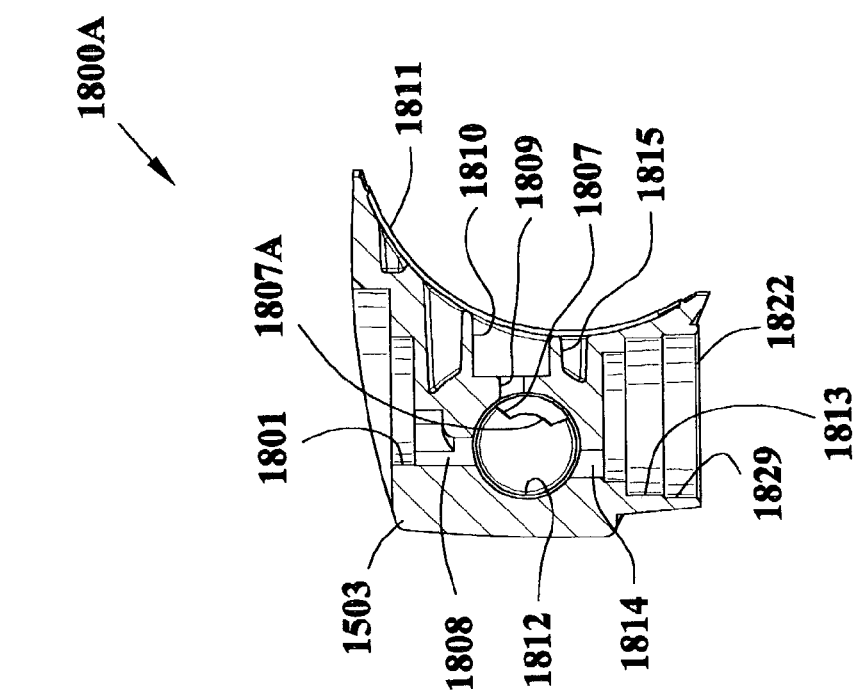
FIG. 18A is a cross-sectional view taken along the lines 18A-18A of FIG. 18.
Figure 18:
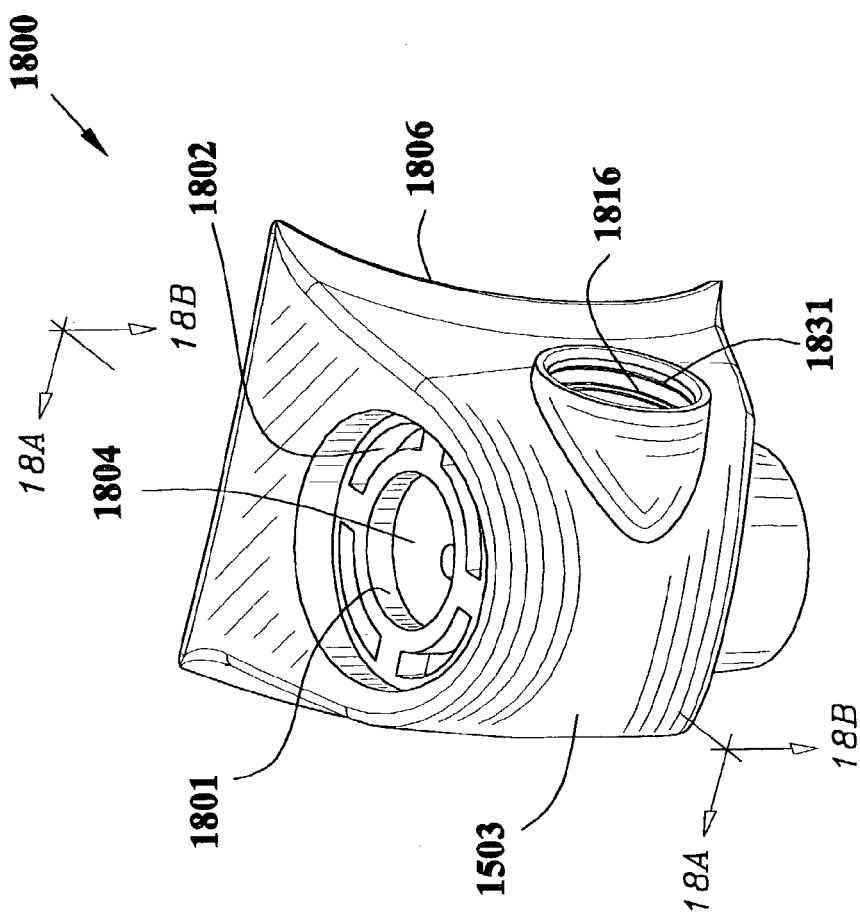
FIG. 18 is a perspective view of the front housing of the second embodiment.
Figure 18C:
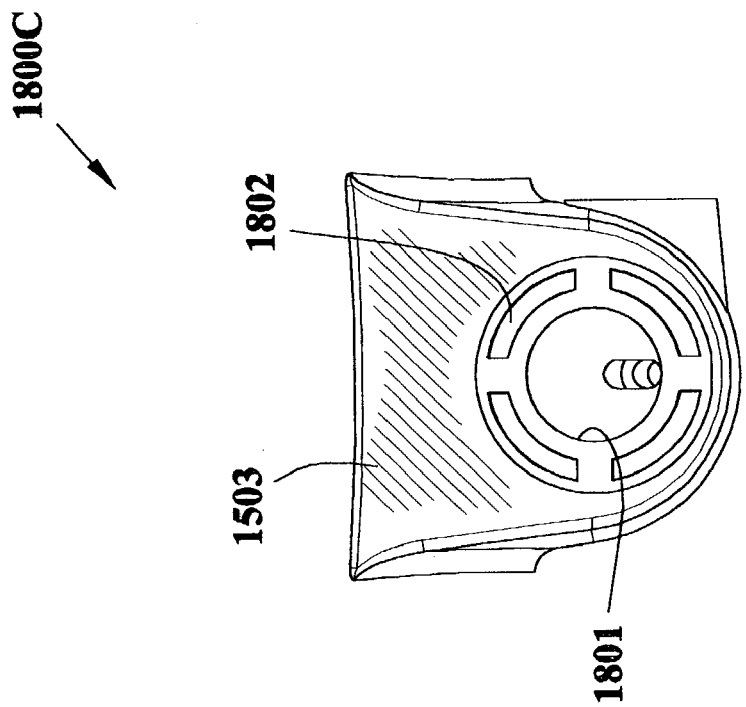
FIG. 18C is a top view of the front housing of the second embodiment.
Figure 18B:
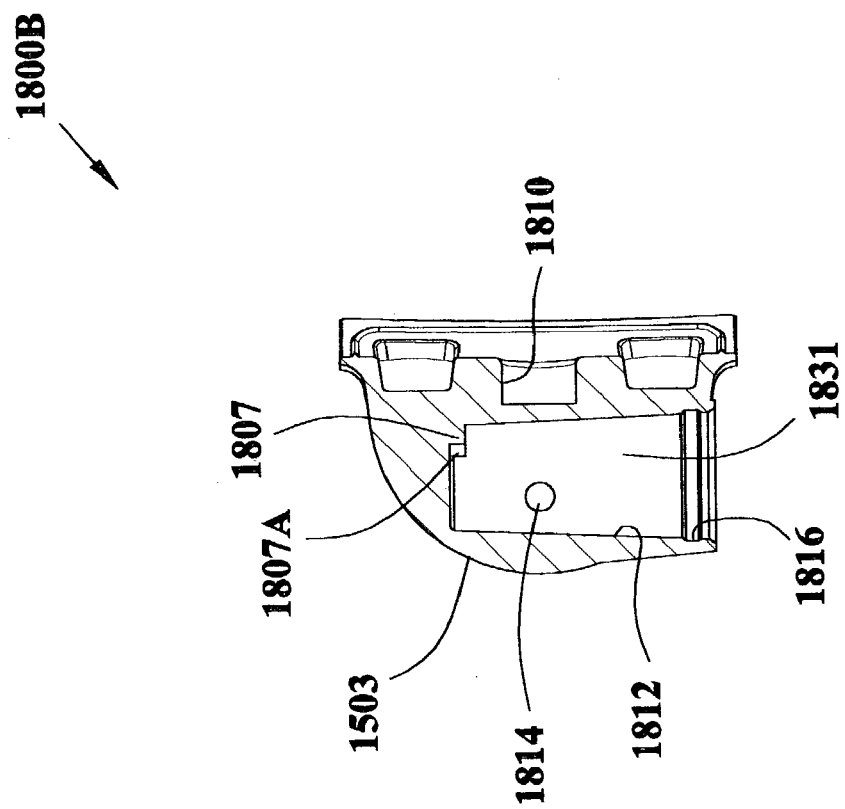
FIG. 18B is a cross-sectional view taken along the lines 18B-19B of FIG. 18.

FIG. 18 is a perspective view 1800 of the front housing of the second embodiment. FIG. 18 employs reference numerals like FIG. 4. FIG. 18A is a cross-sectional view taken along the lines 18A-18A of FIG. 18. Reference numeral 1801 indicates the wall to which the collar lock 1505 is welded and reference numeral 1804 indicates the floor upon which the collar lock 1804 sits at the time it is welded. Mold recesses 1802 are from the molding process. Groove or recess 1816 receives the seal from the valve 108. Cavity 1831 receives the valve 108. Referring to FIG. 18A, stop 1807A is illustrated which engages ridges 602 on valve 108. Stop 1807A is also illustrated in FIG. 18B, a cross-sectional view taken along the lines 18B-18B of FIG. 18. Tapered bore 1812 is illustrated by the circular lines in FIG. 18A.

Figure 16A:
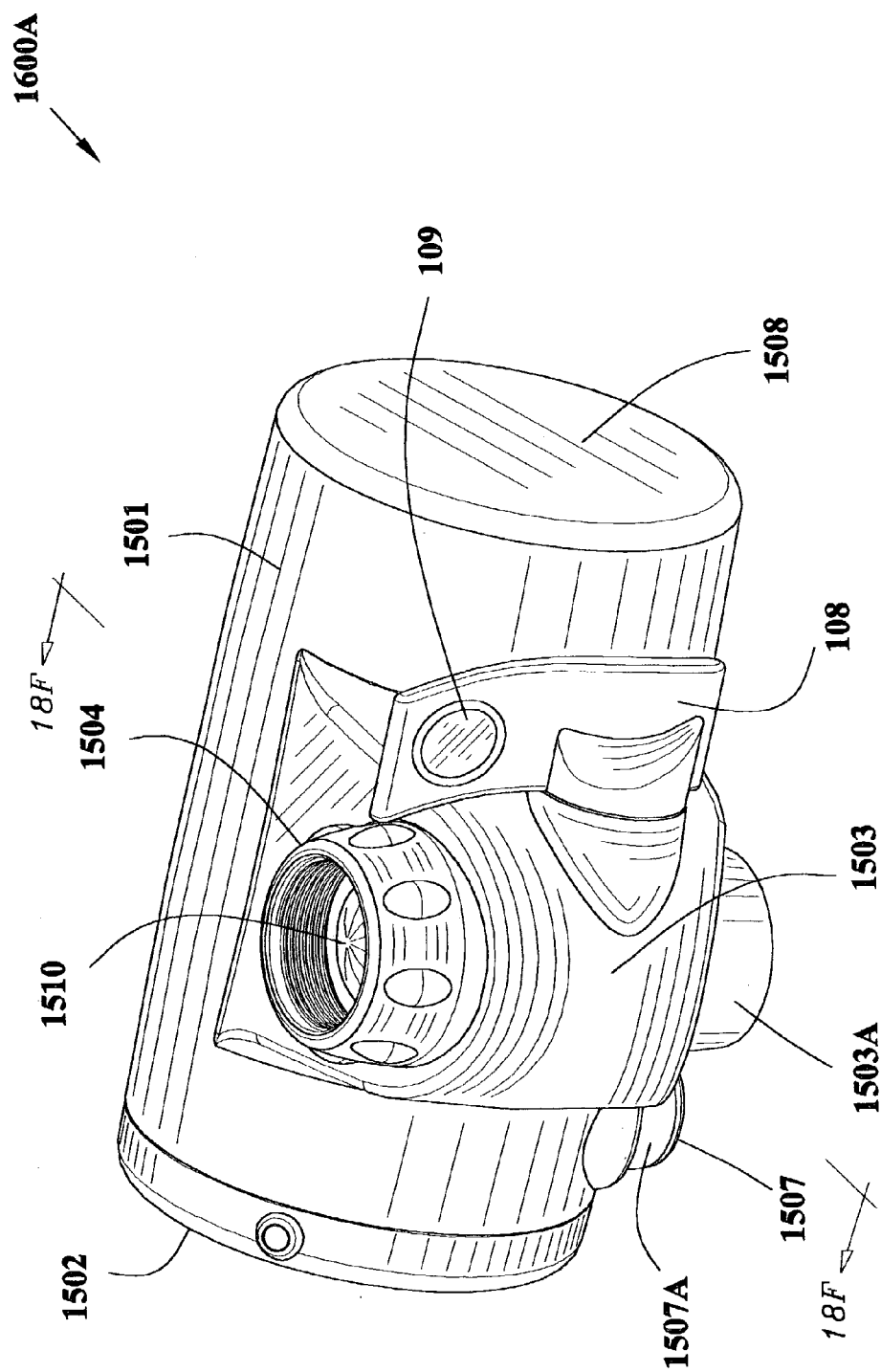
FIG. 16A is a perspective view of a second embodiment of the water filtration device with the valve handle pulled forward.
Figure 18D:
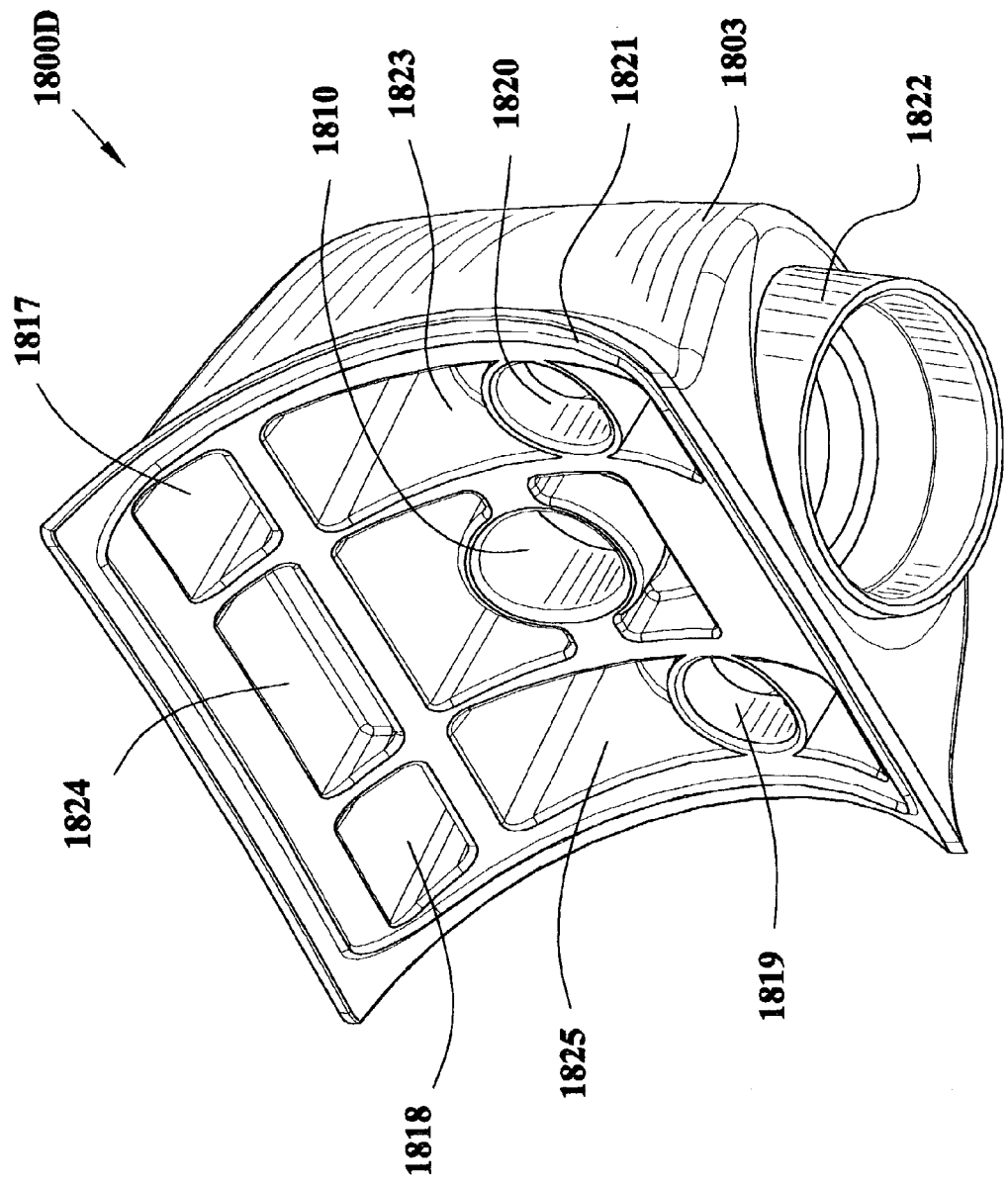
FIG. 18D is a rear perspective view of the front housing of the second embodiment of the water filtration device.
Figure 18E:
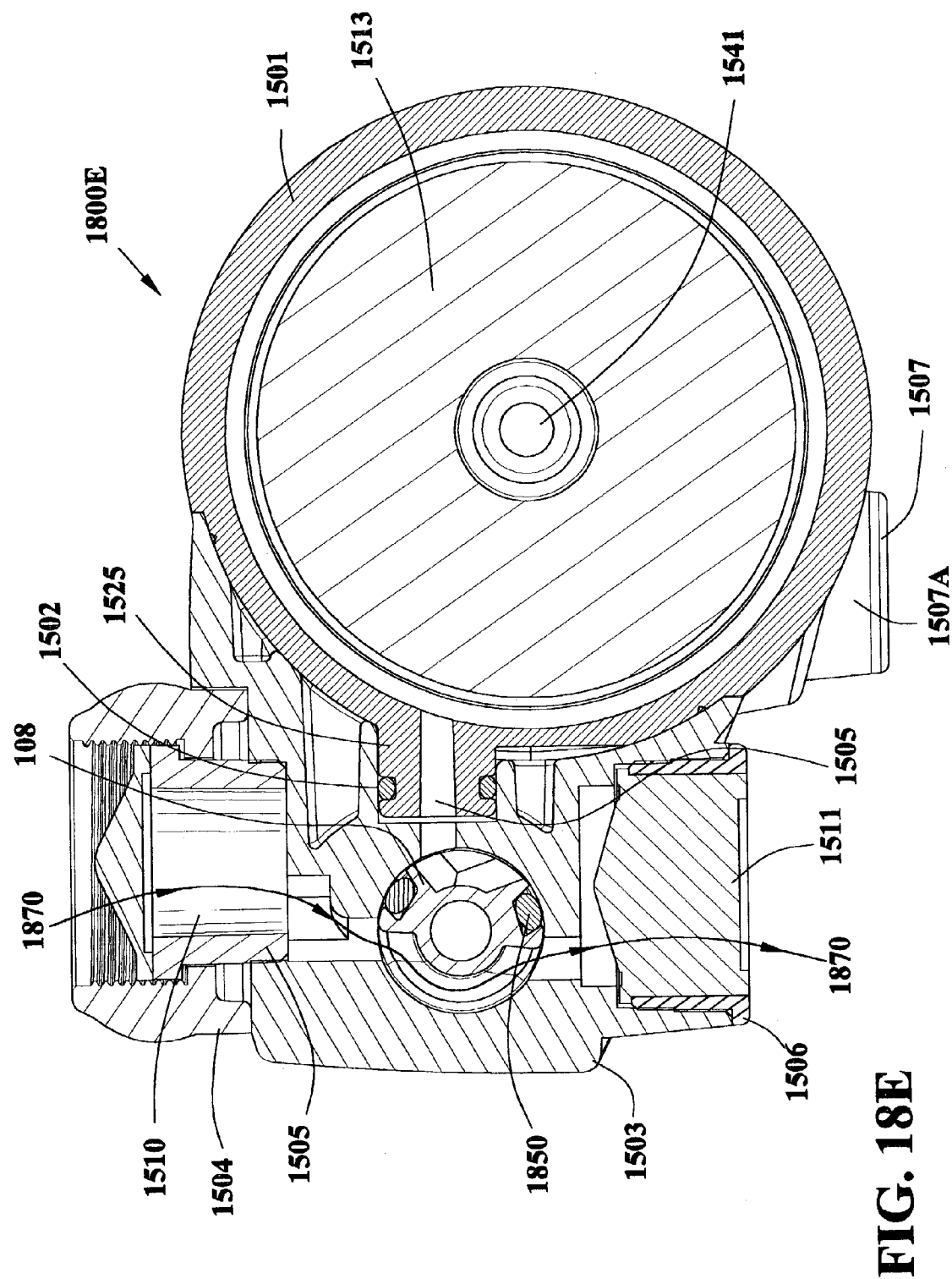
FIG. 18E is a cross-sectional taken along the lines 18E-18E of FIG. 16 with the flow diverter valve inserted in the front housing in a first position, bypass position.
Figure 18F:
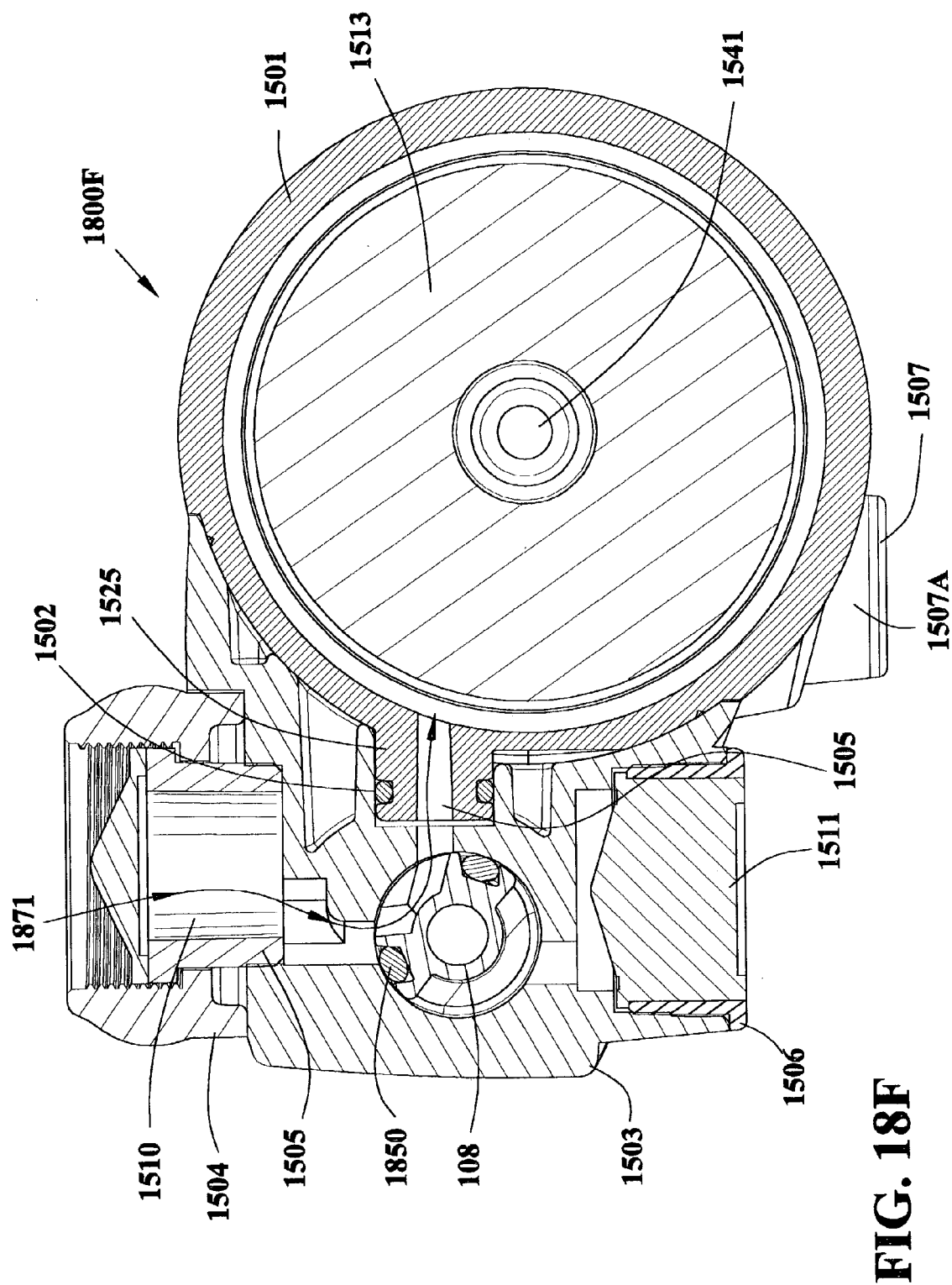
FIG. 18F is a cross-sectional view taken along the lines 18F-18F of FIG. 16A with the flow diverter valve inserted in the front housing in a second position which directs flow into the filter.

Bore 1822 includes stepped portions 1813 and 1829. Inlet 1808 is shown leading to valve cavity 1831. Outlet 1814 and outlet 1809 are also shown in FIG. 18A. When valve 108 is positioned as illustrated in FIG. 18E inlet 1808 is connected to outlet 1814 and the water passes through front housing 1503 and is expelled unfiltered. Flow arrow 1870 depicts the path of flow through front housing 1503. When the valve 108 is positioned as illustrated in FIG. 18F inlet 1808 is connected to outlet 1809 where it is directed into the filter by inlet 1525 of the filter housing 1501. See, FIG. 16A a perspective view of a second embodiment of the water filtration device with the valve handle pulled forward. Flow arrow 1871 depicts the path of flow through front housing 1503 and into inlet 1525 of the filter housing.

Referring to FIG. 18B, valve cavity 1831 is illustrated as is stop 1807A and the cross-sectional portion 1807 of the stop. Unfiltered outlet 1814 is also depicted. FIG. 18C is a top view 1800C of the front housing 1503 of the second embodiment. FIG. 18D is a rear perspective view 1800D of the front housing of the second embodiment of the water filtration device. FIG. 18D illustrates receptacles 1819 and 1820 of the front housing which engage pins 1528 and 1527 respectively. Mold recesses from the molding process are indicated by reference numerals 1817, 1818, 1823, 1824 and 1825. Joint 1821 is welded to the filter housing.

Figure 19:
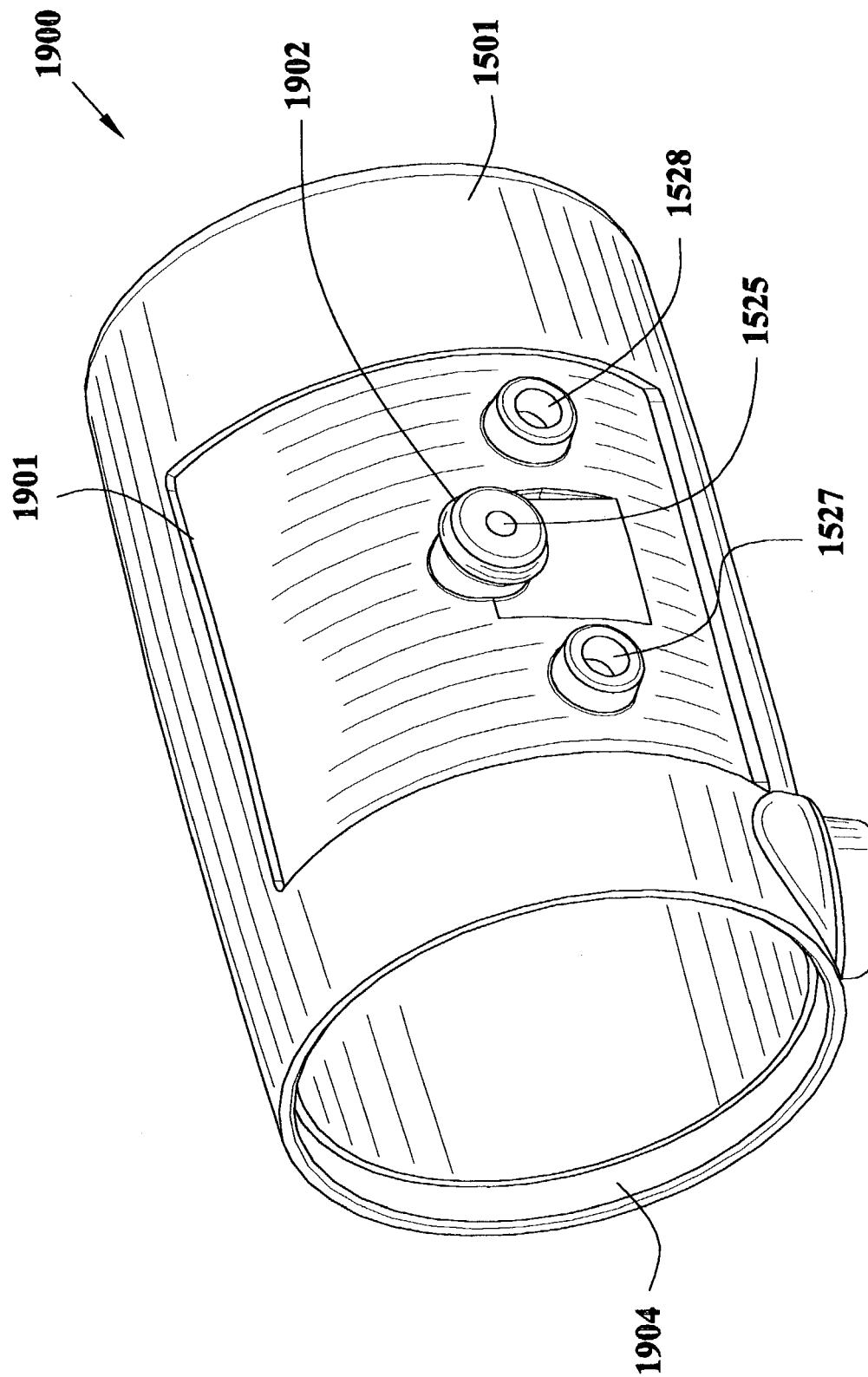
FIG. 19 is a front perspective view of the filter housing of the second embodiment of the water filtration device.
Figure 19A:
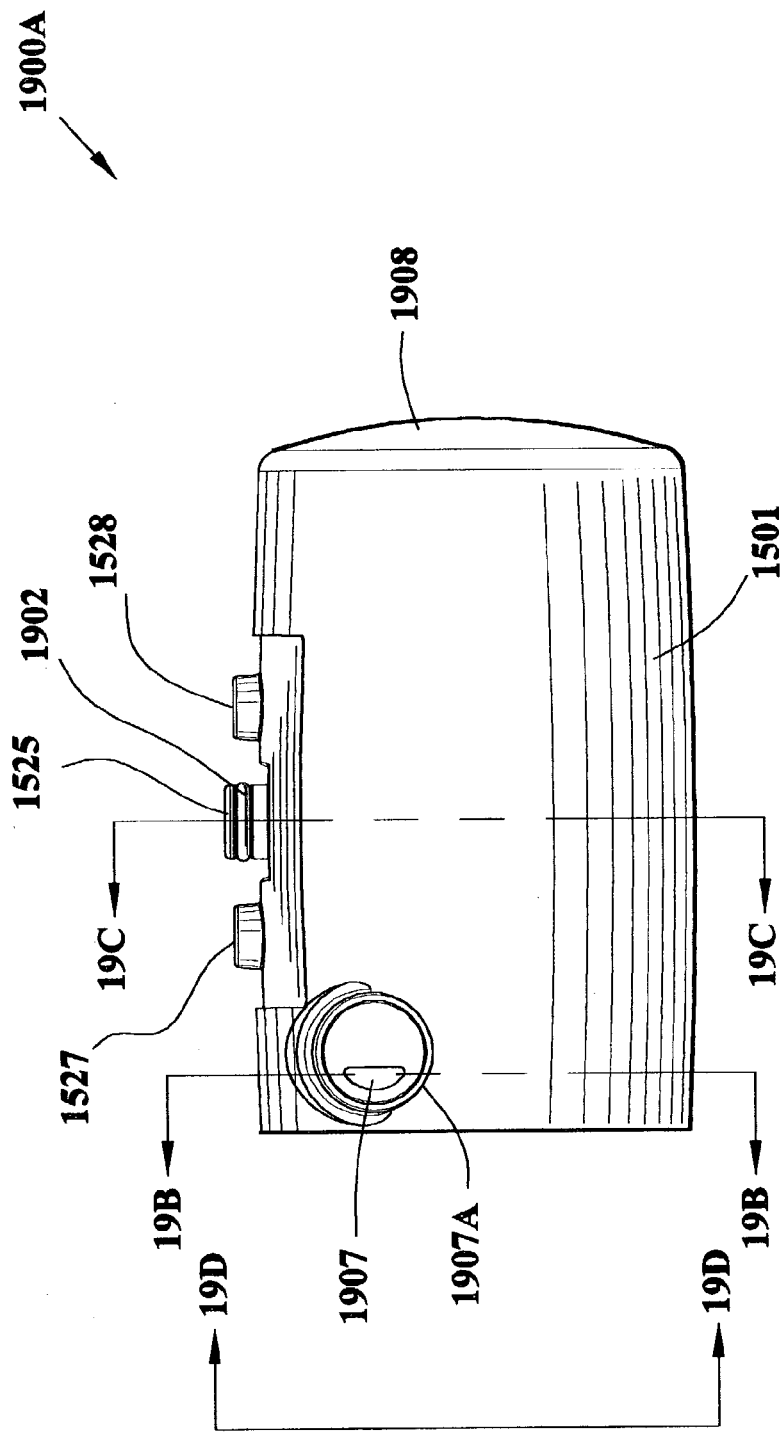
FIG. 19A is a bottom view of the of the filter housing of the second embodiment of the water filtration device.

FIG. 19 is a front perspective view 1900 of the filter housing of the second embodiment of the water filtration device. Surface 1904 engages the corresponding surface on the housing end cap 1502. Recess 1901 engages the perimeter of the front housing. FIG. 19A is a bottom view 1900A of the of the filter housing 1501 of the second embodiment of the water filtration device. FIG. 19B is a cross-sectional view 1900B taken along the lines 19B-19B of FIG. 19A illustrating port 1907 from which filtered water is expelled.

FIG. 19C is a cross-sectional view 1900C taken along the lines 19C-19C of FIG. 19C illustrating passageway 1905 in inlet 1525 of the filter housing 1501. FIG. 19D is a left side view 1900D, the open end view, of the filter housing 1501 of the second embodiment of the water filtration device illustrating mold prongs in the end housing. These prongs or ribs 1906 restrict the insertion depth of the filter sub assembly.

Figure 20D:
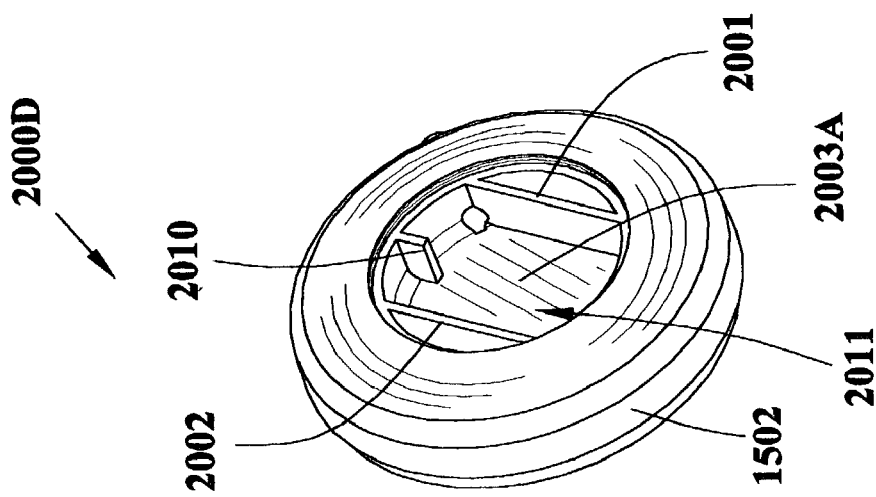
FIG. 20D is another perspective view of the end cap.
Figure 20C:
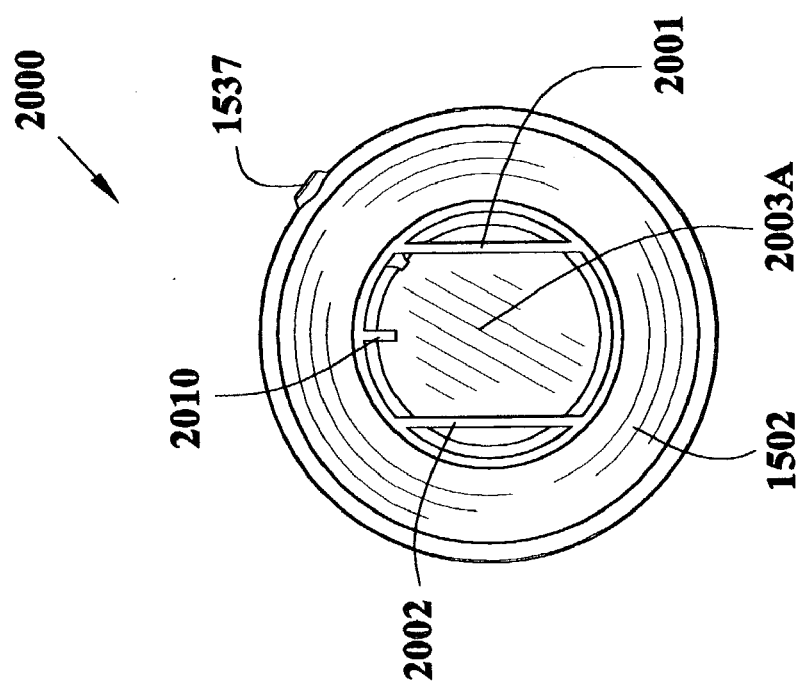
FIG. 20C is a view of the left side of the end cap of FIG. 20.

FIG. 20 is a front side view 2000 of the end cap of the housing 1502 of the second embodiment of the water filtration device. Surface 2007 of the housing end cap engages surface 1904 of the filter housing and is welded or glued thereto. FIG. 20A is a right side view 2000A of the end cap of FIG. 20 illustrating the closed end 2003. FIG. 20B is a perspective view 2000B of the end cap of FIG. 20 illustrating the closed end and spacers 1543, 1542. FIG. 20C is a view 2000C of the left side of the end cap of FIG. 20 illustrating supports 2001, 2002 and 2010 which restrict the movement of the electronic package in place. FIG. 20D is another perspective view 2000D of the end cap illustrating the housing 2011 in which the electronic package resides.

To assemble the water filtration devices, insert the aerator into the through spout and then insert the through spout and ultrasonically weld the aerator/spout assembly to the front housing. Place the threaded collar into the seat on top of the front housing and press the lock collar through the threaded collar and seat the lock collar into the housing. Clamp and ultrasonically weld the lock collar to the front housing.

Insert the filtered spout into the filter housing and clamp and weld it to the filter housing. Insert the front housing into position with respect to the filter housing and then clamp and ultrasonically weld it to the filter housing.

A prefilter may be wrapped around the filter and sealed using the hot seal method. Next, the left and right end caps with adhesive applied to the contact surfaces thereof are inserted in the filter. Uniform pressure is applied to the left and right filter end caps 114, 115, 1514, 1515 to spread the adhesive and allow it to set. Approximate time for applying pressure is 2-5 seconds. The magnet is installed into the gate under the pressure of a person's finger or a tool such as pliers or the equivalent then hermetically sealed in place.

Next, the gate 118, 1518 is snapped into the hinges with the magnet facing outwardly. Indicia on the left end cap of the filter subassembly is aligned with a mark or other indicia on the filter housing and the filter subassembly is inserted into the filter housing. Indicia on the housing end cap 102, 1502 is aligned with indicia on the filter housing and inserted therein. Once the housing end cap is in place it is clamped and ultrasonically welded to the filter housing non-removably retaining the filter within the filter housing.

The lever is installed by snapping it into place in the valve cavity. To install the end of life electronic package, the light emitting diode is inserted into and through the aperture 137. Optionally, adhesive may be used when installing the diode in the aperture 137 to secure it into position and to ensure that the diode is hermetically sealed. The electronic package is installed into the reservoir in the open end of the housing end cap with the glass reed switch facing inwardly. End plate 116, 1516 is next snap-fit into place to hermetically seal the electronic package. Optionally, adhesive may be used around the perimeter of the end plate to ensure a hermetic seal. Or, the end plates may be welded to the housing end caps.

The materials which are ultrasonically welded should be amenable to welding such as ABS or other plastics.

The invention has been described herein by way of example only. Those skilled in the art will readily recognize that changes and modifications may be made to the invention without departing from the spirit and scope of the appended claims which follow hereinbelow.

The invention claimed is:

1. A water filtration device comprising: a water filter housing having an inlet and an outlet; said water filter housing includes a housing end cap affixed thereto; a wet chamber formed within said water filter housing; a dry chamber formed within said housing end cap; a water filter non-removably contained within said water filter housing and including at least one filter end cap; a passageway communicating between said wet chamber and said water filter; a gate having a magnet affixed thereto resides in said wet chamber; said gate swinging from a first position to a second position when water flows through said filter; said gate mounted to said filter end cap and rotates about a fixed axis located at one end of said gate when moving from said first to said second position; a gate position sensor resides in said dry chamber of said housing end cap; and, said gate position sensor being actuated when said gate swings to said second position and said magnet is in proximity to said sensor.

2. A water filtration device as claimed in claim 1 wherein said sensor includes an electric circuit measuring the time said gate is in said second position.

3. A water filtration device as claimed in claim 1 further comprising an indicator for displaying performance of said filter.

4. A water filtration device as claimed in claim 1 wherein said sensor includes an electric circuit performing an algorithm totalizing the flow of filtered water through said device.

5. A water filtration device as claimed in claim 4 wherein said algorithm totalizes flow rate times time.

6. A water filtration device as claimed in claim 5 further comprising an indicator for displaying performance of said filter.

7. A water filtration device as claimed in claim 4 further comprising an indicator for displaying performance of said filter.

8. A water filtration device as claimed in claim 1 further comprising electronics and a light emitting diode; said electronics output a signal to said light emitting diode which indicates the performance of the water filtration device.

9. A water filtration device as claimed in claim 1 wherein said water filter is affixed to a first end cap and a second end cap; and, said first end cap of said filter includes a first hinge member and said gate includes a second hinge member which coacts with said first hinge member to enable said gate to swing between said first and second positions.

10. A water filtration device as claimed in claim 1 wherein said filter is a carbon-based filter.

11. A water filtration device as claimed in claim 1 wherein said sensor includes a switch; said magnet opening and closing said switch; and, an electric circuit for measuring the time when said switch is closed.

12. A water filtration device as claimed in claim 11 wherein said electric circuit is an integrated circuit.

13. A water filtration device as claimed in claim 11 wherein said switch is a reed switch.

14. A water filtration device as claimed in claim 11 wherein said electric circuit has three discrete outputs.

* * * * *

UNITED STATES PATENT AND TRADEMARK OFFICE
CERTIFICATE OF CORRECTION

PATENT NO. : 7,258,781 B2 Page 1 of 1
APPLICATION NO. : 10/613950
DATED : August 21, 2007
INVENTOR(S) : Warren et al.

It is certified that error appears in the above-identified patent and that said Letters Patent is hereby corrected as shown below:

Column 3, line 13, after "flow" delete "-are" and insert -- are --.

Column 12, line 21, after "thereof" insert --.-- .

Column 12, line 40, after first occurrence of "Fig." delete "1B" and insert -- 11B -- .

Column 12, line 40, after second occurrence of "Fig." delete "1D" and insert -- 11D -- .

Column 12, line 41, after "Fig." delete "1B" and insert --11B -- .

Column 13, line 5, after "end" delete "." .

Column 13, line 6 after "." delete "," .

Column 18, line 10, after "claim" delete "1" and insert --2-- .

Signed and Sealed this

Twentieth Day of November, 2007

JON W. DUDAS
*Director of the United States Patent and Trademark Office*